(12) United States Patent
Bott et al.

(10) Patent No.: US 12,221,369 B2
(45) Date of Patent: Feb. 11, 2025

(54) METHOD AND APPARATUS FOR NUTRIENT REMOVAL USING ANOXIC BIOFILMS

(71) Applicants: Hampton Roads Sanitation District, Virginia Beach, VA (US); D.C. Water and Sewer Authority, Washington, DC (US); Bernhard Wett, Innsbruck (AT); Sudhir Murthy, Herndon, VA (US)

(72) Inventors: Charles Bott, Virginia Beach, VA (US); Stephanie Klaus, Virginia Beach, VA (US); Michael Parsons, Virginia Beach, VA (US); Haydee De Clippeleir, Washington, DC (US); Christine deBarbadillo, Washington, DC (US); Bernhard Wett, Innsbruck (AT); Sudhir Murthy, Herndon, VA (US)

(73) Assignees: Hampton Roads Sanitation District, Virginia Beach, VA (US); D.C. Water and Sewer Authority, Washington, DC (US)

( * ) Notice: Subject to any disclaimer, the term of this patent is extended or adjusted under 35 U.S.C. 154(b) by 0 days.

(21) Appl. No.: 17/654,796

(22) Filed: Mar. 14, 2022

(65) Prior Publication Data

US 2022/0289606 A1  Sep. 15, 2022

Related U.S. Application Data

(60) Provisional application No. 63/267,029, filed on Jan. 21, 2022, provisional application No. 63/160,467, filed on Mar. 12, 2021.

(51) Int. Cl.
 *C02F 3/30* (2023.01)
 *C02F 101/16* (2006.01)

(52) U.S. Cl.
 CPC .............. *C02F 3/307* (2013.01); *C02F 3/301* (2013.01); *C02F 2101/16* (2013.01); *C02F 2203/006* (2013.01); *C02F 2209/14* (2013.01)

(58) Field of Classification Search
 CPC ...... C02F 3/307; C02F 3/301; C02F 2101/16; C02F 2203/006; C02F 2209/14;
 (Continued)

(56) References Cited

U.S. PATENT DOCUMENTS 3,226,317 A  12/1965  Albertson
3,468,794 A  9/1969  Amero
(Continued)

FOREIGN PATENT DOCUMENTS

CA  2780017 A1  5/2011
CA  2852492  11/2014
(Continued)

OTHER PUBLICATIONS

Translation of JP2008221160A_Nakajima_NPL.pdf (Year: 2008).*
(Continued)

*Primary Examiner* — Ekandra S. Miller-Cruz
(74) *Attorney, Agent, or Firm* — Ice Miller LLP

(57) ABSTRACT

A methodology, system and apparatus are provided that include anoxic biofilms to perform partial denitrification and anammox (PdNA) reactions. The PdNA reactions can facilitate process intensification and carbon efficient biological nitrogen removal. The anoxic biofilms can be placed in a pre-anoxic zone or a downstream anoxic zone, where the biofilm and reactions are managed, including using storage compounds, to overcome mass transfer limitations in the biofilm. The methodology, system and apparatus can, when compared to state-of-the art technologies, improve the concentration gradient or reduce mass transfer limitations to facilitate PdNA reactions.

17 Claims, 24 Drawing Sheets

(58) Field of Classification Search
CPC .... C02F 1/004; C02F 1/38; C02F 3/04; C02F 3/101; C02F 3/107; C02F 3/108; C02F 3/1268; C02F 3/208; C02F 3/34; C02F 2001/007; C02F 2203/004; C02F 2209/15; Y02W 10/10
USPC .......................................................... 210/605
See application file for complete search history.

(56) References Cited

U.S. PATENT DOCUMENTS

| | | |
|---|---|---|
| 4,056,465 A | 11/1977 | Spector |
| 4,415,452 A | 11/1983 | Heil |
| 4,891,136 A | 1/1990 | Voyt |
| 5,342,522 A | 8/1994 | Marsman |
| 5,342,552 A | 8/1994 | Panzer |
| 5,582,733 A | 12/1996 | Desbos |
| 5,645,799 A | 7/1997 | Shah |
| 5,863,435 A | 1/1999 | Heijnen |
| 6,183,642 B1 | 2/2001 | Heijnen |
| 6,309,547 B1 | 10/2001 | Burke |
| 6,383,390 B1 | 5/2002 | Van Loosdrecht |
| 6,406,617 B1 | 6/2002 | Brauchli |
| 6,566,119 B1 | 5/2003 | Heijnen |
| 6,605,220 B2 | 8/2003 | Garcia |
| 6,645,386 B1 | 11/2003 | Moreau |
| 7,060,185 B2 | 6/2006 | Kim |
| 7,273,553 B2 | 9/2007 | Van Loosdrecht |
| 7,481,934 B2 | 1/2009 | Skillicorn |
| 7,569,147 B2 | 8/2009 | Curtis |
| 7,604,740 B2 | 10/2009 | Baur |
| 7,846,334 B2 | 12/2010 | Wett |
| 8,157,988 B2 | 4/2012 | Quevillon |
| 8,241,717 B1 | 8/2012 | Anderson |
| 8,268,169 B2 | 9/2012 | Lean |
| 8,623,205 B2 | 1/2014 | Woodard |
| 8,911,628 B2 | 12/2014 | Nyhuis |
| 9,242,882 B2 | 1/2016 | Nyhuis et al. |
| 9,358,505 B2 | 6/2016 | Cumin et al. |
| 9,670,083 B2 | 6/2017 | Wett et al. |
| 11,787,716 B2 * | 10/2023 | Peng ................ C02F 3/307 210/605 |
| 2001/0033527 A1 | 10/2001 | Smith |
| 2001/0045382 A1 | 11/2001 | Nasr |
| 2002/0020666 A1 | 2/2002 | Cote |
| 2003/0232107 A1 | 12/2003 | Terry |
| 2004/0229343 A1 | 11/2004 | Husain |
| 2005/0087480 A1 | 4/2005 | Park |
| 2006/0283796 A1 | 12/2006 | Tokutomi |
| 2007/0000836 A1 | 1/2007 | Elefritz, Jr. |
| 2007/0144965 A1 | 6/2007 | Morris |
| 2007/0217856 A1 | 9/2007 | Kott |
| 2007/0241041 A1 | 10/2007 | Shimamura |
| 2008/0210613 A1 | 9/2008 | Wechsler |
| 2008/0217212 A1 | 9/2008 | Garner |
| 2008/0217244 A1 | 9/2008 | Gaid |
| 2008/0223784 A1 | 9/2008 | Martin |
| 2008/0223789 A1 | 9/2008 | Hasan |
| 2009/0221054 A1 | 9/2009 | Wett |
| 2009/0221854 A1 | 9/2009 | Oevering |
| 2009/0272690 A1 | 11/2009 | Wett |
| 2009/0282882 A1 | 11/2009 | Verhave |
| 2010/0032370 A1 * | 2/2010 | Allen ................ C12M 45/20 210/603 |
| 2010/0102006 A1 | 4/2010 | Quevillon |
| 2010/0170845 A1 | 7/2010 | Baur |
| 2010/0219125 A1 | 9/2010 | Northrop |
| 2010/0288693 A1 | 11/2010 | Vion |
| 2010/0303695 A1 | 12/2010 | Gonzalez Ospina |
| 2011/0000851 A1 | 1/2011 | Vanotti |
| 2011/0049047 A1 | 3/2011 | Cumin et al. |
| 2011/0084022 A1 | 4/2011 | Lee |
| 2011/0100908 A1 | 5/2011 | Stephenson |
| 2011/0198284 A1 | 8/2011 | Nyhuis |
| 2011/0284461 A1 | 11/2011 | Dimassimo |
| 2012/0048802 A1 | 3/2012 | Brown |
| 2012/0261335 A1 | 10/2012 | Lemaire |
| 2012/0305477 A1 | 12/2012 | Stroot |
| 2013/0028841 A1 | 1/2013 | Yagi |
| 2013/0134089 A1 | 5/2013 | Cote |
| 2013/0153493 A1 | 6/2013 | Young |
| 2013/0196403 A1 | 8/2013 | Bowers |
| 2013/0256217 A1 | 10/2013 | Lemaire |
| 2014/0069863 A1 | 3/2014 | Wett |
| 2014/0069864 A1 | 3/2014 | Wett |
| 2014/0083936 A1 | 3/2014 | Murthy |
| 2014/0144836 A1 | 5/2014 | Nyhuis |
| 2014/0158618 A1 | 6/2014 | Zha et al. |
| 2014/0178281 A1 | 6/2014 | Bowers |
| 2014/0202333 A1 | 7/2014 | Pomerleau |
| 2014/0263041 A1 | 9/2014 | Regmi |
| 2014/0291239 A1 | 10/2014 | Wang |
| 2014/0305867 A1 | 10/2014 | Nyhuis |
| 2014/0360933 A1 | 12/2014 | Rezania |
| 2015/0108067 A1 | 4/2015 | Calhoun |
| 2015/0284280 A1 | 10/2015 | Huang |
| 2015/0336826 A1 | 11/2015 | Peeters |
| 2015/0368131 A1 | 12/2015 | Garrido Fernandez |
| 2015/0376043 A1 | 12/2015 | Wett |
| 2016/0002081 A1 | 1/2016 | Cote |
| 2016/0145131 A1 | 5/2016 | Manic |
| 2016/0264437 A1 | 9/2016 | Liu |
| 2018/0009687 A1 | 1/2018 | Murthy et al. |
| 2019/0263696 A1 | 8/2019 | Bott et al. |
| 2021/0355012 A1 | 11/2021 | Lemaire |
| 2022/0194832 A1 | 6/2022 | Fraser |

FOREIGN PATENT DOCUMENTS

| | | | | |
|---|---|---|---|---|
| CA | 3074480 A1 | | 3/2019 | |
| CA | 3135606 A1 | | 10/2020 | |
| CN | 2767430 | | 3/2006 | |
| CN | 1903752 | | 1/2007 | |
| CN | 101296870 | | 10/2008 | |
| CN | 101370738 | | 2/2009 | |
| CN | 101568493 | | 10/2009 | |
| CN | 101970360 | | 2/2011 | |
| CN | 102153198 | | 8/2011 | |
| CN | 102209689 | | 10/2011 | |
| CN | 102211811 | | 10/2011 | |
| CN | 202036825 | | 11/2011 | |
| CN | 203048739 U | | 7/2013 | |
| CN | 103663725 | | 3/2014 | |
| CN | 103936150 A | | 7/2014 | |
| CN | 104276656 A | | 1/2015 | |
| CN | 104276657 A | | 1/2015 | |
| CN | 104291528 A | | 1/2015 | |
| CN | 104291529 A | | 1/2015 | |
| CN | 104310580 A | | 1/2015 | |
| CN | 105110572 A | | 12/2015 | |
| CN | 105129991 A | | 12/2015 | |
| CN | 105384247 A | | 3/2016 | |
| CN | 105481093 A | | 4/2016 | |
| CN | 105712584 A | | 6/2016 | |
| CN | 105753155 A | | 7/2016 | |
| CN | 105923774 A | | 9/2016 | |
| CN | 111233146 A | | 6/2020 | |
| CN | 110615531 B | * | 11/2021 | ............ C02F 3/302 |
| DE | 3628203 | | 2/1988 | |
| DE | 4016457 | | 2/1992 | |
| DE | 19855794 | | 6/2000 | |
| DE | 102005045170 | | 3/2007 | |
| EP | 0544226 | | 6/1993 | |
| EP | 0872451 | | 12/2002 | |
| EP | 1634854 | | 3/2006 | |
| EP | 1634855 | | 3/2006 | |
| EP | 2341033 | | 7/2011 | |
| EP | 2341033 A2 | | 7/2011 | |
| EP | 2740713 | | 6/2014 | |
| ES | 2334321 | | 3/2010 | |
| FR | 2985996 | | 7/2013 | |
| GB | 2228930 | | 9/1990 | |
| JP | S58104696 | | 6/1983 | |
| JP | H06304589 | | 11/1994 | |

(56) References Cited

FOREIGN PATENT DOCUMENTS

| | | |
|---|---|---|
| JP | H08257583 | 10/1996 |
| JP | 2001096297 | 4/2001 |
| JP | 2001104982 | 4/2001 |
| JP | 2003010874 | 1/2003 |
| JP | 2003088889 | 3/2003 |
| JP | 3866053 | 1/2007 |
| JP | 2008221160 | 9/2008 |
| JP | 2008284427 | 11/2008 |
| JP | 2012501845 | 1/2012 |
| JP | 2012529990 A | 11/2012 |
| KR | 20020072360 A | 9/2002 |
| RU | 2334685 | 9/2008 |
| RU | 2454374 | 6/2012 |
| WO | 9219547 A1 | 11/1992 |
| WO | 9705070 | 2/1997 |
| WO | 0228780 A2 | 4/2002 |
| WO | 2006022539 A1 | 3/2006 |
| WO | 2006102362 A2 | 9/2006 |
| WO | 2006129132 | 12/2006 |
| WO | 2006129132 A1 | 12/2006 |
| WO | 2007011890 | 1/2007 |
| WO | 2007050775 | 5/2007 |
| WO | 2008141413 | 11/2008 |
| WO | 2010055776 | 5/2010 |
| WO | 2010147970 A | 12/2010 |
| WO | 2011148949 | 12/2011 |
| WO | 2012019310 | 2/2012 |
| WO | 2012019310 A1 | 2/2012 |
| WO | 2012085288 | 6/2012 |
| WO | 2012085288 A1 | 6/2012 |
| WO | 2013151434 | 10/2013 |
| WO | 2014043547 A1 | 3/2014 |
| WO | 2014047459 A1 | 3/2014 |
| WO | 2014085662 | 6/2014 |
| WO | 2014085662 A1 | 6/2014 |
| WO | 2014152872 A1 | 9/2014 |
| WO | 2015179700 A2 | 11/2015 |
| WO | 2016004082 A1 | 1/2016 |
| WO | 2018009348 A1 | 1/2018 |
| WO | 2018217587 | 11/2018 |
| WO | 2018217587 A1 | 11/2018 |
| WO | 2020086407 A1 | 4/2020 |
| WO | WO-2020076755 A1 * | 4/2020 ............ C02F 3/307 |
| WO | 2022072270 A1 | 4/2022 |

OTHER PUBLICATIONS

Anonymous, "New Mexico Wastewater Systems Operator Certification Study Manual", (Nov. 1, 2007), pp. 1-242, URL: https://www.env.nm.gov/swqb/FOT/WastewaterStudyManual/WastewaterOperatorStudyManual.pdf, (Jul. 6, 2017), XP055388522.
Chudoba et al. "Control of Activated Sludge Filamentous Bulking II. Selection of Microorganisms by Means of a Selector," Water Res., 7, 1389, 1973 pp. 1389-1406.
Gabb et al. "The Selector Effect on Filamentous Bulking in Long Sludge Age Activated Sludge Systems," Water Sci. Technol., vol. 23, Kyoto, pp. 867-877, 1991.
Marshall et al. "Selectors in Pulp and Paper Mill-activated Sludge Operations: Do they work?" Pulp and Paper Canada, 101(3), 48-53, 2000.
Lebek et al. "Control of the Growth of Microthrix parvicella by Using an Aerobic Selector—Results of Pilot and Full Scale Plant Operation," Water Sci. Technol., 46(1-2), 2002, pp. 491-494.
Marten et al. "Full-scale evaluation of factors affecting the performance of anoxic selectors," Water Environ. Res., 69 (7), 1272-1289, 1997.
Parker et al. "Discussion of: Full-scale evaluation of factors affecting the performance of anoxic selectors," Water Environ. Res., 70(6), 1225-1228, 1998.
Schuler et al., "Microbial storage products, biomass density, and settling properties of enhanced biological phosphorus removal activated sludge," Water Sci. Technol., vol. 43, No. 1, pp. 173-180, 2001.
Davoli et al. "Testing the effect of selectors in the control of bulking and foaming in small activated sludge plants," Water Sci Technol. 46(1-2):495-8, 2002.
Parket et al. "Making classifying selectors work for foam elimination in the activated sludge process," Water Environ. Res., 75 (1), 83-91, 2003.
Morgenroth et al. "Aerobic Granular Sludge in a Sequenencing Batch Reactor," Water Research, vol. 31 No. 12 pp. 3191-3194, 1997.
Dangcong Peng et al. "Aerobic Granular Sludge," A Case Report Water Research, vol. 33 No. 3 pp. 880-893, 1999.
Abeling et al. "Anaerobic-Aerobic Treatment of High Strength Ammonium Wastewater—Nitrogen Removal via Nitrite," Wat. Sci. Tech. vol. 26, No. 5-6, pp. 1007-1015, 1992.
Alleman et al. "Storage-Induced Denitrification Using Sequencing Batch Reactor Operation," Water Research vol. 14. pp. 1483-14885, 1980.
Anthonisen et al. "Inhibition of Nitrification by Ammonia and Nitrous Acid," Water Pollution Control Federation vol. 28, No. 5, pp. 835-852, 1976.
Daebel et al. "Exploring Temporal Variations of Oxygen Saturation Constants of Nitrifying Bacteria," Water Research 41, pp. 1094-1102, 2007.
Guo et al. "Effective and Robust Partial Nitrification to Nitrite by Real-time Aeration Duration Control in an SBR Treating Domestic Wastewater," Process Biochemistry 44, 2009, pp. 979-985.
Hanaki et al. "Nitrification at Low Levels of Dissolved Oxygen With and Without Organix Loading in a Suspended-Growth Reactor," Wat. Res. vol. 24, No. 3, pp. 297-302, 1990.
Hellinga et al. "The Sharon Process: An Innovative Method for Nitrogen Removal From Ammonium-Rich Waste Water," Water Science and Technology vol. 37 Issue 9, pp. 135-142, 1998.
Hippen et al. "Aerobic Deamoonification: A New Experience in the Treatment of Wastewaters," Wat. Sci. Tech. vol. 35, No. 10, pp. 111-120, 1997.
Ju et al. "Simultaneous Nitrification, Denitrification, and Phosphorous Removal in Single-Tank Low-Dissolved-Oxygen Systems Under Cyclic Aeration," Water Env. Res., 2007, vol. 78, No. 8.
Kim et al. "Comparison Study of the Effects of Temperature and Free Ammonia Concentration on Nitrification and Nitrite Accumulation," Process Biochemistry 43, 154-160, 2008.
Kornaros et al. "Partial Nitrification/Denitrification Can be Attributed to the Slow Response of Nitrite Oxidizing Bacteria to Periodic Anoxic Disturbances," Env. Sci., 2008, Environ. Sci. Technol. 2010, 7245-7253.
Laanbroek et al. "Competition for Limiting Amounts of Oxygen between Nitrosomonas Europaea and Nitrobacter Winogradskyi Grown in Mixed Continuous Cultures," Arch Micro, 1993, Arch Microbiol (1993) 159: 453-459.
Li et al. "Partial Nitritation of Landfill Leachate with Varying Influent Composition under Intermittent Aeration Conditions," Process Safety and Env. Prot. V 91 Issue 4, 2013.
Ling, "Experience from Commissioning of Full-scale DeAmmon plant at Himmerfjarden," Proceedings of 2nd IWA Specialized Conference, Lemtech Konsulting, ed., pp. 403-410.
Peng et al. "Nitrite Accumulation by Aeration Controlled in Sequencing Batch Reactors Treating Domestic Wastewater," Water Sci. Tech. vol. 50 No. 10 pp. 35-43, 2004.
Peng et al. "Partial Nitrification from Domestic Wastewater by Aeration Control at Ambient Temperature," Chin. J. Chem. Eng., 15(1) 115-121, 2007.
Silverstein et al. "Performance of SBR Activated Sludge Processes with Nitrification/Denitrification," Water Pollution Control Fed., vol. 55, No. 4, pp. 377-384, 1983.
Turk et al. "Preliminary Assessment of a Shortcut in Nitrogen Removal from Wastewater," Canadian Journal of Civil Engineering, vol. 13, Issue 6, 1986.
Turk et al. "Maintaining Nitrite Build-Up in a System Acclimated to Free Ammonia," Wat. Res. vol. 23, No. 11, pp. 1383-1388, 1989.
Wong-Chong et al. "Kinetics of Microbial Nitrification: Nitrite-Nitrogen Oxidation," Wat. Res. vol. 12. pp. 605-609, 1978.

(56) References Cited

OTHER PUBLICATIONS

Yang et al. "Nitrogen Removal via Short-Cut Simulataneous Nitrification and Denitrification in an Intermittently Aerated Moving Bed Membrane Bioreactor," Haz. Mat. 195, 2011.
Yoo et al. "Nitrogen Removal From Synthetic Wastewater by Simultaneous Nitrification and Denitrification and Denitrification via Nitrite in an Intermittently-Aerated Reactor,", Wat. Res. vol. 33, No. 1, pp. 145-154 1999.
Zeng et al. "Control and Optimization of Nitrifying Communities for Nitritation from Domestic Wastewater at Room Temperature," Enzyme and Microb. Tech. 45, pp. 226-232, 2009.
Gao, et al. "Shortcut nitrification-denitrification by real-time control strategies," Bioresource Technology; journal homepage: www.elsevier.com/locate/biortech; p. 2298-2300, (2009).
C.S. Gee, et al. "Nitrite accumulation followed by denitrification using sequencing batch reactor," Water Science and Technology vol. 49 No. 5 pp. 47-55, (2004).
A.N. Katsogiannis, et al. "Enhanced nitrogen removal in SBRs bypassing nitrate generation accomplished by multiple aerobic/anoxic phase pairs" Water Science and Tech. vol. 47, No. 11, pp. 53-59 (2003).
Romain Lemaire, et al. "Achieving the Nitrite Pathway Using Aeration Phase Length Control and Step-Feed in an SBR Removing Nutrients form Abattoir Wastewate" Biotechnology, and Bioengineering (2008).
Manser, et al. "Consequences of mass transfer effects on the kinetics of nitrifiers" Water Research 39 (2005) pp. 4633-4642.
Pollice, et al. "Influence of aeration and sludge retention time on ammonium oxidation to nitrite and nitrate" Water Research 36 (2002) pp. 2541-2546.
Sin, et al. "Modelling nitrite in wastewater treatment systems: a discussion of different modelling concepts" Water Science & Technology 58.6 2008 pp. 1155-1171.
Sliekers, et al. "Competition and coexistence of aerobic ammonium- and nitrite-oxidizing bacteria at low oxygen concentrations" Environmental Biotechnology Apr. 8, 2005 p. 808-817.
Van Dongen, et al. "The SHARON-Anammox Process for treatment of ammonium rich wastewater" Water Science and Technology vol. 44 No. 1 p. 153-160, (2001).
Wett "Sloved upscaling problems for implementing deammonificationof rejection water" Water Science & Technology vol. 53 No. 12 p. 121-128, (2006).
Wett, et al. "Syntrophy of Aerobic and Anaerobic Ammonia Oxidisers" Water Science & Technology—WST 61.8 2010 pp. 1915-1922.
Wyffels, et al. "Nitrogen removal from sludge reject water by a two-stage oxygen-limited autotrophic nitrification denitrification process" Water Science and Technology vol. 49, No. 5-6, pp. 57-64 (2004).
Yu, et al. "Performance Enhancement of SBR Applying Real-Time Control" Journal of Environmental Engineering; Oct. 2000 pp. 943-948.
Zekker, et al. "Achieving nitritation and anammox enrichment in a single moving-bed biofilm reactor treating reject water" Environmental Technology, 33:6, 703-710, (2012).
Zeng, et al. "Process Control of an Alternating Aerobic-Anoxic Sequencing BAtch Reactor for Nitrogen Removal via Nitrite" Chem. Eng. Technol. 2008, 31, No. 4, 582-587.
Bernet, et al. "Nitrification at Low Oxygen Concentration in Biofilm Reactor" Journal of Environmental Engineering Mar. 2001 pp. 266-271.
Blackburne, et al "Partial nitrification to nitrite using low dissolved oxygen concentraion as the main factor" Springer Science+Business Media B.V. 2007.
Ciudad, et al. "Partial nitrification of high ammonia concentration wastewater as a part of a shortcut biological nitrogen removal process" Process Biochemistry 40 (2005), 1715-1719.
Fux, et al. "Biological treatment of ammonium-rich wastewater by partial nitritation and subsequent anaerobic ammonium oxidation (anammox) in a pilot plant" Journal of Biotechnology 99 (2002) 295-306.

Wett, "Development and implementation of a robust deammonification process," Water Science & Technology, vol. 56, No. 7, pp. 81-88 (2007).
International Search Report from Related PCT application No. PCT/US13/072345, mailed on Mar. 20, 2014.
Search Report for corresponding Chinese Application No. 201380071506.5, dated Feb. 22, 2017.
Water Utilities Technical Assistance Program, "New Mexico Wastewater Systems Operator Certification Study Manual", Utility Operators Certification Program New Mexico Environment Department Surface Water Quality Bureau, Nov. 2007, Version 1.1.
Chinese Office Action issued in Chinese Application No. 201380071506.5, dated Aug. 16, 2017.
Russian Office Action issued in Russian Patent Application No. 2015125485, dated Sep. 12, 2017.
Osterreichischer Wasser- und Abfallwirtschaftsverband, "Klaranlagenzustandsbericht: OWAV 0 Arbeisbehelf Nr. 22", dated Jan. 29, 2001. (With Partial English Translation).
Trollberg O., "Extremum Seeking Control Applied to a Deammonification Process", Thesis work—Department of Information Technology, Uppsala universitet, (Mar. 30, 2011), URL: http://sjostad.ivl.se/download/18.50a499dd132037d524e80007759/1350483758748/Olle_Trollberg.pdf, (Nov. 2, 2015).
Wett B. et al., "Key Parameters for Control of DEMON Deammonification Process", Water Practice, vol. 1, No. 5, (Nov. 30, 2007), pp. 1-11, URL: http://www.essdemon.com/libraries.files/KeyparametersDEMONControl.pdf, (Nov. 2, 2015).
IPRP for PCT International Application No. PCT/US2015/041622 dated Jan. 24, 2017.
Kazulyuzhnyi, S., et al., (2007). "Phylogenetic analysis of a microbial community from a DEAMOX reactor carrying out anacrobic ammonia oxidation under sulphide-driven denitrifying conditions" Presented at Poster Session PT02—Microbial Diversity 11th IWA World Congress on Aanaerobic Digestion, Sep. 23-27, 2007, Brisbane, Australia.
Kazulyuzhnyi, S., et al., (2006). "DEAMOX—new biological nitrogen removal process based on anacrobic ammonia oxidation coupled to sulphide driven conversion of nitrate into nitrite". Water Res., 40, 3637-3645.
International Search Report issued in App. No. PCT/US2022/020266, dated Jun. 30, 2022, 3 pages.
International Search Report issued in App. No. PCT/US2022/071144, dated Jun. 30, 2022, 3 pages.
European Search Report issued in EP22200155.4, dated Mar. 14, 2023.
"New Technologies of Water and Wastewater Treatment (水与废水处理新技术 )", edited by Zhu Lingfeng, pp. 178-180, Xi'an Map Publishing House, Aug. 2007.
"Theory and Case Analysis of Micro-electrolysis Treatment to Refractory Organic Wastewater (微电解法处理难降解有机废水的理论与实例分析 )", Zeng Chenlin et al., pp. 79-81, China Environment Press, Oct. 2017.
"Engineering Technology of High Efficiency Aquaculture System Construction for Seawater Industrialization (海水工厂化高效养殖体系构建工程技术 )", Qu Kemning et al., pp. 140-143, Ocean Press, Jan. 2010.
Regmi, Pusker, et al. "Control of aeration, aerobic SRT and COD input for mainstream nitritation/denitritation." Water research 57 (2014): 162-171.
Valve, Matti, ed. Nitrogen removal from municipal wastewater. Nordic Council of Ministers, 1995, p. 232.
Kartal, Boran, et al. "Anammox bacteria disguised as denitrifiers: nitrate reduction to dinitrogen gas via nitrite and ammonium." Environmental microbiology 9.3 (2007): 635-642.
Jenkins et al. "Manual on the Causes and Control of Activated Sludge Bulking, Foaming, and Other Solids Separation Problems," 3rd edition, Lewis Publishers, USA, 2004.
Schuler, Andrew J., et al., "Causes of Variable Biomass Density and Its Effects on Settleability in Full-Scale Biological Wastewater Treatment Systems", Environ. Sci. Technol. 2007, 41, 1675-1681.
Extended European Search Report issued in App. No. EP23200218, dated Nov. 14, 2023, 15 pages.

(56) References Cited

OTHER PUBLICATIONS

Regmi Pusker et al: "Control of aeration, aerobic SRT and COD input for mainstream nitritation/denitritation", Water Research, Elsevier, Amsterdam, NL, vol. 57, Mar. 26, 2014 (Mar. 26, 2014), pp. 162-171, XP029021873, ISSN: 0043-1354, DOI: 10.1016/J.WATRES. 2014.03.035 ; & Pusker Regmi et al: "Supplementary Information: Control of aeration, aerobic SRT and COD input for mainstream nitritation/denitritation", Water Research., vol. 57, Jun. 1, 2014 (Jun. 1, 2014), pp. 162-171, XP055286042, NL ISSN: 0043-1354, DOI: 10.1016/.
Mexican Office Action issued in App. No. MX/a/2019/000176, dated May 21, 2024, 6 pages.

\* cited by examiner

Fixed Biofilm Air System- Managing Mass Transfer

METHOD AND APPARATUS FOR NUTRIENT REMOVAL USING ANOXIC BIOFILMS

CROSS REFERENCE TO RELATED APPLICATIONS

This application is entitled to and hereby claims priority under 35 U.S.C. § 119(e) to U.S. Provisional Patent Applications, Nos. 63/160,467, filed Mar. 12, 2021, and 63/267,029, filed Jan. 21, 2022, both of which are titled, "Method and Apparatus for Nutrient Removal Using Anoxic Biofilms," and both of which are hereby incorporated herein in their entireties.

TECHNICAL FIELD

The present disclosure relates to methods and apparatuses involving nutrient removal, and, more particularly, methods and apparatuses involving nutrient removal relating to, for example, mainstream deammonification.

BACKGROUND

Wastewater treatment systems typically employ deammonification technology in applications such as, for example, treating high-strength ammonia wastewater treatment streams in treatment plants, including recycle streams from dewatering of anaerobic digested sludge. Deammonification has become a technology of choice for many applications due, in part, to the cost effectiveness, efficiency, and reliability of the technology.

Deammonification technology includes a biological treatment process that is typically applied to wastewater to convert ammonia to nitrogen gas. Deammonification is commonly regarded as a shortcut to nitrogen removal processes since various steps of more traditional nitrification-denitrification nitrogen removal processes are bypassed or eliminated altogether. Unlike more traditional nitrification-denitrification processes, deammonification does not require an organic carbon source to drive nitrogen removal. Rather, deammonification combines nitrification, with a possibility of denitrificiation, and then some part of an anammox reaction that removes ammonia.

Deammonification typically occurs through one of two pathways: 1) partial nitritation to nitrite plus anammox; or, 2) partial nitrification to nitrate combined with partial denitrification (denitratation to nitrite), plus anammox (PdNA). The inventors have discovered an unmet and urgent need for an improvement to deammonification; and, the inventors have created methods and apparatuses that significantly improve deammonification in applications such as, for example, wastewater treatment.

SUMMARY

A technology solution is provided that, among other things, employs microbial-generated storage products (or extracellular polymeric substances) in combination with anammox for purposes of deammonification in a partial denitrification plus anammox pathway. The technology solution includes methods and apparatuses that can be included in, for example, the second pathway of a deammonification process—that is, the PdNA pathway.

In at least one embodiment, the technology solution includes a method and apparatus that comprise biofilm media (for example, a biofilm cassette, or a biofilm cage) for supporting any deammonification reaction, in either or both deammonification pathways, namely partial nitritation to nitrite plus anammox, or the PdNA pathway.

The disclosure provides a wastewater treatment apparatus, comprising: an influent containing contaminated water; a biological nitrogen removal reactor having an inlet configured to receive the influent and a volume, or a series of volumes, configured to contain and treat the contaminated water in one or more reactions, including a selector zone having a biofilm media comprising an anammox biofilm; an effervescence diffuser located below or proximate to the biofilm media in the biological nitrogen removal reactor and configured to emit an intermittent gas discharge to manage mass transfer of substrate to the biofilm media, the effervescence diffuser being further configured to manage biofilm sloughing on the biofilm media to improve at least one of a rate of reaction or an extent of a reaction; or to promote mixing, floatation or immersion, and a clarifier located downstream of the biological nitrogen removal reactor and configured to receive a solid-liquid mixture from the biological nitrogen removal reactor. In the apparatus: the biofilm media can be moving, mobile, positioned or fixed in the selector zone to promote either complete mixed or plug flow conditions for the biofilm media; the biofilm media can comprise a single media cassette, or a series of media cassettes, or moving or mobile having the anammox biofilm grown on a media that is placed in a cassette; and the effervescence diffuser can include a gas supply coupled, directly or indirectly, to an air blower, an air compressor, or an inverted siphon.

The apparatus can comprise a clarifier located between the biological nitrogen removal reactor and the outlet.

In the apparatus, a reduction of nitrate to nitrite has an electron donor provided by the influent containing contaminated water, a fermentate, a hydrolysate, a digester gas, a digestate liquor, a leachate, a condensate, or an external carbon source, or the electron donor results from exposure to an electromagnetic energy source.

The selector zone can comprise: an anoxic selector zone in the biological nitrogen removal reactor; or an anaerobic selector zone in the biological nitrogen removal reactor; or an aerobic selector zone in the biological nitrogen removal reactor.

The biological nitrogen removal reactor can comprise: a pre-anoxic selector zone located at a front or upstream portion of the biological nitrogen removal reactor; and at least one of an aerobic biofilm and an anoxic biofilm located in the pre-anoxic selector zone.

The biofilm media comprise: a biofilm grown on a media that is placed in a media cassette; a biofilm grown on a fixed media; a biofilm grown on a moving media; a biofilm grown on a mobile media; a membrane aerated biofilm reactor (MABR); a membrane biofilm reactor; a trickling filter; a synthetic carrier; a plastic carrier; a cellulosic material; an organic material; and; anthracite; wood chips; a ceramic biofilm; a pure organism culture; or mixed organism cultures.

The biological nitrogen removal reactor can be configured to direct the influent to a biofilm zone that contains nitrified or partially nitrified digestate liquor.

The wastewater treatment apparatus can comprise: an ammonia sensor or an oxidized nitrogen sensor; and a controller configured to manage partial denitrification and an anammox reaction based on an ammonia or nitrate measurement signal received from said ammonia sensor or said oxidized nitrogen sensor, respectively.

In another aspect of the disclosure, a wastewater treatment apparatus is provided that comprises: an influent containing contaminated water; a biological nitrogen removal reactor having an inlet configured to receive the influent and a volume, or a series of volumes, configured to contain and treat the contaminated water in a plurality of reactions, including: (i) a first selector zone or stage comprising a microbially stored substrate having a hydraulic retention time of between about ten minutes and about one-hundred-twenty minutes, and (ii) a second selector zone or stage configured to contain a biofilm media; and (iii) an outlet configured to output an effluent, wherein said biological nitrogen removal reactor is further configured to: (a) generate the microbially stored substrate within the first selector zone or stage to supply between about 10% and about 100% of carbon necessary for a first reaction to convert, by suspended bacteria, nitrate to nitrite using the microbially stored substrate; and (b) supply ammonia for a second reaction, performed primarily by anammox organisms in the biofilm media, to convert the ammonia to nitrogen gas using available nitrite generated from the first reaction. The first selector zone can comprise: an anoxic selector zone in the biological nitrogen removal reactor; or an anaerobic selector zone in the biological nitrogen removal reactor. The biofilm media can comprise: a biofilm grown on a media that is placed in a media cassette; a biofilm grown on a fixed media; a biofilm grown on a moving media; a biofilm grown on a mobile media; a membrane aerated biofilm reactor (MABR); a membrane biofilm reactor; a trickling filter; a synthetic carrier; a plastic carrier; a cellulosic material; an organic material; sand; anthracite; wood chips; a ceramic biofilm; a pure organism culture; or mixed organism cultures.

The apparatus can further comprise an air supply line and an effervescence diffuser coupled, directly or indirectly, to the air supply line, the effervescence diffuser being configured to emit an intermittent air discharge to an anammox biofilm located above and proximate to the effervescence diffuser to: manage or control mass transfer of substrate to the anammox biofilm; or manage or control sloughing on the anammox biofilm; or promote, or increase a reaction rate in, at least one of said plurality of reactions; or promote mixing, floatation, or immersion. The biological nitrogen removal reactor can comprise a nitrate feed provided to an anoxic biofilm in the anoxic selector zone or stage from (i) ammonia oxidation, (ii) an internal mixed liquor recycle stream, or (iii) a membrane aerated biofilm. The biological nitrogen removal reactor can be configured to manage or control one or more of a recycle stream, a bypass, a sidestream liquor, an influent carbon, or the influent. The influent can contain methane produced from an upstream anaerobic reactor or a separate anaerobic digester that is used to grow denitrifying methane oxidation organisms on an aerobic or anoxic biofilm.

In an embodiment, the apparatus comprises a particle selector configured to separate particles based on particle size, particle compressibility, or particle density, and to select particles having longer solid retention time to encourage the growth of slow growing denitrifying storage organisms, wherein the particle selector comprises an outlet configured to supply a recycle stream to the biological nitrogen removal reactor.

The apparatus can comprise a stretched tank to promote plug flow conditions, wherein the stretched tank is constructed to: have a length-to-width ratio greater than 3; or a total recycle rate of less than 100%; or divert an internal mixed liquor recycle stream introduction to a location downstream of a return activated sludge introduction location in the biological nitrogen removal reactor.

The apparatus can comprise one or more additional biofilm media, wherein the biological nitrogen removal reactor is configured such that said biofilm media and said one or more additional biofilm media: are separated in different selector zones; or move between different selector zones; or are fixed in different selector zones; or are integrated in the same selector zone.

In another aspect of the disclosure, a method is provided for treating wastewater, the method comprising: receiving an influent containing contaminated water; supplying the influent to a volume or a series of volumes in a biological nitrogen removal reactor that includes a selector zone and a biofilm media having at least one of an aerobic biofilm and an anoxic biofilm placed in bulk anoxic condition in the selector zone; treating the influent in the biological nitrogen removal reactor in one or more reactions, including a first reaction that converts, by anammox organisms, nitrate to nitrite in the contaminated water or substrate; providing a nitrate supply from an ammonia oxidation, an internal mixed liquor recycle, or a membrane aerated biofilm, to the biofilm media in the selector zone; providing a supply of ammonia for a second reaction that is performed primarily in the biofilm media to convert ammonia to nitrogen gas using available nitrite generated from the first reaction; and selecting one or more locations in the biological nitrogen removal reactor to provide said nitrate supply and said supply of ammonia to manage recycles, bypasses, sidestream liquors, influent carbon or wastewater, to produce an influent COD/N ratio for the biofilm media to be less than 6.

The influent can be received from one or more of an A-stage process, a contact stabilization process, an anaerobic sludge blanket reactor (UASB) process, anaerobic membrane bioreactor process, or a process supplying contaminated water having high soluble chemical oxygen demand from a chemically enhanced primary clarifier, primary screen or a primary filter.

Additional features, advantages, and embodiments of the disclosure may be set forth or apparent from consideration of the detailed description and drawings. Moreover, it is to be understood that the foregoing summary of the disclosure and the following detailed description and drawings provide non-limiting examples that are intended to provide further explanation without limiting the scope of the disclosure as claimed.

BRIEF DESCRIPTION OF THE DRAWINGS

The accompanying drawings, which are included to provide a further understanding of the disclosure, are incorporated in and constitute a part of this specification, illustrate embodiments of the disclosure and together with the detailed description serve to explain the principles of the disclosure. No attempt is made to show structural details of the disclosure in more detail than may be necessary for a fundamental understanding of the disclosure and the various ways in which it may be practiced.

Figure 1:
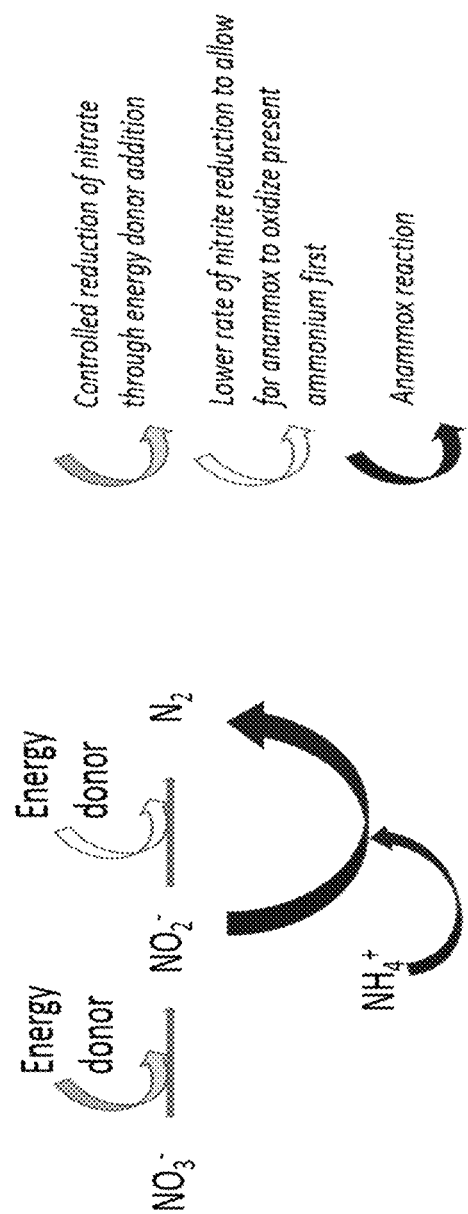
FIG. 1 depicts a partial denitrification and anammox (PdNA) reaction.

The present disclosure is further described in the detailed description that follows.

DETAILED DESCRIPTION

The disclosure and its various features and advantageous details are explained more fully with reference to the non-limiting embodiments and examples that are described or illustrated in the accompanying drawings and detailed in the following description. It should be noted that features illustrated in the drawings are not necessarily drawn to scale, and features of one embodiment can be employed with other embodiments as those skilled in the art would recognize, even if not explicitly stated. Descriptions of well-known components and processing techniques may be omitted so as to not unnecessarily obscure the embodiments of the disclosure. The examples are intended merely to facilitate an understanding of ways in which the disclosure can be practiced and to further enable those skilled in the art to practice the embodiments of the disclosure. Accordingly, the examples and embodiments should not be construed as limiting the scope of the disclosure. Moreover, it is noted that like reference numerals represent similar parts throughout the several views of the drawings.

Some of the preferred embodiments of the present disclosure are illustrated in the attached drawings. Any embodiment contained within any figure described below could be combined with another figure or an embodiment of another figure in a mix and match approach. Concepts could be conducted in parallel, series, in confluence or distributed approaches. A singular may imply a plural and vice versa. The embodiments within a figure could also be extracted to represent a concept on its own without using the figure in its entirety.

The disclosure relates, at least in part, to methods (processes), systems and apparatuses involving nutrient removal, and, in particular, mainstream deammonification under conditions of storage and use of stored material under conditions of low organic carbon, where both ammonia and nitrate are sufficiently present to encourage reactions that are a combination of autotrophic or a combination of autotrophic and heterotrophic. These nitrogen removing reactions can occur preferably in a combination of biofilm for an autotrophic reaction and suspended systems for a heterotrophic reaction. Sufficiently high food-to-microorganism ratio (F/M) mass transfer conditions can be encouraged for delivering desired storage in a selector zone within heterotrophic organisms in the form of internal storage products, including, but not limited to, for example, glycogen or polyhydroxyalkanoate, or external storage products, including, but not limited to, for example, extracellular polymeric substances.

The selector zone (or "selector stage" or "selector") can comprise a device (for example, the biofilm 103, 203, 204, discussed below) a volume or a series of volumes, or a chamber or a series of chambers in, for example, a reactor, to contain or treat contaminated water or wastewater. The selector zone can be configured to select for a particular reaction by one or more microorganisms, such as, for example, an anammox reaction, microbial-generation of storage products, a nitrate-to-nitrite conversion, ammonia oxidation, ammonia assimilation, nitrate reduction or nitrite reduction, or a redox (reduction-oxidation) reaction process, including, for example, anaerobic, anoxic or aerobic process. The selector zone can be configured to select for any of the reactions by microorganisms described in, or contemplated by, this disclosure. In various embodiments, the selector zone can include the selector 103, discussed below.

The storage selector can be operated in any redox (reduction-oxidation) reaction process, including, for example, anaerobic, anoxic or aerobic process. Cyclic or plug flow conditions can be encouraged to promote a need for storage and its use thereafter under low food-to-microorganism ratio (F/M) conditions. The reactions that involve ammonia oxidation, ammonia assimilation, nitrate reduction or nitrite reduction that can occur in biofilms can be dominated by single inorganic or organic carbon (C-1) utilizing organisms, including, for example, anammox, nitrifiers, methane oxidizers, methylotrophs or phototrophs. The reactions can constitute fast reaction(s) in the suspended phase and the aforementioned slow reaction(s) in biofilms on media or granules. The carbon source for the slower reactions (and corresponding yields) can be C-1 compounds including inorganic carbon or methane or methanol. The reaction being encouraged can include deammonification using a partial denitratation and anammox pathway under low C/N conditions. C-1 compounds include one-carbon molecules.

The disclosure relates, at least in part, to nitrification and denitrification in wastewater treatment processes considering carbon sources and electron donors in bulk anoxia. The processes for consideration can include partial reactions for nitrification or denitrification to achieve energy efficient nitrogen removal through a deammonification process. The deammonification process can combine nitrification with a possibility of denitrificiation, and then some part of an anammox reaction that removes ammonia. The deammonification process can occur through one of two pathways: 1) partial nitritation to nitrite plus anammox, or 2) partial nitrification to nitrate combined with partial denitrification (denitratation to nitrite), plus anammox (PdNA). A focus of at least some embodiments of this disclosure includes the deammonification process in the second pathway, also called deammonification in the PdNA pathway. Another focus of at least some embodiments of this disclosure includes implementation of biofilm media, such as, for example, biofilm cassettes or biofilm cages, for supporting any deammonification reaction, in either or both pathways 1) and 2) of the deammonification process.

In at least one embodiment, a process, system or apparatus can include, within the deammonification in the PdNA pathway, promotion of conditions of: feast and famine; or alternating high and low food to microorganism ratios for electron donors (or acceptors) in the bulk solution in either space (for example, continuous flow activated sludge) or time (for example, sequencing batch reactor); or, in a combination of space and time (such as, for example, a modified sequencing batch reactor), deammonification reactions partially in suspended phase and partially on biofilms (for example, grown on moving or fixed media). The faster growing organisms can, preferably, be grown in the suspended phase undergoing the alternating conditions. Nitrifying or deammonifying autotrophs or C-1 organisms can be grown on biofilms that receive sufficient electron donors/acceptors under conditions of managed mass transfer. Some C-1 organisms can be grown in suspended phase, optionally as sloughings from the biofilms or independently grown flocs. Such high F/M or feast conditions can typically occur at locations (or zones) of concentrated electron donor (such as, for example, fermentate or external carbon, or sidestream ammonia, or dissolved methane, or sulfide or elemental sulfur, or zero-valent iron or ferrous) addition. These conditions can also occur when biofilm or return activated sludge is minimized or modulated to support these conditions for high F/M that can eventually lead to storage that assists the process of deammonification via the PdNA pathway.

In at least one embodiment, the term "space" refers to a space-based approach in which a process occurs in a physical space, area, region or location in an apparatus, such as, for example, a continuous flow activated sludge process occurring in a reactor.

In at least one embodiment, the term "time" refers to a time-based approach in which a process occurs based on time, such as, for example, a process carried out in a sequencing batch reactor.

A combination of space and time is also possible such as a modified sequencing batch reactor.

In at least one embodiment, a process, system or apparatus includes an anoxic biofilm that can grow anammox in an integrated fixed-film activated sludge (IFAS) mode, such as, for example, for a partial denitrification, heterotrophically from nitrate to nitrite mainly using suspended biomass, or autotrophically on biofilms using the anammox reaction. In embodiments, the process, system or apparatus can include one or more selectors, return activated sludge, mixed liquor recycles and various sidestream flows. In at least one embodiment, the process, system or apparatus can include a bulk preanaerobic or pre-anoxic selector condition for a biological nutrient removal (BNR) process with managed high F/M bulk conditions. The F/M bulk conditions in a selector can be approximately 1 g COD/gVSS/d or 0.2 g rbCOD/gVSS/d for anaerobic conditions and preferably greater than 0.5 g COD/gVSS/d. For anoxic conditions, the loading can be much higher. Alternately, the hydraulic retention time (HRT) of the selector can be between 10 min and 2 hours to encourage storage conditions. A pre-anoxic selector will generally require a lower HRT in order of minutes and an anaerobic selector will generally require an HRT of an hour or more to encourage storage conditions. A storage reaction is generally considered complete when the readily biodegradable chemical oxygen demand (rbCOD) is nearly used up or at least 90% used up as shown by uptake or release rates of any parameter, including but not limited to electron donor, acceptor, redox or phosphorus measurements at the end of the selection zone.

State-of-the-art wastewater treatment technologies can include any of a variety of methodologies for removing, or facilitating removal of, nitrogen from wastewater, including, for example: nitrogen removal with carbon addition (for example, WIPO Pub. No. WO2018009348 A1); bypassing primary effluent to deammonification biofilms support (for example, WIPO Pub. No. WO2020076755 A1); denitrifying reactor (for example, WIPO Pub. No. WO 2006022539 A1); deep denitrification (for example, Pat. No. CN105923774); anammox porous material combined with membrane aerated biofilm reactor systems (for example, WIPO Pub. No. WO2020086407 A1); reactor and control method (for example, WIPO Pub. No. WO2014152872 A1); reactor and control method (for example, WIPO Pub. No. WO2014043547 A1); and, use of longer solids residence time organisms in granules or dense aggregates, or biofilms on suspension media (for example, WIPO Pubs., Nos. WO2014085662 A1, WO2016004082 A1, WO2014047459 A1 or WO2015179700A2).

Currently, there are no disclosed features or methods or processes that, for example, combine microbially generated carbon obtained from storage or extracellular processes to conduct part of a reaction of denitrification from nitrate to nitrite, or the remainder reaction using anammox (for example, being fed ammonia as an electron donor) within the context of partial denitrification plus anammox reaction or reactor. The disclosure provides methodologies that include, among other things, microbial generated storage products, or extracellular polymeric substances, in combination with anammox for purposes of deammonification in a partial denitrification plus anammox pathway.

In at least one embodiment, a process, a system or an apparatus is provided that can accomplish, or facilitate accomplishment of, deammonification or partial reaction primarily under a condition of bulk pre-anoxia, which is a condition that is popular and most commonly found for BNR (biological nutrient removal) processes, including an anaerobic-anoxic-aerobic (A2O) process, or an anoxic-oxic (A/O) process such as, for example, the Modified-Ludzack Ettinger (MLE) process or four stage Bardenpho process. A cascade feed approach with pre-anoxia is also possible. Here pre-anoxia is a condition where anoxia precedes an aerobic step (in space or time) either immediately or at any location before or any time before the aerobic step. Most often pre-anoxia occurs in the front of a reactor or front of time cycle. These types of pre-anoxia can be fundamental to how BNR processes are implemented, and at least one embodiment of the disclosure also provides for the deammonification in the second pathway (using PdNA) to be performed in pre-anoxia, especially in very low C/N wastewaters, while intensifying and using less chemical energy (low C/N ratio) and less electrical energy for aeration. In any instance the concept and term pre-anoxic or anoxic can be replaced by pre-anaerobic or anaerobic or constitute the combination of the two approaches.

For instance, the MLE process uses nitrate produced by an aeration zone as a source of oxygen for facultative bacteria in the breakdown of raw wastewater in an anoxic basin. In the preliminary stage of the MLE process, a pre-anoxic basin is provided where influent wastewater, return sludge from a clarifier, and nitrate-rich mixed liquor supplied from aeration tanks are mixed together. The influent provides a carbon source for the bacteria, the return activated sludge provides the microorganisms, and the anoxic recycle provides the oxygen in the form of nitrates. In at least one embodiment, a treatment process and treatment system are provided in which microbially generated carbon obtained from storage or extracellular processes can be combined with anammox for purposes of deammonification in a partial denitrification plus anammox pathway. In at least one embodiment, the microbially generated carbon obtained from storage or extracellular processes can be combined to conduct part of a reaction of denitrification from nitrate to nitrite, or the remainder reaction using anammox (for example, being fed ammonia as an electron donor) within the context of partial denitrification plus anammox reaction or reactor.

The four-stage Bardenpho process typically uses a two-stage activated sludge system to reduce nitrogen to enhanced nutrient removal (ENR) levels. In the first of these two stages, an anoxic zone is provided for denitrification followed by an aerobic zone for nitrification. Carbon provided by the raw wastewater is used for denitrification in the anoxic zone, and an internal mixed liquor recycle (IMLR) is provided from the aerobic zone to the anoxic zone to return nitrified mixed liquor at a regulated rate to ensure adequate nitrates for the heterotrophic denitrification population in the anoxic zone. In the second of these two stages, a second (or post) anoxic zone is provided for denitrification with supplemental carbon addition after the aerobic zone. In this stage, a second (or post) aerobic stage can be provided to remove excess carbon and to strip nitrogen gas from the mixed liquor to limit or prevent floating solids.

Articles by Coats et al., 2011, Winkler et al., 2011, Qin et al., 2005 and Vocks et al., propose storage using glycogen or polyhydroxyalkanoate in downstream zones under denitrifying conditions. However, none of these articles suggests the purposeful combination of storage for a first denitrification reaction from nitrate to nitrite and a second reaction using anammox in a storage PdNA format. In at least one embodiment, the disclosure provides a process and apparatus that includes 1) such storage for a PdNA reaction, 2) the management of recycles, 3) the application of selectors, and 4) the features associated with a fixed film cassette or cage implementation approach.

A value of a reaction combination (for example, as a process, system or apparatus feature or protocol) includes the availability of storage for achieving nitrogen removal in combination with anammox bacteria that are preferentially grown in low C/N conditions within any part of a reactor or reactors.

In at least one embodiment of the disclosure, biomass granules, dense aggregates or biofilms (collectively referred to hereinafter as "recyclables") can exert a higher active fraction of desirable or favorable storage or extracellular polymeric substances (EPS) producing organisms, in combination with less mobile or fixed anammox, autotrophic or C-1 biofilms, for example, located only within low C/N zones of a reactor. The more mobile organisms or more mobile biofilms can move or travel between high and low F/M zones, thereby facilitating first storage and subsequent use of stored material in the low F/M zone. In the meantime, the less mobile or fixed organisms can be focused on more localized reactions within the low F/M zones. This combination of non-localized and localized reactions is a feature of at least one embodiment of the processes, systems or apparatuses provided by this disclosure.

In at least one embodiment, the process, system, or apparatus can include algal, photo granules, or biofilms, where the storage can occur using algae or phototrophs, in which light can be the energy source in a C-1 autotrophic reaction; and, in which the stored material or EPS that is generated can then be used for partial denitrification, from nitrate to nitrite, in a downstream reactor with anammox. The phototrophs can be grown directly onto the biofilm in a separate or integrated biofilm reactor or on granules for use in the PdNA reaction.

The concept of partial denitrification with anammox as a specific feature within mainstream deammonification is an aspect of various embodiments of this disclosure. The partial reaction associated with denitrification (for example, denitratation from nitrate to nitrite) can involve the use of nitrate as an electron acceptor, and organic carbon (or carbon) as the energy source or electron donor. The electron donor of choice can include an internally generated storage compound that can be used for a partial reaction and, also, that can be combined with a subsequent anammox process. The subsequent process or system can include an autotrophic reaction of anammox (anaerobic ammonium oxidation) that can occur in a biofilm that is localized within a low carbon zone (LCZ), or low F/M zone receiving bulk mixed liquor, or, located in the last 50% of a reactor in space, time or a combination of space and time.

In at least one embodiment, a low carbon zone (or LCZ) can include a zone or area in which chemical oxygen demand is less than 100 mg/L, and a low F/M zone can include a zone or area in which the food-to-microorganism ratio (F/M) is less than 100 mg/L of chemical oxygen demand (COD) (that is, F/M<100 mg/L COD).

In at least one embodiment, a low F/M zone can include a zone or area in which an F/M comprises the removal of as much of the readily biodegradable COD that can occur in the presence of digester filtrate or centrate in the front of a reactor (for example, upstream portion of a reactor), or at the end of a pre-anoxic zone once the readily biodegradable COD is consumed.

In an embodiment, the process, system or apparatus can comprise a high F/M selector or bulk pre-anoxic process in, for example, the first half (50%) of a staged or plug flow reactor (in time or space or in combination of time and space). The organic carbon in the high F/M selector or pre-anoxic zone can include fermentate, wastewater influent carbon, primary effluent, food wastes, industrial wastes, or added substrates. The high F/M selector can, typically, occur in the front of (for example, upstream) a reactor or process. The added substrates can include, for example, wastewater carbon, food wastes, glycerol, sugars, carbohydrates, ethanol, methanol, acetate, acetic acid, etc. The substrate can include methane (such as, for example, used by denitrifying methane oxidizers) from an anaerobic reactor or process that can precede the reactor or be obtained from an anaerobic digester.

In at least one embodiment, the process, system or apparatus comprises a digester centrate, filtrate or pre-anoxic zone (in space or time) in which ammonia can be present in excess as an electron donor for anammox. In such a process, system or apparatus, the nitrate can be recycled from a downstream aerobic zone to the pre-anoxic zone in the form of a mixed liquor recycle (or also called nitrate recycle) or alternately from an aerobic process (for example, as in a step feed or prior to second anoxic zone of a Bardenpho process). Nitrate can also be produced in the bulk anoxic zone itself using a membrane aerated biofilm reactor (MABR) process.

In the case of the MABR process, air or oxygen can be supplied in an anulus of a membrane (for example, polymeric or ceramic) in the form of a tube or sheet or grid or frame. The membrane can be made from flexible or rigid polymers or even ceramics that are placed in the anoxic zone, such as, for example, a submerged or non-submerged trickling filter. In the MABR, reactions can be provided that convert the ammonia that diffuses into the biofilm to nitrate, and then with bacterial carbon (storage or EPS) or the bulk carbon (inclusive of methane or any other carbonaceous substrate) denitratate this nitrate to nitrite, in the same anoxic zone; and, finally, the nitrite can be further reduced to nitrogen gas using ammonia as the electron donor (from wastewater or anaerobic digestion return liquor).

In a preferred embodiment, a heterotrophic reaction can be included that converts nitrate to nitrite as a zero-order reaction (for example, from the Monod curve) at >1.5 times of the apparent half saturation coefficient of the organism. These heterotrophic organisms are most often flocculant (and thus are easily wasted), but can also be granular, and in a few cases can be on a biofilm construct. If an organism is grown using methane or a methylotroph, it is preferably granular or on a biofilm. The denitrifying organisms can be retained using support material such as synthetic carriers, encapsulation (in pure or mixed cultures), sand, anthracite, wood chips, stones, particulate organic material such as cellulosic or hemicellulosic or even particulate organic substrates, membrane biofilms (static or dynamic), or silicic, or any other suitable media. It could be a mix of materials. The carriers could be fixed or moving.

In other such embodiments, the denitrifying organisms in biofilms, on media, in ballasts, in flocculant, densified or in granular form can be retained using physical selectors such as a screen, cyclone, classifiers, airlift or fluidized reactor, magnetic separator or other gravimetric, flotation, membrane or filtration device. Internal pre-clarifiers (such as a two-stage clarifier for densification or granulation) can also be used. The sloughings from anoxic biofilms can be purposefully retained by these separators.

In some embodiments of the present disclosure, organisms can be bioaugmented to the reactor where the denitrification reactions are performed. The bioaugmentation can occur from side stream or streams in series or parallel to the reactor. Anammox organisms can also be bioaugmented from this reactor to other reactors, if needed in other embodiments.

The anammox organism can be collected and then transferred to other processes to perform an anaerobic ammonium oxidation reaction, which can produce both nitrogen gas and nitrate. The nitrate produced from anammox bacteria can be converted to nitrite substrate using heterotrophic bacteria. Such a reactor can comprise processes including, but not limited to, any fixed film, granular or suspended growth biological process.

In certain such embodiments, ammonia can be delivered to the reaction process as a residual from previous reactions or as a bypass stream from upstream or sidestream processes. In some such embodiments, the ammonium-oxidizing bacteria (AOB) (for example, in MABR) of anammox organisms can be retained using support material including, but not limited to, synthetic or plastic carriers, cellulosic or organic material, sand, anthracite, wood chips, stones, membrane or ceramic biofilms or encapsulated in pure or mixed cultures or any other suitable media.

In other embodiments, the anammox organisms can be retained using physical selectors including, but not limited to, screens, cyclones, hydrocyclones, airlift reactor, magnetic separator or other gravimetric, flotation or filtration devices.

In certain embodiments, the reactor or reaction process can include a dedicated anoxic zone or zones within an existing biological nutrient removal process or in an integrated or separate polishing process. In certain such embodiments, an oxidized nitrogen stream can be recycled to the anoxic zones to provide the electron acceptor. In certain embodiments, bioaugmentation of a limited amount of denitrifying organisms can be included to allow for denitratation. In yet other embodiments, the anammox reaction can occur in an anoxic biofilm in an aerated zone through diffusion limitation of oxygen within the biofilm.

The disclosure relates to the use of denitrifying organisms which can be generalist or specialist, additions including, but not limited to, anammox bioaugmentation to the denitrification reactor accomplished by retention of anammox organisms using support material or physical selectors, or an anammox reaction in an anoxic biofilm in an aeration zone. The denitratation organisms can also be bioaugnmented, if necessary. There can further exist other reactions within the spirit of the present disclosure not explicitly mentioned or described herein.

A preferred approach might be, ahead of the disclosed nutrient removal process, to achieve carbon redirection using chemically enhanced primary treatment, A-stage process, Alternating Activated Adsorption (AAA) settler/process, primary filtration, primary screening, using a dissolved air flotation process, or in-sewer treatment approaches. In some cases, a low C/N ratio of <6, and preferably <4, can be produced from C redirection, or can naturally exist in sewers because of industrial or septage discharges allowing for this disclosed process to be used with advantage. This low C/N ratio can be preferred for this process.

In another approach, using a somewhat higher C/N ratio, a much lower effluent nitrate (for example, <3 mg/L total nitrogen) and orthophosphate concentration (for example, <0.2 mg/L as $PO_4$-P) can be achieved for meeting stringent permit limits. In both these cases, the change in nutrient concentration can be highly relative to the amount of carbon used (for example, <4 g COD/g $NO_3$-N denitrated to nitrogen gas), with part of the reaction carried out using anammox bacteria in the partial denitrification—anammox (PdNA) pathway.

Anammox bacteria can use some organic electron donors or organic substrates such as, for example, volatile fatty acids, acetic acid, propionic acid, formic acid, or intermediates (such as, for example, from glycerol) for denitratation. Thus, both nitrate reduction and ammonium oxidation can be performed by anammox organisms.

Carbon sources for denitratation can include influent wastewater fermentate (including from and not limited to alkaline fermentation), hydrolysate (alkaline, acid, thermal) from sludge treatment, glycerol, methanol, glycols, ethanol; volatile fatty acids including but not limited to acetate, acetic acid; carbohydrates including but not limited to sugars, starch, or cellulose, wastewater carbon, carbon from industrial waste or manufacturing byproducts, methane, aldehydes or ketones; and any inorganic electron donor such as sulfurous or ferrous sources.

In at least one embodiment, the wastewater treatment apparatus can include a biological nitrogen removal reactor having a volume or a series of volumes as a plug flow. The apparatus can include a sequencing batch reactor, a modified sequencing batch reactor (with sequenced clarifiers), an upflow reactor with integrated decanters or clarifiers on top, a downflow reactor, a completely mixed reactor or any form typically used for biological wastewater treatment using an activated sludge process. In the case of a sequenced alternating clarifier, the biofilm can be optionally placed in the clarifier.

In an embodiment, the apparatus reactor can be optionally equipped for dosing electron donor or organic substrate in one or more volumes. The apparatus reactor can be equipped with an oxidized nitrogen sensor for generating an oxidized nitrogen signal such as nitrate, nitrite, nitrous oxide, nitric oxide or combination thereof. The apparatus reactor can be equipped with an ammonia sensor to sense ammonia concentration in the reactor and generate an ammonia signal.

In an embodiment, a sufficient substrate concentration gradient for facilitating diffusion-supply into the core of biomass solids plugflow characteristics should be supported as much as possible. Plugflow characteristics are ruled by both reactor geometry and by applied recycle-rates:

Stretched tank-geometry of a length-width-ratio of larger than 3, preferably larger than 5 promote plug-flow.

Total recycle-rates (Qrec=Qras+Qimlr) should be less than the influent flow-rate (Qrec/Qinf <100%).

In case recycle-rates need to be higher in order to achieve sufficient N-removal efficiency, the IMLR should be introduced downstream of the RAS-introduction point. Then total recycle rates should be targeted below 300% and preferable below 200%, with e.g. Qras/Qinf <75% and Qimlr/Qinf <125%.

The electron donor (including organic, inorganic or photo) that are used by organisms and result in the formation of storage products or EPS (collectively called "storage") can be used for denitratation. The storage carbon can be internal or external and can constitute glucose chains such as glycogen or other carbohydrates, PHA, proteins or any material that the organism produces in surplus for use by the same or other organisms later. The storage element or compound can be inorganic, such as sulfur or iron or other compounds that can change their oxidative states to release electrons.

FIG. 1 shows an example of nitrogen reactions, according to the principles of the disclosure, that can be carried out in preferred embodiments of the present disclosure. An energy donor addition can control the reduction of nitrate to nitrite, whereafter anammox bacteria compete for the nitrite to oxidize ammonium to nitrogen gas. Denitratation is referred to as the reduction from nitrate to nitrite, whereas denitritation is referred to as the reduction of nitrite to nitrogen gas. Within the present disclosure, minimization or prevention of denitritation kinetically using the heterotrophic pathway or by competition from anammox is preferred.

Maximization of Reaction 1 (nitrate to nitrite) and Reaction 2 (ammonium+nitrite to nitrogen gas) are aimed for, and can be achieved by, optimization of electron donor addition, nitrate residual, ammonium residual and/or solids retention time (SRT). Reaction 3 (nitrite to nitrogen gas) and Reaction 4 (aerobic ammonium oxidization to nitrite or nitrate) can be managed to meet effluent treatment requirements and/or nitrite availability within a process, system or apparatus. In various embodiments, Reactions 1, 2, and/or 3 can be carried out in a processor 101, discussed below.

Figure 2:
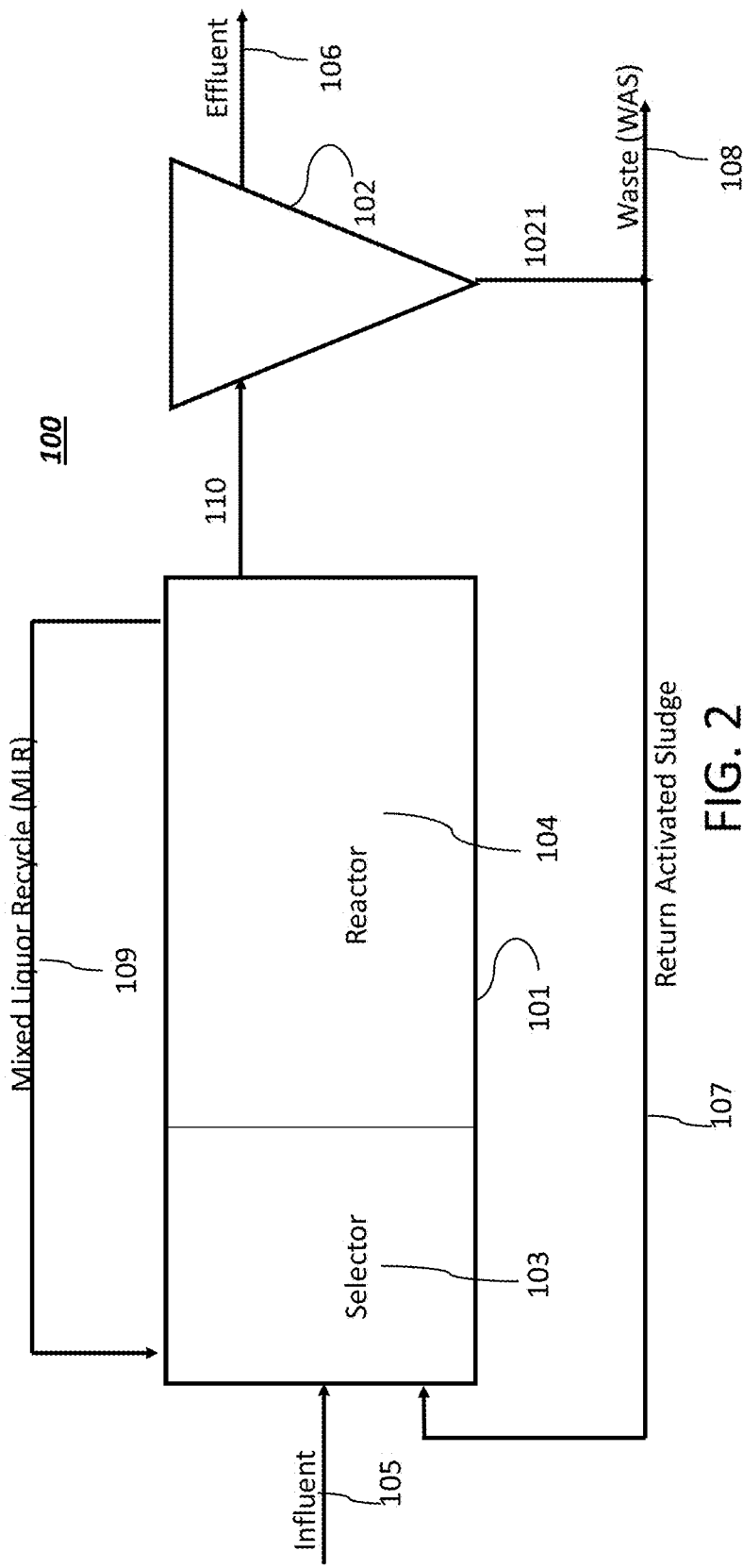
FIG. 2 depicts an embodiment of an activated sludge process and system having a pre-anoxic zone.

FIG. 2 shows an embodiment of treatment process and treatment system 100 that includes a pre-anoxic zone and a nitrate recycle (MLR), according to the principles of the disclosure. The treatment system 100 can include a processor 101 and a separator 102. The processor 101 can include one or more inlets (or inputs), a selector 103, a reactor 104, and one or more outlets (or outputs). The processor 101 can be configured to receive an influent via an influent conduit 105 at a first input and treat the influent by the selector 103 and reactor 104.

The influent received via influent conduit 105 can include, for example, a solid-liquid mixture containing soluble organic and inorganic contaminants and particulate materials. The influent can be received from an external source (not shown) such as, for example, a sewage system. The treatment system 100 can include a pretreatment system (not shown) that is configured to receive wastewater from the sewage system and process the wastewater in one or more pretreatment stages, including, for example, a bar screen (not shown) configured to remove larger objects such as cans, rags, sticks, plastic packets, and the like, from the wastewater; a pretreatment chamber (not shown) containing, for example, a sand or grit chamber or channel configured to adjust a velocity of the incoming wastewater and thereby allow the settlement of, for example, sand, grit, stones, broken glass, and the like; a tank for removal of, for example, fat, grease, and the like; or a primary separator, such as, for example, a clarifier tank, or a sediment tank, for gravity settling. The primary separator can include a chemical or ballast material that is added to improve solids removal. The resultant solid-liquid mixture containing soluble organic and inorganic contaminants and particulate materials can be output from the pretreatment system (not shown) and fed, directly or indirectly, via the influent conduit 105 to the processor 101.

The processor 101 can include, for example, a selector, a reactor, a biological reactor (bioreactor), a membrane bioreactor (MBR), a MABR, a moving bed bioreactor (MMBR), a sequential biological reactor, a sequencing batch reactor, a bulk reactor, a column reactor, an airlift reactor, a fluidized reactor, a specialty purpose-built reactor, an aerobic reactor, an anaerobic reactor, an anoxic reactor, or a reactor tank. The processor 101 can include one or more reactor zones, including, for example, a pre-anoxic zone, a preaerobic zone, a preanaerobic zone, an aerobic zone, an anaerobic zone, or an anoxic zone.

The processor 101 can include, for example, the reactor disclosed in U.S. Pat. No. 9,670,083, titled "Method and Apparatus for Wastewater Treatment Using External Selection," the disclosure of which is hereby incorporated herein in its entirety.

The processor 101 can include, for example, the reactor disclosed in U.S. patent application publication no., US 2018/0009687, titled "Method and Apparatus for Nutrient Removal with Carbon Addition," the disclosure of which is hereby incorporated herein in its entirety.

The processor 101 can include one or more inputs and one or more outputs. In at least one embodiment, the processor 101 is configured to receive the influent, from the influent conduit 105, at a first input, a mixed liquor recycle (MLR) stream via an MLR conduit 109 at a second input, and a return activated sludge (RAS) stream via a RAS conduit 107 at a third input. In an embodiment, the first, second or third input of the processor 101 can be connected to, or form any portion of, the selector 103.

The processor 101 can be configured to output the MLR stream to the MLR conduit 109 at a first output and a solid-liquid mixture, at a second output, to a solid-liquid mixture (SLM) conduit 110.

In at least one embodiment, the selector 103 is a part of the processor 101. In an embodiment, the selector 103 can include a reactor zone in the processor 101. The selector 103 can include a chamber, space, region, area, or location in the selector 103. In an embodiment, the selector 103 can be provided as a separate apparatus that can be located in the processor 101, or located external to the processor 101, such as, for example, in front of, or upstream of, the processor 101.

The selector 103 can include, for example, a pre-anoxic zone, an anoxic zone, an aerobic zone, an anaerobic zone, a high F/M (food-to-microorganism ratio) zone, a biofilm, a biofilm reactor, an IFAS mode selector, a volume or a series of volumes, or a chamber or a series of chambers configured to select for a particular reaction by one or more microorganisms, including for example, an anammox reaction, microbial-generation of storage products, a nitrate-to-nitrite conversion, ammonia oxidation, ammonia assimilation, nitrate reduction or nitrite reduction, or a redox (reduction-oxidation) reaction process, including, for example, anaerobic, anoxic or aerobic process.

The reactor 104 can include, for example, a bioreactor, a membrane bioreactor (MBR), an MABR, a moving bed bioreactor (MMBR), a fixed-bed reactor, an electro-biochemical reactor (EBR), a hollow fiber bioreactor, a batch reactor, a bulk reactor, a fed batch reactor, a continuous reactor, a continuous stirred-tank reactor, or an apparatus or system that can support a biologically active environment. The reactor 104 can be configured to carry out any one or more of the processes provided by this disclosure, including, for example, a treatment process such as, for example, a suspended growth activated sludge process, a granular process, an integrated fixed-film activated sludge process, a biological nutrient removal process, an aerobic digestion process, or an anaerobic digestion process.

The separator 102 can include, for example, a clarifier, a lamella clarifier, a dissolved air flotation device, a screen, a filter or a classifier. The separator 102 can have any shape, including, for example, rectangle, circle, semi-circle, sphere, semi-sphere, cone, ellipse, or any practical shape, depending on the particular application.

The influent conduit 105, RAS conduit 107, MLR conduit 109, or SLM conduit 110 can include any one or more of, for example, a pipe, a pump, a vacuum, a valve, a manifold, or an apparatus that can be configured to supply or control an aspect of, for example, a solid material, a liquid material or a solid-liquid mixture between two or more locations. Any one or more of the conduits 105, 107, 109 or 110 can include a control mechanism (not shown) for controlling aspects of the material supplied between the two or more locations, such as, for example, pressure, temperature, density, mass density, weight density, velocity, flow rate, quantity, volume, specific volume, specific gravity, viscosity, or specific enthalpy.

In various embodiments, the conduits 105, 107, 109 or 110 can be configured to supply its contents to one or more inputs (or inlets) to the processor 101, and to control aspects of the content delivery to the one or more inlets, including, for example, the amount of the portion of content supplied to any inlet.

The separator 102 can include a density-based selector such as, for example, a cyclone, a hydrocyclone, or a centrifuge. The separator 102 can include, for example, the gravimetric selector 11 described in U.S. Pat. No. 9,242,882, titled "Method and Apparatus for Wastewater Treatment Using Gravimetric Selection," the disclosure of which is hereby incorporated herein in its entirety, or the gravimetric selector 260 described in U.S. Pat. No. 9,670,083.

The separator 102 can include, for example, a lamella, a clarifier tank, a sediment tank, a clarifier, a classifier, a screen, a filter, a membrane or any compact apparatus capable of size-based or compressibility-based particle selection. The separator 102 can include a size-based or compressibility-based selector such as, for example, the gravimetric selector 260 or membrane apparatus 10 described in U.S. Pat. No. 9,670,083.

In an embodiment, the separator 102 includes an inlet that can be configured to receive the solid-liquid mixture, via the SLM conduit 110, from the processor 101, and a pair of outlets, including: a first outlet configured to output an effluent via an effluent conduit 106; and, a second outlet configured to output an underflow or return activated sludge (RAS) via a conduit 1021. A portion of the RAS in the conduit 1021 can be separated and returned in the RAS stream, via the RAS conduit 107, to the processor 101 and the remaining portion of the RAS can be output as waste activated sludge (WAS) via a WAS conduit 108. The WAS conduit 108 can be supplied, for example, to waste or solids handling (not shown).

In an embodiment, the processor 101 can include a modified Ludzack-Ettinger process (MLE). The pre-anoxic zone can take advantage of influent 105 wastewater carbon to promote heterotrophic denitrification with nitrate provided in a recycle stream, such as, for example, the MLR stream 109. The MLR ratio can range from about 50% to about 500%, or greater.

In other embodiments, the processor 101 can include processes other than MLE, such as, for example, using the pre-anoxic zone with a nitrate containing mixed liquor recycle (NRCY) or intermediate or internal mixed liquor recycle (IMLR) or (MLR). In such embodiments, the MLR can be taken from an aerobic zone, reaeration zone or even a downstream portion of a bulk anoxic zone in the processor 101 (for example, in the reactor 104), as needed to supply nitrate. The terms NRCY or IMLR or MLR can be interchanged in use within this entire disclosure. The aerobic zone can be configured to oxidize ammonia to nitrate, which can be minimized based on ammonia oxidation performance in the anoxic zone.

In embodiments of the treatment process and treatment system, the implementation or application of, or the location or installation of, one or more biofilms can be selected, or multiple biofilms variously interchanged or co-mingled (within separate or single media) by changing for example the addition points of the IMLR (for example, MLR conduit 109, influent conduit 105, or RAS conduit 107). The location of biofilm and recycles (for example, inputs from conduits 105, 107, 109) can prioritize provision of sufficient mass transfer gradients of substrates (such as, for example, ammonia for MABR nitrifying biofilm, ammonia+nitrite for anammox biofilm, or ammonia+nitrite for combined biofilms) consumed by the biofilm(s).

In at least one embodiment, the treatment process and treatment system comprise a bulk anoxic preferential application of much or all of the IMLR upstream (for example, via the MLR conduit 109) of much or all of the RAS stream (for example, via the RAS conduit 107) with one or more biofilms placed in between these streams, in order to supply high concentration of nitrate for denitratation and for anammox on the biofilm being supplied high concentration gradients of nitrite and ammonia (from the influent, fermentate, digestate liquors or other sources). A goal of an embodiment of the treatment process and treatment system can include managing recycle streams, for example, via the RAS conduit 107 and/or the MLR conduit 109, to maintain or control enough nitrate concentration while providing sufficient suspended biomass for the required partial denitrification (denitratation).

In at least one embodiment, the use and location of IMLR supplied via the MLR conduit 109 can trace the location of the deammonification biofilm (for example, biofilm 203, discussed below). As an option, a nitrate sensor (not shown) can be included in the processor 101 (or the MRL conduit 109) to control the IMLR addition to the selector 103 such that it is not nitrate limiting (for example, >0.5-2 mg/L as $NO_3$-N) while minimizing dilution. An ammonia sensor (not shown) can be included in the processor 101 (or the influent conduit 105) to control the influent addition either upstream or downstream of the biofilm.

In at least one embodiment, the use and location of influent provided via the influent conduit 105 can trace the location (for example, in the selector 103) of carbon need that is associated with denitratation in the processor 101.

In at least one embodiment, the use and location of the RAS input to the processor 101 (via the RAS conduit 107) can be configured to manage suspended biomass activity while managing mass transfer, such as, for example, by minimizing substrate dilution.

Embodiments of the treatment process or treatment system can be implemented for any biological nitrogen or phosphorus removal approach in which pre-anoxic condition can occur. In various embodiments of the treatment process and treatment system, the selector 103 includes pre-anoxic process or pre-anoxic zone that can be located, for example, in a process or zone preceding any downstream aerobic, reaeration, or another anoxic process or zone, or even an anaerobic process or zone. The selector 103 can be configured, advantageously, to receive influent wastewater containing carbon, either raw or processed. In at least one embodiment, this approach can be included for a step feed, Bardenpho second anoxic stage, or any other process as a special case where an IMLR can be avoided. An important advantage of the selector 103 is its ability to use organic carbon favorably for heterotrophic denitrification before exposing it to a downstream aerobic process in, for example, reactor 104, which can be considered wasteful and not carbon efficient.

In an embodiment using IMLR, the pre-anoxic zone (selector 103) can receive nitrate recycled from a downstream zone with carbon, such as, for example, via the MLR conduit 109, or fermentate from the influent, for example, received via the influent conduit 105. In a step feed arrangement, the influent can be stepped into two or more pre-anoxic zones, and the nitrate can be produced by a preceding aerobic zone. In an embodiment, in the second anoxic of a Bardenpho approach, stored carbon such as polyhydroxy alkanoate (PHA), processed from influent wastewater or fermentate, can be a source of organic carbon.

In a pre-anoxic embodiment, an input to the processor 101 supplied by the RAS conduit 107 can be preferentially stepped to allow for biofilm nitrate concentration gradients when an IMLR is present.

The pre-anoxic PdNA process can occur in space or time, for sequencing batch reactors (SBRs), plug flow reactors, staged reactors or any approach feasible for using activated sludge concepts along with biofilms. In one SBR approach, the PdNA occurs in a pre-biofilm tank or zone that is separately fed partial RAS and influent.

An internal or external size-based, compressibility-based, or density-based separation device can be included in the treatment process or treatment system to complement or supplement any or all of the approaches for PdNA or PNA. The separation device can include, for example, the gravimetric selector 11 described in U.S. Pat. No. 9,242,882, or the gravimetric selector 260 or membrane apparatus 10 described in U.S. Pat. No. 9,670,083. The treatment process or treatment system can include other gravity or density-based separation devices, such as, for example, classifiers, air lift or upflow reactors.

In at least one embodiment, a biofilm approach comprising one or more biofilms is included in an anoxic step or zone in the processor 101. The biofilm approach can include maintaining one or more of the biofilms as a thin biofilm. The sloughing of biofilms can be managed in a manner using sensors to maintain the lowest achievable nitrate concentration, such as, when biomass is not limiting. This mass transfer limited control can seek to manage nitrate concentration based on a combination of factors, including sloughing of the biomass, with a preferred nitrate concentration of about 0.5-2 mg/L, especially under carbon limited conditions. In such mass transfer limited systems, maintaining excessive biomass on biofilms can be counterproductive as the microorganisms may seek to complete the denitrification reactions to the suspended growth where mass transfer is typically not limited. Unfortunately, the consummation of the entire denitrification reaction heterotrophically will typically use up the limited carbon available with a somewhat higher nitrate endpoint.

The biofilm approach can include any one or more of the biofilm 203 (for example, shown in FIGS. 3-12, 14) or the biofilm 204 (for example, shown in FIGS. 5, 8, 9 and 12-14). The biofilm can include, for example, the carrier 200 having a biofilm system described in U.S. Patent Application Publication No. US 2019/0263696, titled "Apparatus and Method for Biofilm Management in Water Systems," which is hereby incorporated herein in its entirety. The biofilm 203 (or biofilm 204) can include a single biofilm or a plurobiofilm, for example, as described in US 2019/0263696. Embodiments of the treatment process and treatment system can be configured to control or maintain a biofilm mass, biofilm volume, biofilm density, biofilm thickness, hydraulic retention time or solids residence time by at least one of a physical process, a biological process or a chemical process, as described in US 2019/0263696.

The biofilms 203 or 204 can include, or can be configured to grow, microorganisms such as, for example, bacteria, mold, fungi, protozoa (for example, amoebae, *flagellates*, or ciliates), algae, metazoa (for example, rotifiers, namatodes, or tardigrades), or prokaryotes (for example, alphaproteobacteria, betaproteobacteria, gammaproteobacterial, bacteroidetes, or actinobacteria). The microorganisms can be grown or selected to remove carbon or nutrient from the water by employing various metabolic or respiratory processes. Biodegradable organic material can be biochemically oxidized by, for example, heterotrophic bacteria under aerobic conditions, or under anaerobic conditions by, for example, methanogenic archaea. In various embodiment, the biofilm can be configured to include a biofilm system for removing constituents from water, including, for example, wastewater. The biofilm can include a biofilm system that facilitates or carries out biodegradation of constituents in the treatment process and treatment system.

The biofilms 203 or 204 can include a structured or unstructured community of microorganisms, which can be encapsulated within or attached to, for example, a self-developed polymeric matrix, and adherent to a living or inert surface or material. The biofilm can include a monobiofilm or a plurobiofilm system. The monobiofilm consists of a single biofilm. The plurobiofilm system includes two or more biofilms that can be arranged in series, in parallel, or any combination of in series and in parallel, or in a tributary or a distributary configuration. The plurobiofilm can have two or more media surfaces carrying different biofilm masses, volumes, densities, thickness ranges, or solids residence times. The plurobiofilm can include a sheltered biofilm or an unsheltered biofilm. The plurobiofilm can include both sheltered and unsheltered biofilms. The plurobiofilm can include sheltered, partly sheltered or unsheltered surfaces to grow biofilms for the removal of constituents such as, for example, carbonaceous material, nutrients, organic compounds, inorganic compounds, micropollutants, or nanopollutants. The biofilm system can include a low diffusion biofilm. Diffusion can include transport that can result from random molecular motion and, at some point close to the microorganism cell level, diffusion can become critical for moving solutes toward or away from cell surfaces. Diffusion can be a dominant transport process within cell aggregates. The biofilm system can provide solids retention times (SRT) needed for degradation of constituents.

The biofilm 203 or the biofilm 204 can support anammox bacteria that can use the ammonia in the influent and nitrite, which, for example, can be converted from nitrate in the recycle. Both can be available at high concentrations to not only address any mass transfer limitations in the biofilm 203 or the biofilm 204, but also to maximize the deammonification reaction.

An aspect of the disclosure includes implementing sloughings retained using an external selector to manage mass transfer limitations. These suspended sloughings will likely have lower diffusion resistance relative to the biofilm itself. Here, the biofilm 203 or the biofilm 204 can be an optional source of biomass that is sloughed off for furthering the reactions that would otherwise be mass transfer limited.

In embodiments of the treatment process and treatment system, the sloughing of biofilms can help maintain lower nitrate where biofilm biomass is not limiting by moving the reaction more clearly into the PdNA pathway. In the presence of a density or screen selector, a dual advantage can be achieved, to not only manage the biofilm mass transfer limitation, but also to make use of the inherently lower mass transfer limitations within the sloughings retained in the suspended phase in a productive way creating a virtuous cycle thereabout. Embodiments of the disclosure allow a practitioner to manage mass transfer limitations by managing and maximizing autotrophic anammox reactions in the biofilm, as well as to opportunistically manage the autotrophic anammox reaction in the suspended phase. Such approaches can help maintain nitrate (or Nox) concentrations less than 5 mg/L and preferably less than 2 mg/L in a carbon limited system.

In embodiments of the treatment process and treatment system, nitrate greater than 0.5-1.5 mg/L can be achieved to ensure a partial pathway is activated; and, once the partial pathway has been activated, the nitrate or Nox can be pushed down as low as possible by addressing anammox mass transfer limitations and to prevent or limit the consummation of nitrate to nitrogen gas using organic carbon purely in the heterotrophic pathway.

In at least one embodiment, the treatment process and treatment system include a bandwidth (or deadband) approach to manage the nitrate concentration. The lower deadband of about 0.5-1.5 mg/L range seeks to develop the partial reaction from nitrate to nitrite, while the upper deadband range of approximately 1.5-5 mg/L seeks to manage both the nitrate consumption, but also the mass transfer using various means, including management or recycles, substrates (including organic carbon), biofilm thickness, and the retention of sloughings.

In one approach the mass transfer conditions are managed using effervescence for mixing rather than oxygen transfer using an effervescent generator device (for example, 1505, shown in FIGS. 18A and 20) maintained at a hydrostatic head with a defined volume that is released at periodic intervals range of 30s to 120s to manage or refresh the solid-liquid mass transfer interface in the vicinity of the biofilm. The same apparatus can also be used to slough biofilm, at a duration of once or twice a day or thereabouts. The effervescence can include, for example, large (or big) gas bubbles generated by the effervescent generator. The gas bubbles can be configured to expand as they rise in the liquid in the reactor 101.

Figure 3:
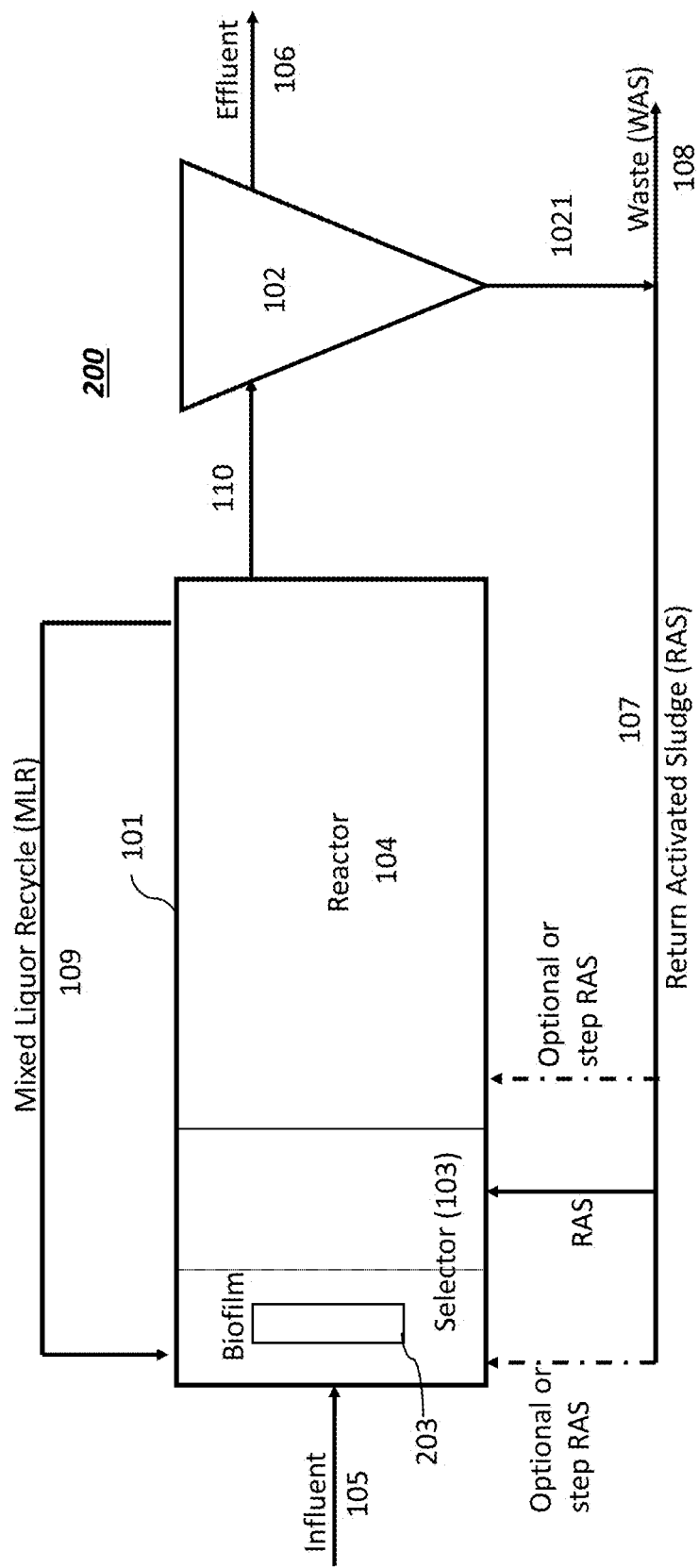
FIG. 3 depicts an embodiment of a treatment system comprising a combination of a pre-anoxic process and an anoxic biofilm process.

FIG. 3 shows embodiments of a treatment process and treatment system 200, including various locations for supplying the RAS stream (in the RAS conduit 107) to the processor 101, according to the principles of the disclosure. In the embodiments depicted in FIG. 3, the selector 103 includes a pre-anoxic zone with NRCY or IMLR, and the biofilm 203.

As depicted, in at least one embodiment an outlet of the RAS conduit 107 can be connected to a front location of the processor 101 (or selector 103), which can be upstream of the biofilm 203.

In another embodiment, the outlet of the RAS conduit 107 can be connected to another location of the processor 101 (or selector 103), which can be downstream of the biofilm 203.

In yet another embodiment, the outlet of the RAS conduit 107 can be connected another location of the processor 101 (for example, reactor 104), which can be downstream of the selector 103.

The biofilm 203 can include, for example, a fixed media biofilm or a moving media biofilm that receives a high food-to-microorganism ratio (F/M) by managing, modulating or preferably bypassing the return activated sludge (RAS) in the RAS conduit 107 to a location downstream of the anoxic zone in the processor 101. The IMLR can provide the suspended bacteria for denitratation without additional dilution from the RAS stream in the RAS conduit 107. This approach can provide a more concentrated nitrate stream for partial denitratation.

In embodiments of the treatment process and treatment system, the RAS stream can be moved or applied, partly or wholly, downstream of the pre-anoxic biofilm 203, as depicted by the broken lines in FIG. 3. Additionally (or alternatively), the RAS stream can be modulated or controlled, for example, by the conduit 107.

In at least one embodiment, the RAS bypass of anoxic biofilm 203 can be set as high as 100%, or as low as 10%, with a preference of 100% bypass. A RAS bypass range of 50-100% bypass or 80-100% bypass is also contemplated. The RAS bypass can occur to a downstream anoxic reactor zone (not shown), aerobic reactor zone (not shown), or a combination of the anoxic and aerobic reactor zones in the processor 101.

Figure 4:
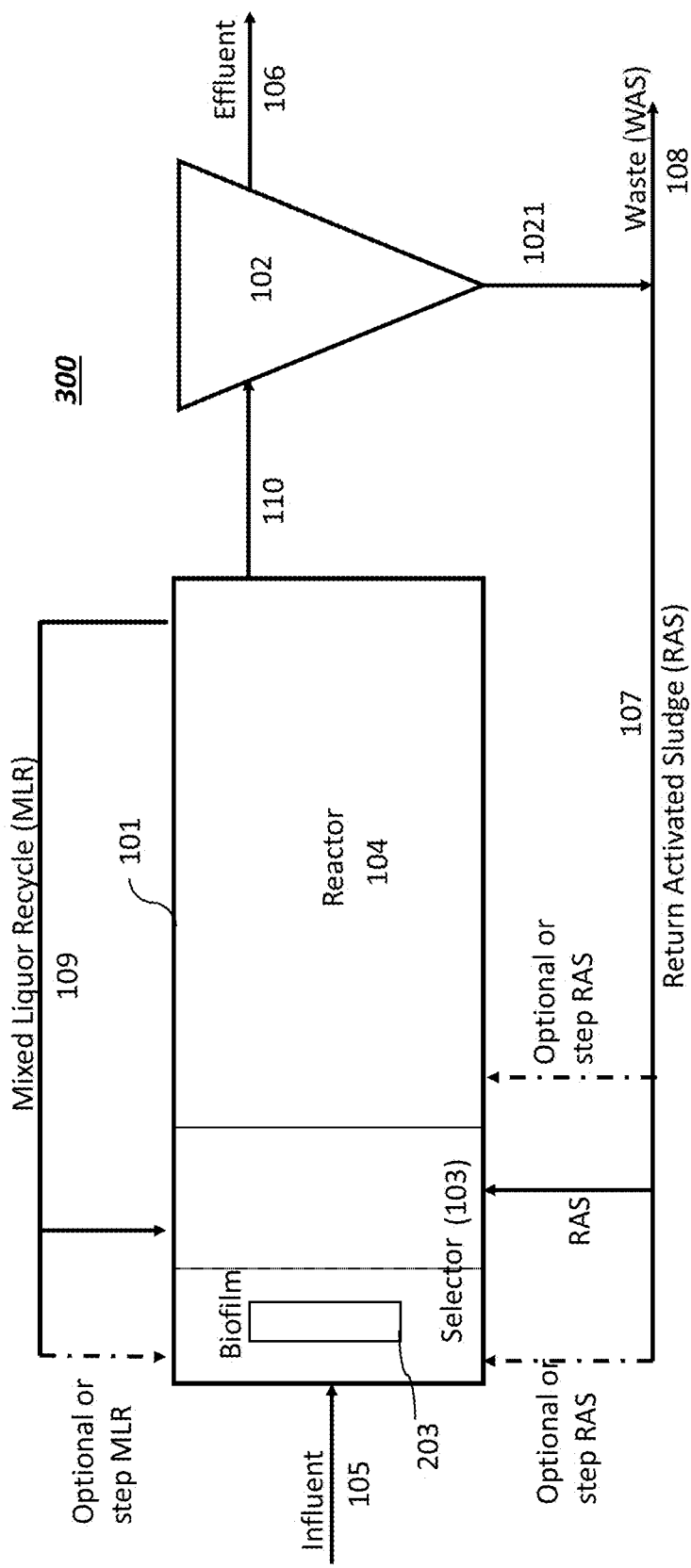
FIG. 4 depicts an embodiment of a treatment system comprising a pre-anoxic process and a membrane aerated biofilm process.

FIG. 4 shows embodiments of a treatment process and treatment system 300, constructed according to the principles of the disclosure. The embodiments depicted in FIG. 4 are similar to those depicted in FIG. 3, except that the treatment process and treatment system 300 include further embodiments comprising varied application of the IMLR with respect to processor 101, including the biofilm 203 (anoxic biofilm). The embodiments include, for instance, inputting the MLR stream to the selector 103, via MLR conduit 109, upstream (or before) or downstream (or after) the biofilm 203.

In an embodiment, the RAS stream and MLR stream can be input to a downstream location of the biofilm 203 to provide high concentrations of ammonia for a membrane aerated biofilm reactor (MABR) to be applied for ammonia oxidation to nitrite or nitrate. Here, the same biofilm 230 can perform the anammox reaction using either the partial nitritation/anammox and/or partial denitratation/anammox pathways. By adjusting the location(s) of the inputs of RAS stream and MLR stream to the processor 101, the treatment process and treatment system can, for example, control the partial application of the RAS stream (via RAS conduit 107) upstream of the MABR with a bypass of the biofilm 203, achieving a RAS bypass of as high as 100% and as low as 10% with a preference of 100% bypass. A RAS bypass range of 50-100% bypass or 80-100% bypass is also contemplated.

In an embodiment, the RAS stream can be adjusted (via the RAS conduit 107) such that the RAS bypass can occur to the downstream anoxic reactor zone (not shown), aerobic reactor zone (not shown), or a combination of the anoxic and aerobic reactor zones in the processor 101.

In an embodiment, the biofilm media can be made of synthetic or plastic carriers, cellulosic or organic material, sand, anthracite, wood chips, stones, membrane or ceramic biofilms or encapsulated in pure or mixed cultures or any other suitable media.

In an embodiment, the IMLR can be applied, via the MLR conduit 109, upstream of the biofilm 203, as depicted by the broken line in FIG. 4. The IMLR can supply additional nitrate for growth of additional anammox and additional denitratation in that zone.

In at least one embodiment, the biofilm 203 can include at least two types of biofilms within a single zone in different biofilm media, or in a single biofilm media. The biofilm media can include, for example, a cage, a cassette or a filter comprising a biofilm. The at least two types of biofilms can include an MABR biofilm and an anoxic biofilm. A nitrification reaction can occur on the MABR biofilm, and an anammox reaction, using ammonia and nitrite, can occur on the anoxic biofilm, which can be placed in the same or a different biofilm media (or cage). The biofilm media can include, for example, one or more polymers, and can be intertwined or interspersed as needed.

In an embodiment, the MABR biofilm can represent between 10-50% of overall biofilm in a two-biofilm media. The nitrifying reactions can have as much as 3 to 5 times faster kinetics than the anammox reactions, thus needing less biofilm surface or conversely, anammox needing more biofilm surface. This mixed fixed biofilm media can be included in other embodiments of the disclosure. An advantage of this approach is that it uses less of the more expensive MABR biofilm media without becoming ammonia mass transfer limiting.

Figure 5:
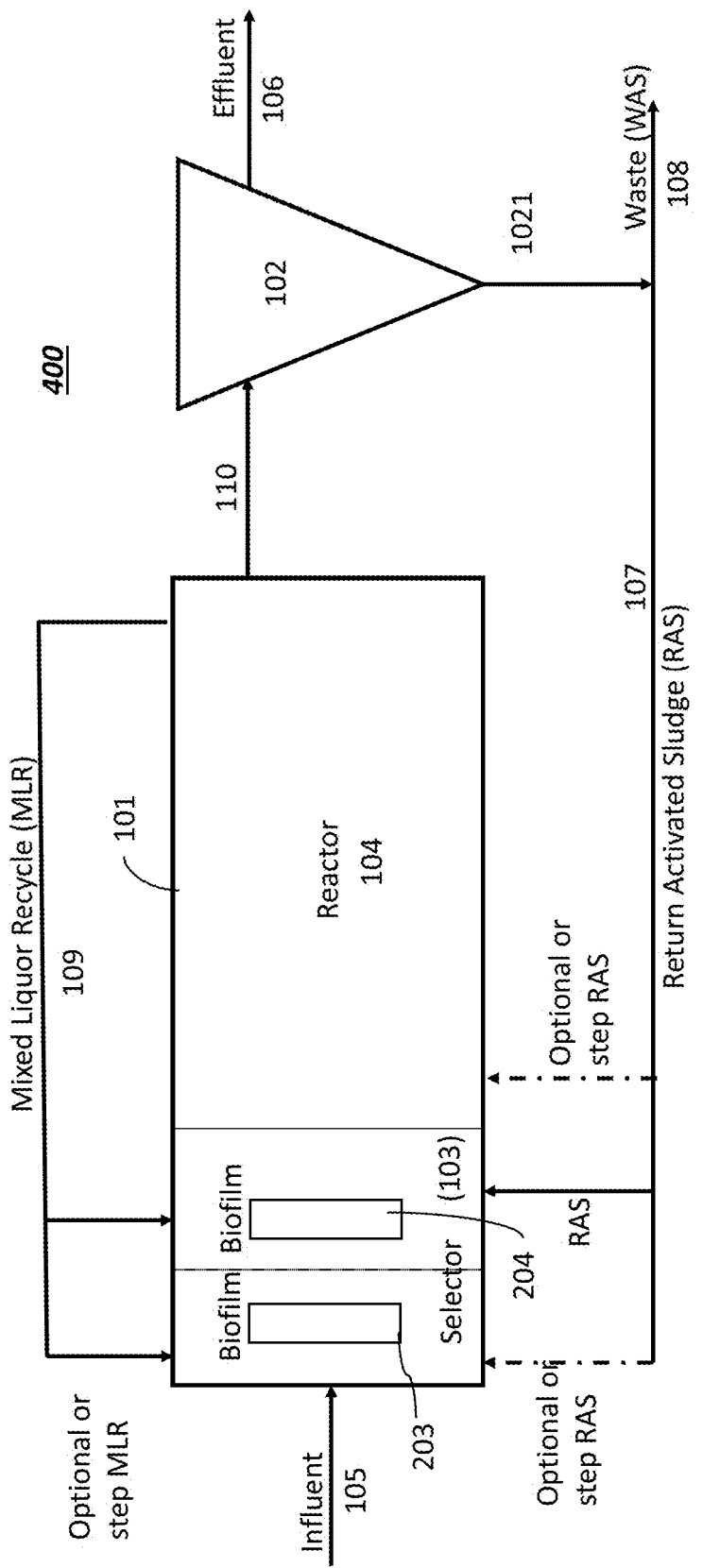
FIG. 5 depicts an embodiment of a treatment system comprising a pre-anoxic process and a combination of anoxic biofilm and membrane aerated biofilm in series or intermixed.

FIG. 5 shows embodiments of a treatment process and treatment system 400, constructed according to the principles of the disclosure. The embodiments depicted in FIG. 5 are similar to those depicted in FIG. 4. The embodiments of the treatment process and treatment system 400 can include a second biofilm 204 in the selector 103. The biofilm 203 and the biofilm 204 can include different types of biofilm. The biofilms 203 and 204 can be separated by location within bulk anoxia in the selector 103. The biofilms 203, 204 can include, for example, an anammox biofilm and a MABR biofilm.

In an embodiment, the IMLR provides suspended bacteria for denitratation without additional dilution from the RAS stream. The approach can provide a more concentrated nitrate stream for partial denitratation, than might otherwise be possible.

The biofilm 203 can support anammox bacteria that uses ammonia in the influent supplied via the influent conduit 105 and nitrite, which can be converted from nitrate associated with the IMLR recycle, supplied via the MLR conduit 109. Both can be available at high concentrations to not only address any mass transfer limitations in the biofilm 203 but also to maximize the deammonification reaction.

In one or more embodiments, the RAS stream can be moved or applied or controlled, partly or wholly, via the RAS conduit 107, with respect to either or both the biofilm 203 and the biofilm 204. In an embodiment, the RAS stream can be moved, applied or controlled, partly or wholly, downstream of the pre-anoxic biofilm 203, as depicted by the broken lines in FIG. 5. Various embodiments of modulating or controlling the RAS stream via the RAS conduit 107 are contemplated by this disclosure. The RAS bypass of the anoxic biofilm 203 can be as high as 100% and as low as 10% with a preference of 100% RAS bypass. A range of 50-100% RAS bypass or 80-100% RAS bypass is also contemplated.

The RAS bypass can occur to the downstream anoxic reactor zone (not shown), aerobic reactor zone (not shown) or a combination of the anoxic and aerobic reactor zones in the processor 101, for example, in the reactor 104.

The second, downstream, biofilm 204 can include a MABR approach that converts ammonia not already used for deammonification to be further nitrified on the MABR and then denitrified, either in anoxic suspension or by the anammox optionally grown on the same MABR biofilm.

In various embodiments, the upstream versus downstream location of the anammox biofilm 203 and MABR biofilm 204 can be interchanged as needed by simply adjusting and controlling the input locations of IMLR, RAS and influent streams via the MLR conduit 109, RAS conduit 107 and influent conduit 105, respectively, as needed to prioritize provision of sufficient mass transfer gradients of desired substrates (ammonia and nitrite) consumed by the biofilms 203 and 204, which can be variously moving or fixed.

In an embodiment, a single MABR biofilm can support both the nitrifying and anammox biofilms on a single media (not shown), which can be collectively referred to as a deammonifying biofilm.

Figure 6:
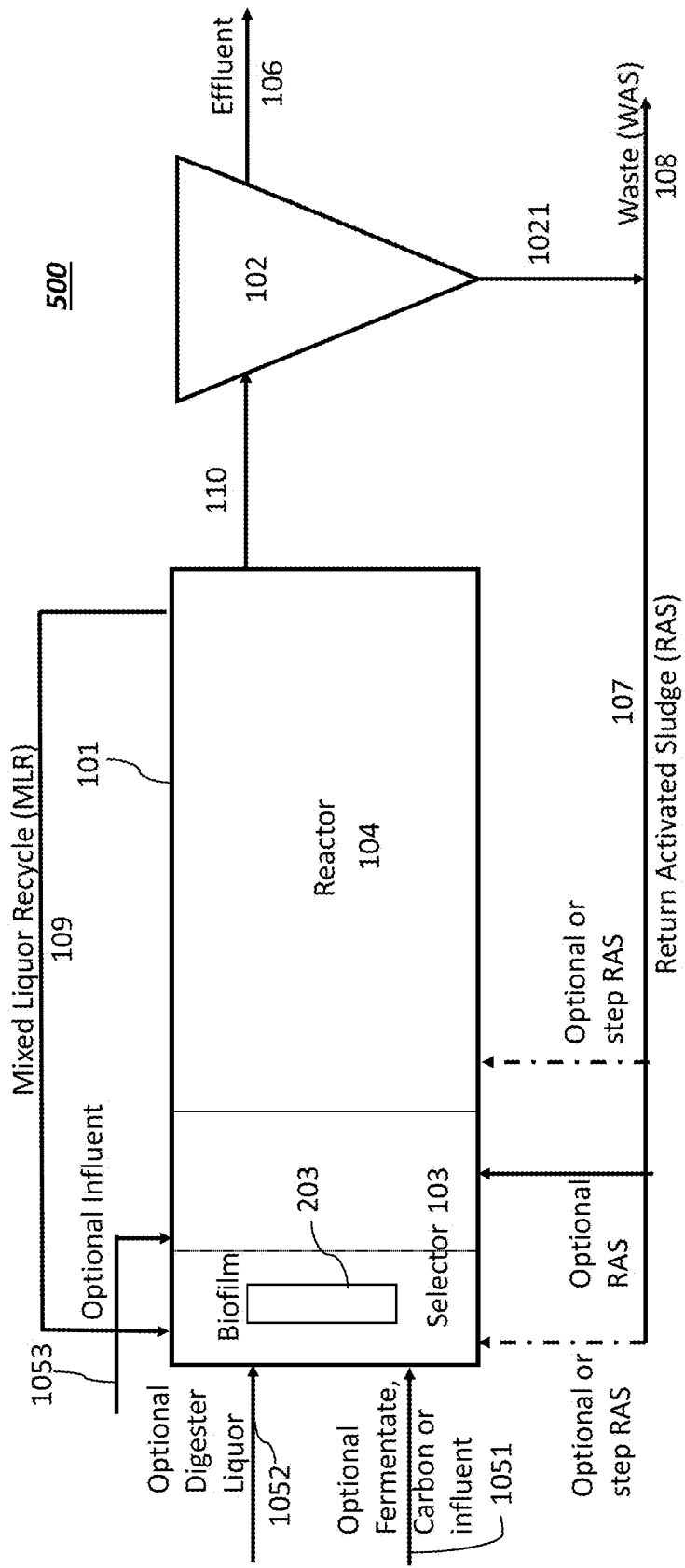
FIG. 6 depicts an embodiment of a treatment system comprising a pre-anoxic process and an anoxic biofilm process providing concentrated (higher mass transfer) substrate flows.

FIG. 6 shows embodiments of a treatment process and treatment system 600, constructed according to the principles of the disclosure. The embodiments depicted in FIG. 6 are similar to those depicted in FIG. 4. The embodiments of the treatment process and treatment system 500 can include one or more inputs configured to receive, optionally, one or more input streams from optional conduits 1051, 1052, or 1053.

The optional conduits 1051, 1052, or 1053 can include any one or more of, for example, a pipe, a pump, a vacuum, a valve, a manifold, or an apparatus that can be configured to supply or control an aspect of, for example, a solid material, a liquid material or a solid-liquid mixture between two or more locations. Any one or more of the conduits 1051, 1052, or 1053 can include a control mechanism (not shown) for controlling aspects of the material supplied between the locations, such as, for example, pressure, temperature, density, mass density, weight density, velocity, flow rate, quantity, volume, specific volume, specific gravity, viscosity, or specific enthalpy.

In at least one embodiment, the conduit 1051 can be configured to supply content of a first content type, such as, for example, fermentate, carbon or an influent (for example, the influent supplied via influent conduit 105, discussed above) to a first input of the processor 101. The conduit 1051 can be configured, for example, to connect to an inlet of the selector 103 and supply its contents upstream of the biofilm 203.

In at least one embodiment, the conduit 1052 can be configured to supply content of a second content type, such as, for example, digester liquor, to a second input of the processor 101. The conduit 1052 can be configured, for example, to connect to an inlet of the selector 103 and supply its contents upstream of the biofilm 203. In an embodiment, the conduit 1052 can be configured to supply its contents to the first input of the processor 101, wherein the contents of the first and second content types can be combined at, or before, the first input of the processor 101.

In at least one embodiment, the conduit 1053 can be configured to supply content of a third content type, such as, for example, an optional influent (for example, the influent supplied via the influent conduit 105, or another source of influent) to a third input of the processor 101. The third input can be located downstream of the biofilm 203. The conduit 1053 can be configured, for example, to connect to an inlet of the selector 103 located downstream or after the biofilm 203 to supply contents of the third content type via the conduit 1053. In an embodiment, the conduit 1053 can be configured to supply its contents to an input in the selector 103 for the RAS stream, wherein the contents of the third content type and the RAS stream from the RAS conduit 107 can be combined at, or before, the input to selector 103.

In at least one embodiment, the first content type supplied by the conduit 1051 can include an influent (for example, from the influent conduit 105, discussed above), a condensate stream high in ammonia concentration, a fermentate (including alkaline), or an organic carbon (part of carbon substrate options) and ammonia.

In at least one embodiment, the second content type supplied by the conduit 1052 can include a digester centrate, a filtrate liquor, a landfill leachate, or an IMLR stream supplying suspended bacteria and nitrate.

In at least one embodiment, the third content type supplied by the conduit 1053 can include influent such as, for example, the influent 105 (discussed above), or a fermentate.

In at least one embodiment, some or all of the RAS stream supplied via the RAS conduit 107 can be supplied to bypass the first bulk anoxic zone (for example, the selector 103). The nitrate can be denitrated using fermentate carbon or external carbon or some influent wastewater carbon by suspended bacteria, and the nitrite and ammonia can be converted to nitrogen gas using anammox supported by the biofilm 203, which can be fixed or moving. In the at least one embodiment, a configuration is included that can provide high concentrations gradients in a compact anoxic zone to achieve removal of ammonia and nitrate.

In various embodiments, the RAS can be moved or applied, partly or wholly, downstream of the pre-anoxic biofilm 203, or modulated or controlled, as depicted by the broken lines in FIG. 6. In at least one embodiment, the RAS conduit 105 can include a plurality of pipes, each configured to deliver a portion (or the entirety) of the RAS stream to one or more inlets to the processor 101, for example, as depicted by the three RAS stream inputs to the processor 101 in FIG. 6. The RAS conduit 105 can include a manifold, a pump, a valve, or an apparatus to control aspects of the RAS stream delivery in a particular pipe, such as, for example, flow rate, pressure, velocity, or content amount.

In at least one embodiment, the location of the biofilm 203 and fermentate inlet can be moved downstream into a downstream (or next) compartment in the selector 103. The selector 103 can comprise the overall anoxic zone, and the first part of the anoxic zone (selector 103) can be focused on nitrification of centrate/filtrate liquor using a small amount of the RAS stream (10%-40%), or as needed. The nitrified material can then be subjected to biofilm partial nitrification+anammox (PNA) or partial denitrification+anammox PdNA in the downstream zone or step using the Nox (nitrate or nitrite) produced in the first part of the anoxic zone. Any heterotrophic denitrification required to convert nitrate to nitrite can be provided by wastewater carbon, external carbon or fermentate.

In various embodiments, the RAS bypass of the anoxic biofilm 203 can be set as high as 100% of the RAS stream bypassing the biofilm 203, or as low as 10% of the RAS stream, with a preference of 100% RAS stream bypass of the biofilm 203. Embodiments including a range of 50-100% RAS bypass, or 80-100% RAS bypass are also contemplated. The RAS bypass can occur to a downstream anoxic or aerobic reactor zone, or a combination of the anoxic and aerobic reactor zones in the processor 101, for example, in the reactor 104.

Figure 7:
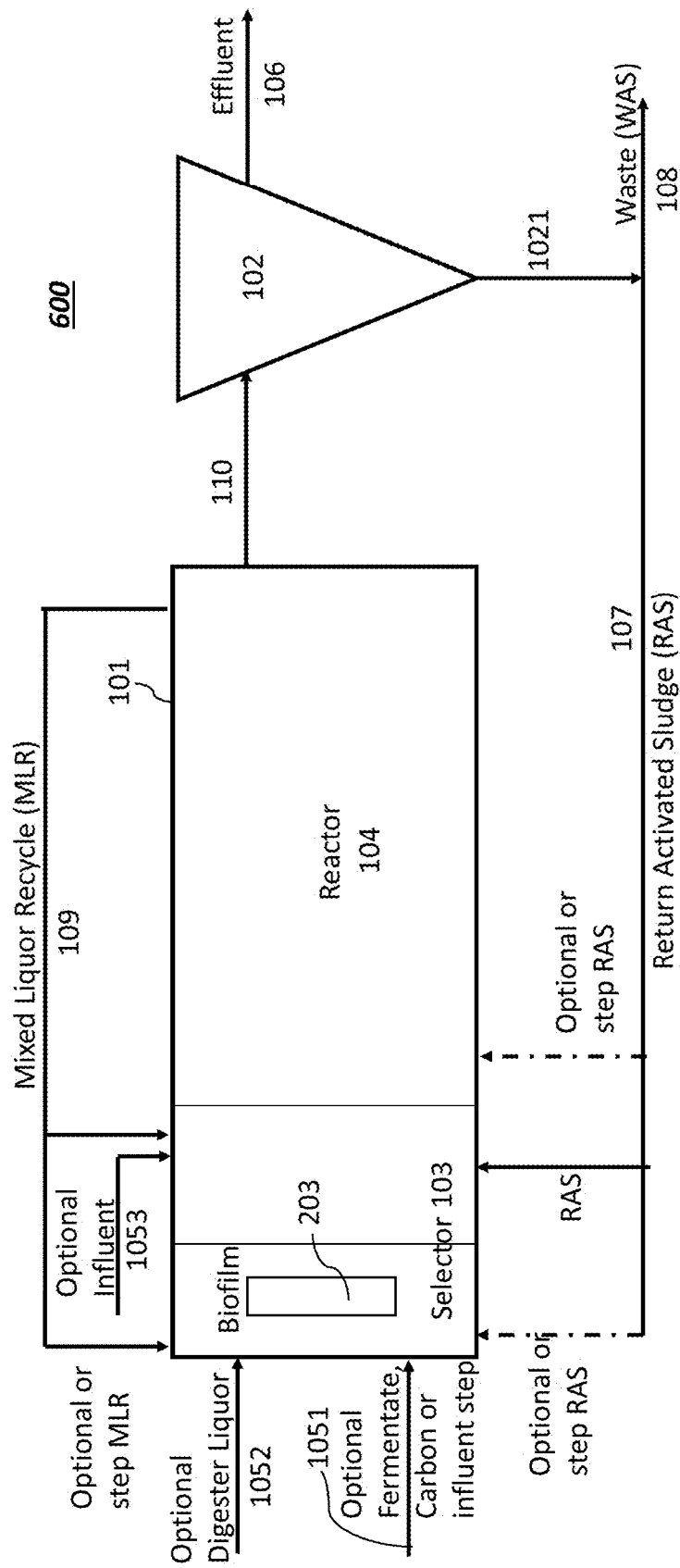
FIG. 7 depicts an embodiment of a treatment system comprising a pre-anoxic process and a membrane aerated biofilm process providing concentrated (higher mass transfer) substrate flows.

FIG. 7 shows embodiments of a treatment process and treatment system 600, constructed according to the principles of the disclosure. The embodiments depicted in FIG. 7 are similar to those depicted in FIG. 6. The embodiments of the process and treatment system 600 can include the MLR conduit 109 being configured to supply MLR content to either or both an upstream and a downstream inlet to the selector 103. In at least one embodiment, the upstream inlet can be located in a first, upstream portion of the selector 103, and the downstream inlet can be located in a second, downstream portion of the selector, as depicted.

In at least one embodiment, the biofilm 203 can comprise a MABR biofilm that is configured as a bulk anoxic biofilm for growth of nitrifiers and anammox bacteria. The processor 101 can include a membrane (not shown) having an annulus (not shown) that can supply air.

In various embodiments of the treatment process and treatment system 600, ammonia can be converted to nitrite and/or nitrate, and the nitrate supplied through IMLR (for example, via the MLR conduit 109), or produced in internally (for example, by the MABR biofilm 203), can be denitrated using fermentate carbon or external carbon or some influent wastewater carbon by suspended bacteria. The nitrite and ammonia can be converted to nitrogen gas using anammox supported by the biofilm 203, which can be either fixed or moving in the processor 101 (for example, in the selector 103). The embodiments can provide high concentrations gradients in a compact anoxic zone (selector 103) to achieve removal of ammonia and nitrate.

In various embodiments of the treatment process and treatment system 600, the RAS stream can be moved, controlled, modulated or applied, partly or wholly, downstream of the biofilm 203. In various embodiments, the RAS bypass of the biofilm 203 can be set as high as 100% of the RAS stream bypassing the biofilm 203, or as low as 10% of the RAS stream, with a preference of 100% RAS stream bypass of the biofilm 203. Embodiments including a range of 50-100% RAS bypass, or 80-100% RAS bypass are also contemplated. The RAS bypass can occur to a downstream anoxic or aerobic reactor zone, or a combination of the anoxic and aerobic reactor zones in the processor 101, for example, in the reactor 104.

Various configurations are contemplated, so as to provide flexibility of supplying and controlling IMLR, either upstream or downstream of the biofilm 203.

In an embodiment of the treatment process and treatment system 600, the biofilm 203 includes a deammonifying biofilm, which can include a single MABR supporting both the nitrifying and anammox biofilms on a single media approach.

In an embodiment, the selector 103 can include multiple (for example, two) biofilms, each having a different type of biofilm. The multiple biofilms can be including in a single zone in the selector 103. The multiple biofilms can be configured in a single biofilm media (for example, a cage or cassette structure) or each biofilm provided in a separate biofilm media.

Figure 8:
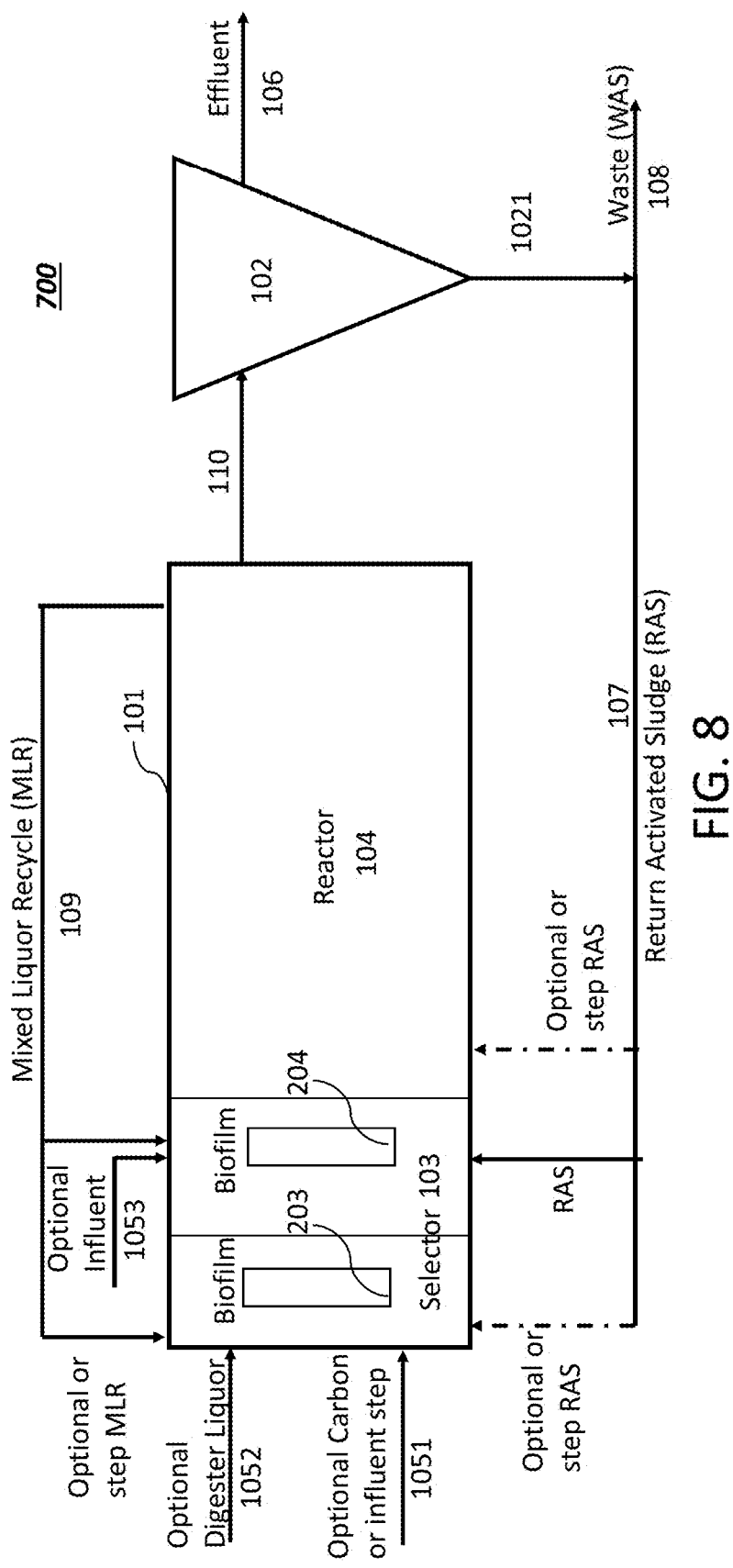
FIG. 8 depicts an embodiment of a treatment system comprising a pre-anoxic process and a combination of anoxic biofilm and membrane aerated biofilm in series or intermixed, providing concentrated (higher mass transfer) substrate flows.

FIG. 8 shows embodiments of a treatment process and treatment system 700, constructed according to the principles of the disclosure. The embodiments depicted in FIG. 8 are similar to those depicted in FIG. 7. The embodiments of the treatment process and treatment system 700 can include the selector 103 having an additional biofilm 204. The biofilms 203, 204 can include an MABR biofilm and an anammox biofilm. The biofilms 203, 204 can be included in separate locations in the selector 103, which can comprise a bulk anoxia. In the embodiments depicted in FIG. 8, the IMLR can provide, via the MLR conduit 109, suspended bacteria for denitratation without additional dilution from the RAS. This approach can provide a more concentrated nitrate stream for partial denitratation.

In at least one embodiment, the biofilm 203 can be configured to support anammox bacteria that uses the ammonia in the influent and nitrite (converted from nitrate associated with the IMLR recycle) both available at high concentrations to not only address any mass transfer limitations in the biofilm, but also to maximize the deammonification reaction.

In various embodiments of the treatment process and treatment system 700, the RAS stream can be moved, controlled, modulated or applied, partly or wholly, upstream or downstream of one or both of the biofilms 203, 204. In various embodiments, the RAS bypass of the biofilm(s) can be set as high as 100% of the RAS stream bypassing the biofilm 203 and/or the biofilm 204, or as low as 10% of the RAS stream, with a preference of 100% RAS stream bypass of the biofilm 203 and/or biofilm 204. Embodiments including a range of 50-100% RAS bypass, or 80-100% RAS bypass are also contemplated. The RAS bypass can occur to a downstream anoxic or aerobic reactor zone, or a combination of the anoxic and aerobic reactor zones in the processor 101, for example, in the reactor 104.

In an embodiment, the second downstream biofilm 204 can include an MABR approach that can convert ammonia not already used for deammonification to be further nitrified on the MABR and then denitrified either in anoxic suspension or by the anammox optionally grown on the same MABR.

In various embodiments, the upstream versus downstream location of the anammox and MABR biofilms 203, 204 can be interchanged as needed by simply selecting inlet locations in the processor 101 and controlling or adjusting IMLR, RAS and influent via MLR conduit 109, RAS conduit 107 and influent conduit 105 (or, optionally, conduits 1051, 1052, or 1053), as needed, to prioritize provision of sufficient mass transfer gradients of desired substrates (ammonia and nitrite) consumed by these two biofilms 203, 204. Either or both biofilms 203, 204 can be variously moving or fixed.

In an embodiment of the treatment system 700, a single MABR film can be provided in the form of a deammonifying biofilm to support both the nitrifying and anammox biofilms on a single media. One approach can have two types of biofilms within a single zone or even within a single cage or cassette.

Figure 9:
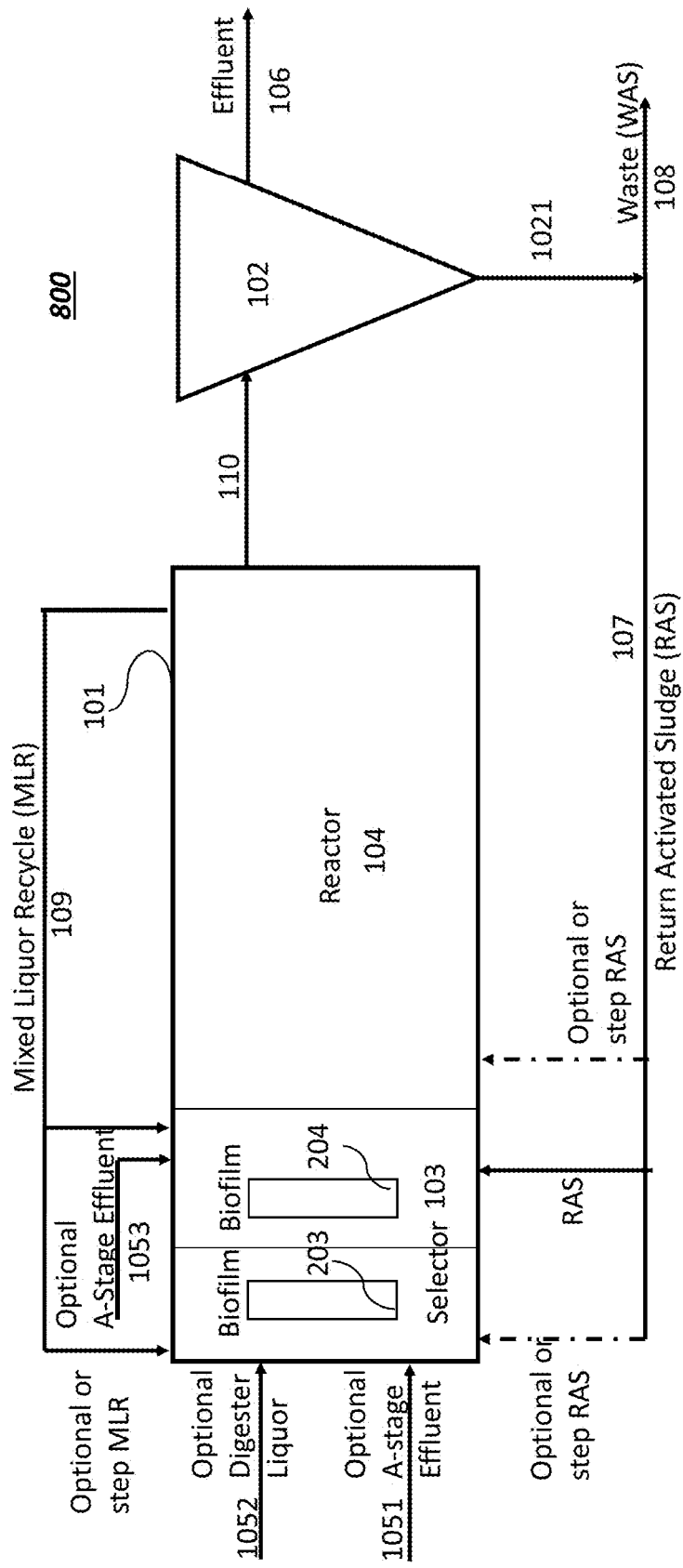
FIG. 9 depicts an embodiment of a treatment system comprising a pre-anoxic process and a combination of anoxic biofilm and membrane aerated biofilm in series or intermixed, providing concentrated (higher mass transfer) substrate flows, receiving with low C/N influent wastewater.

FIG. 9 shows embodiments of a treatment process and treatment system 800, constructed according to the principles of the disclosure. The embodiments depicted in FIG. 9 are similar to those depicted in FIG. 8. The embodiments of the treatment process and treatment system 800 can include providing an A-stage effluent at either or both of the conduits 1051, 1053 as the optional first and third content types.

In various embodiments of the treatment system 800, including those depicted by broken lines, the system 800 can include a anammox biofilm and a MABR biofilm in the biofilms 203, 204. The biofilms 203, 204 can be separated by location within bulk anoxia in the selector 103. The optional conduits 1051, 1052 and/or 1053 can supply digester centrate/filtrate liquor or landfill leachate or condensate streams high in ammonia concentration, fermentate (including alkaline) supply organic carbon (part of carbon substrate options) and ammonia.

In at least one embodiment, the IMLR, supplied via the MLR conduit 109, can provide the suspended bacteria for denitratation without additional dilution from the RAS. This approach provides a more concentrated nitrate stream for partial denitratation.

In an embodiment, the biofilm 203 can be configured to support anammox bacteria that uses the ammonia in the A-stage (or contact stabilization or CEPT or any advanced primary) effluent and nitrite (converted from nitrate associated with the IMLR recycle) both available at high concentrations to not only address any mass transfer limitations in the biofilm, but also to maximize the deammonification reaction. The A-stage effluent can be supplied to one or more inlets of the selector 103 via either or both conduits 1051 and 1053. The inlets can be located either or both upstream and downstream of the biofilm 203.

The second biofilm 204 can include a biofilm comprising an MABR approach that converts ammonia not already used for deammonification to be further nitrified on the MABR and then denitrified either in anoxic suspension or by the anammox optionally grown on the same MABR. In various embodiments, the upstream versus downstream location of the anammox biofilm 203 and MABR biofilm 204 can be interchanged as needed by simply selecting the inlet locations and adjusting or controlling the IMLR, RAS and influent supplied to the inlets at the various locations of the processor 101, as needed, to prioritize provision of sufficient mass transfer gradients of desired substrates (ammonia and nitrite) consumed by these two biofilms. Either or both biofilms 203, 204 can be variously moved or fixed in the selector 103.

In various embodiments of the treatment system 800, the selector 103 can include a single deammonifying biofilm media, which can be provided as a MABR to support both the nitrifying and anammox biofilms on a single media.

In an embodiment, the approach can have two types of biofilms within a single zone or even within a single cage or cassette. In this case the nitrification reaction occurs on the MABR and the anammox reaction using ammonia and nitrite occurs on a separate anoxic biofilm placed in the same cage. The MABR biofilm can represent between 10-50% of overall biofilm in the two-biofilm system cage. The nitrifying reactions can be as much as 3-5 times faster kinetics than the anammox reactions, thus needing less biofilm surface or conversely, anammox needing more biofilm surface. This mixed fixed media cage is a special embodiment of this invention. The advantage of this approach is to use less of the more expensive MABR media without becoming ammonia mass transfer limiting.

Figure 10:
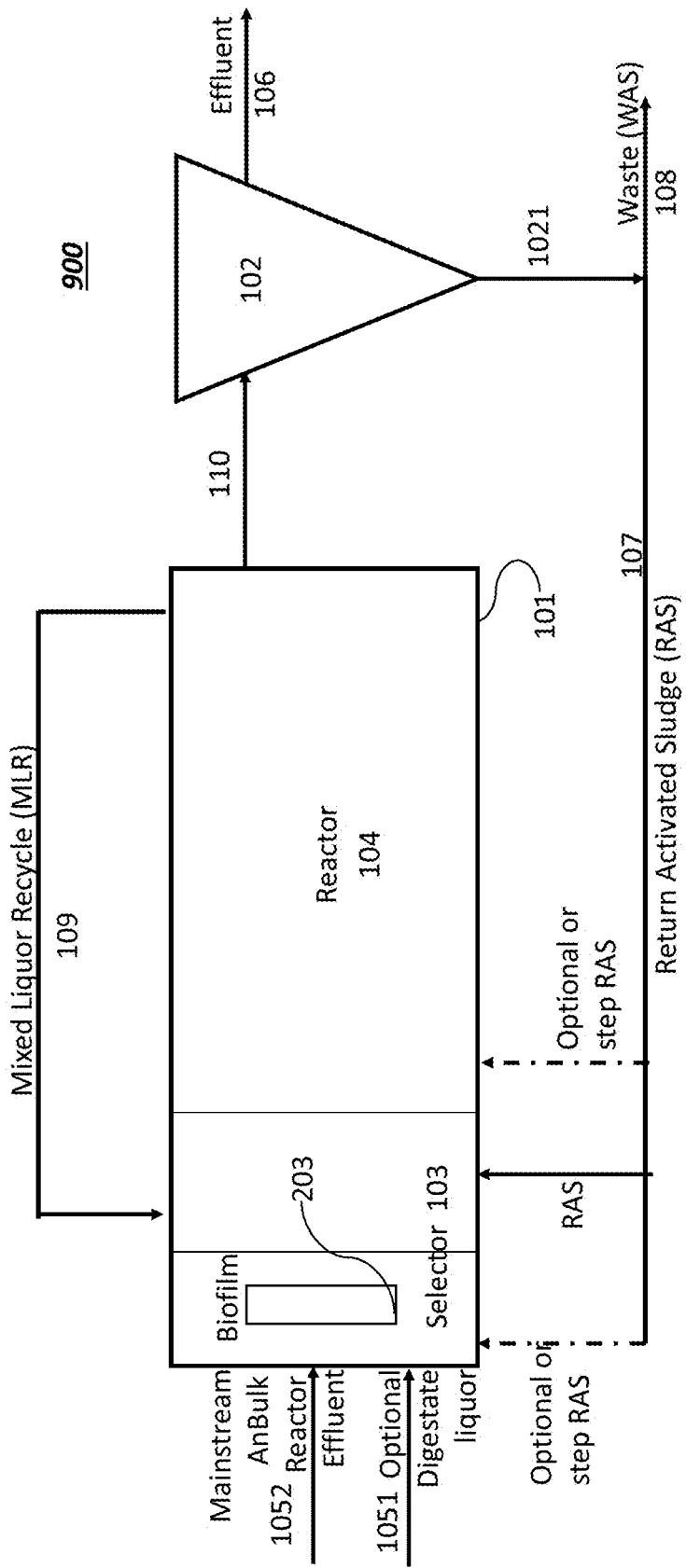
FIG. 10 depicts an embodiment of a treatment system comprising a pre-anoxic process and a combination of anoxic biofilm and/or membrane aerated biofilm in series or intermixed, receiving mainstream anaerobic treatment wastewater containing dissolved methane.

FIG. 10 shows an embodiment of a treatment process and treatment system 900 comprising a biofilm 203 and inlets 1051, 1052. The biofilm 203 can include a MABR biofilm, as discussed above. The biofilm 203 can include a MABR biofilm where denitratation can also occur on the biofilm using dissolved methane, which can be supplied from a mainstream anaerobic process on inlet 1052. The nitrification can occur using air supplied by the MABR. The anammox reaction can also occur on the same biofilm.

In an embodiment, ammonia oxidation to nitrite or nitrate can occur using MABR, and the same biofilm 203 can perform the anammox reaction using either, or both, partial nitritation/anammox or partial denitratation/anammox pathways.

In at least one embodiment, the treatment process and treatment system 900 can include two types of biofilms provided as the biofilm 203, which can be provided in a single biofilm media 203 in the selector 103 (in a single bulk anoxic zone) or within a single cage or cassette. The nitrification reaction can occur on the MABR biofilm and the denitrifying methane oxidation from nitrate to nitrite and the anammox reaction using ammonia and nitrite can occur on a separate anoxic biofilm placed on the same media (for example, in the same cage or cassette). The MABR biofilm can represent between 10-50% of overall biofilm in the two-biofilm system cage. The nitrifying reactions can be as much as 3-5 times faster kinetics than the anammox or methane oxidation reactions, thus needing less biofilm surface or conversely, anammox needing more biofilm surface. This mixed fixed media cage apparatus (not shown) can be located in an upstream portion of the selector 103, or any other suitable location in the selector 103. An advantage of this approach is that it uses less of the more expensive MABR media without becoming ammonia mass transfer limiting.

Figure 11:
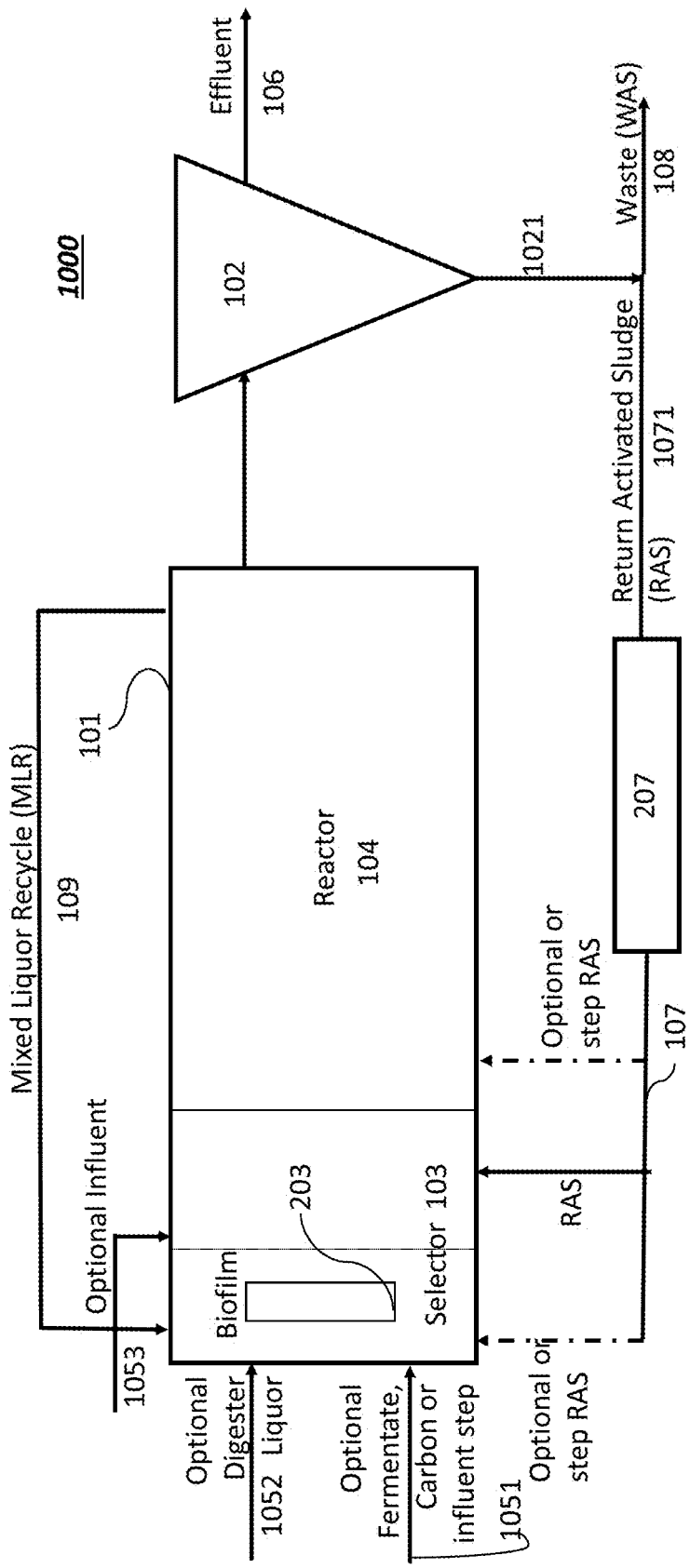
FIG. 11 depicts an embodiment of a treatment system comprising a pre-anoxic process and an anoxic biofilm process providing concentrated (higher mass transfer) substrate flows with a side stream return activated sludge (RAS) fermentation step, zone, stage or reactor.

FIG. 11 shows embodiments of a treatment process and treatment system 1000, constructed according to the principles of the disclosure. The embodiments depicted in FIG. 11 are similar to those depicted in FIG. 6 (treatment system 500). The treatment process and the treatment system 1000 can include a return activated sludge (RAS) fermenter 207. The fermenter 207 apparatus can be connected between the conduit 1021 and the RAS conduit 107. The fermenter can be connected to the conduit 1021 via a conduit 1071 and configured to receive the RAS stream (via the conduit 1071) from the separator 102 and process the RAS to output a fermented RAS in the RAS conduit 107.

The fermenter 207 can include, for example, an anaerobic fermenter, a reactor, or an apparatus in which complex particulate and soluble substrates present in the RAS are anaerobically broken down to form volatile fatty acids (VFAs) through acid fermentation. The fermented RAS supplied via the RAS conduit 107 can include the VFAs, which can be used in developing populations of phosphate accumulating organisms (PAOs) and denitrifying bacteria in the processor 101. Because of their soluble and readily biodegradable nature, the VFAs can provide highly effective carbon sources for denitrification in the processor 101. The availability of VFAs produced through fermentation results in significantly higher denitrification rates in the anoxic zones of the treatment process than would be achieved with the use of, for example, only primary effluent.

In at least one embodiment, anaerobic RAS fermentation can be combined with PdNA in the pre-anoxic biofilm 203. RAS fermentation can be used to facilitate enhanced biological phosphorus removal or densification. Additional fermentate, such as, for example, from a gravity thickener (not shown) or sludge process (including, for example, alkaline fermentation) can be added.

In various embodiments, a part, or all, of the fermented RAS can bypass the pre-anoxic biofilm 203 to a downstream step for phosphorus uptake, including embodiments of the treatment system 1000 depicted by the broken lines in FIG. 11. This approach, and any combination of approaches using RAS fermentation and a PdNA biofilm, can be included in embodiments of the treatment process and treatment system 1000.

In various embodiments, the fermented RAS can be moved, applied, modulated or controlled, partly or wholly, downstream of the pre-anoxic biofilm, as depicted by the broken lines in FIG. 11. The fermented RAS bypass of anoxic biofilm can be as high as 100% and as low as 10% with a preference of 100% bypass. A range of 50-100% bypass or 80-100% bypass is also contemplated.

In various embodiments of the treatment process and treatment system 700, the fermented RAS stream can be moved, controlled, modulated or applied, partly or wholly, upstream or downstream of the biofilm 20e. In various embodiments, the fermented RAS bypass of the pre-anoxic biofilm 203 can be set as high as 100% of the fermented RAS stream bypassing the biofilm, or as low as 10% of the fermented RAS stream, with a preference of 100% fermented RAS stream bypass of the biofilm 203. Embodiments including a range of 50-100% RAS bypass, or 80-100% RAS bypass are also contemplated. The RAS bypass can occur to a downstream anoxic or aerobic reactor zone, or a combination of the anoxic and aerobic reactor zones in the processor 101, for example, in the reactor 104.

The RAS fermentation step (with or without primary fermentate addition) can also produce substantial VFA (for example, in the order of 15:1 ratio of VFA:P) for facilitating storage. This selection of storage organisms is compatible with its use with PdNA for denitration with the first step. The storage carbon can provide electron donors at rates of about 2/d to 3/d, which is substantially higher than the rates of electron acceptance by the reaction of denitritation (for example, from nitrite to nitrogen gas at rates less than 2/d), thus resulting in nitrite accumulation and thereby its use by anammox for deammonification. This mechanism of use of storage carbon for the first reaction of PdNA to facilitate the second reaction by anammox is a feature of various embodiments of the treatment processes and treatment systems provided by the disclosure. The storage can occur, for example, in a sidestream reactor (such as, for example, fermenter 207) or in a mainstream reactor. The fermentation can occur in the sidestream reactor using RAS fermentation, fermentation of primary or thickened sludge, alkaline fermentation, thermal fermentation, adsorption sludge fermentation, or any other fermentation approach. This discussion of storage and/or fermentation could apply to any or all of the embodiments of the treatment processes or treatment systems in this disclosure.

Figure 12:
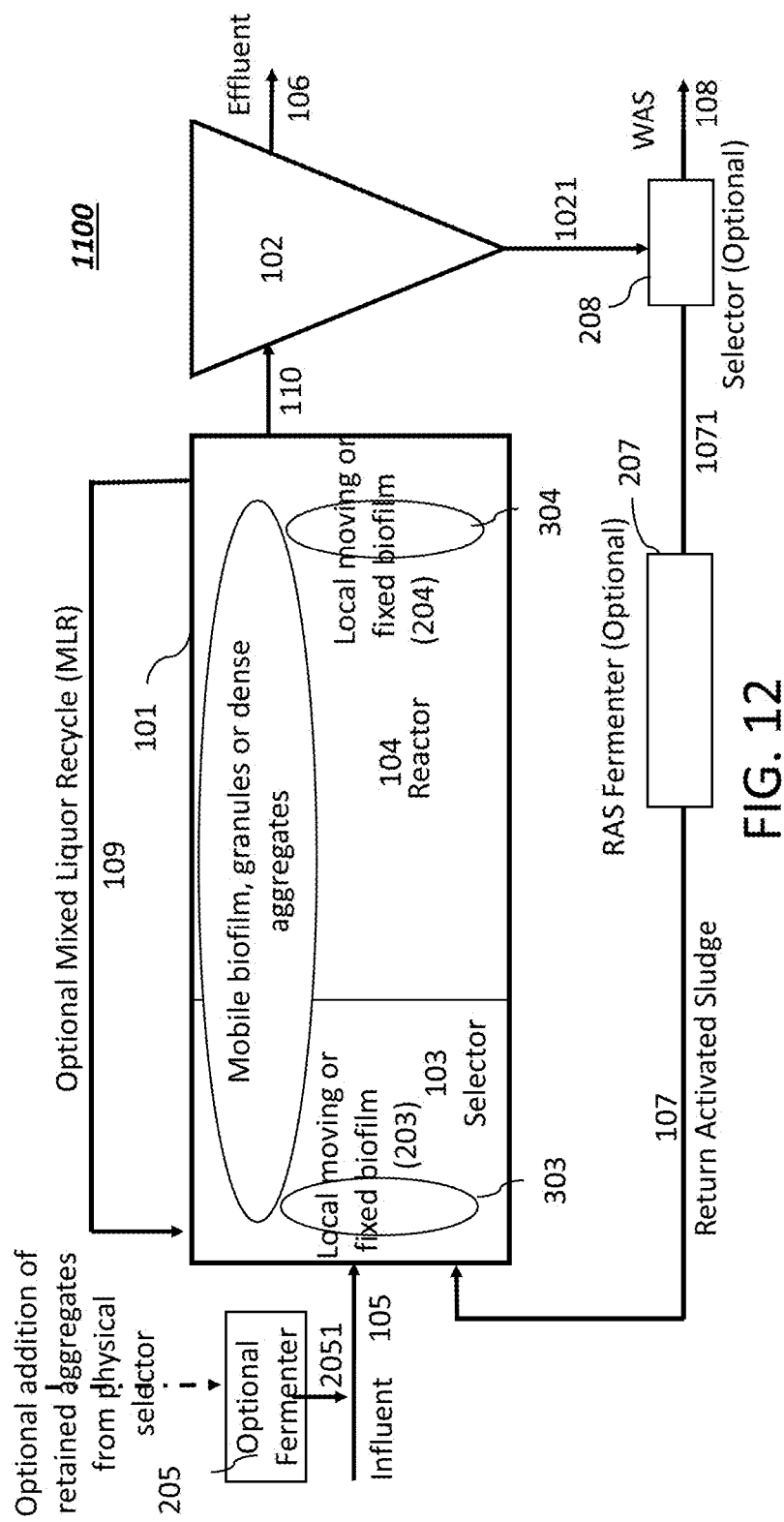
FIG. 12 depicts a pre-anoxic process with a physical selector providing dense aggregates, granules or biofilms that could possess enhanced storage characteristics.

FIG. 12 shows embodiments of a treatment process and treatment system 1100, constructed according to the principles of the disclosure. The embodiments depicted in FIG. 12 are similar to those depicted in FIG. 2 (treatment system 100). The embodiments of the treatment system 1100 also include various embodiments comprising the biofilm 203, the biofilm 204, a fermenter 205, the RAS fermenter 207, or a physical selector 208. In various embodiments, the biofilm 203 can be located in a region 303 in the selector 103, such as, for example, in an upstream portion of the selector 103, and, the biofilm 204 can be located in a region 304 in the reactor 104, such as, for example, in a downstream portion of the reactor 104. The region 303 can include a feast zone comprising high F/M and the region 304 can include a famine zone comprising low F/M.

The fermenter 205 apparatus can be constructed similar to the RAS fermenter 207 apparatus discussed above, with respect to, for example, the embodiments depicted in FIG. 11. The fermenter 205 apparatus can be positioned upstream of the processor 101 and configured to receive and process densified biomass, such as, for example, retained recyclables from the physical selector 208 or another source (not shown), and supply a fermented stream 2051 to an inlet of the processor 101, such as, for example, the inlet that receives the influent conduit 105, or the RAS conduit 107, or the MLR conduit 109, or any combination thereof.

In at least one embodiment, the fermented stream 2051 can be supplied (for example, via a conduit) to another part of the processor 101, such as, for example, to the anoxic reactor (not shown) or to the aerobic reactor zone (not shown) in the processor 101, for example, in the reactor 104.

In at least one embodiment, the physical selector 208 can be connected to and applied in the RAS stream from the separator 102 as depicted in FIG. 12, or directly to the mixed liquor 110 output from the processor 101. This physical selector 208 can be configured to operate on the RAS stream from the separator 102 (or the mixed liquor 110 from the processor 110) and sort large or dense aggregates, granules or biofilms ("recyclables") that could possess enhanced storage characteristics from the RAS stream 1071 (or mixed liquor 110). The physical selector 208 can be configured to sort recyclables having a size greater than a predetermined size. The physical selector 208 can be configured to collect and output the sorted recyclables in the RAS stream 107. The portion remaining after sorting and separation of the collected recyclables can be output in the WAS conduit 108.

In at least one embodiment, the physical selector 208 can include a density-based selector apparatus that can separate recyclables based on their density, such as, for example, a hydrocyclone or a centrifuge. In an embodiment, the physical selector 208 can include the gravimetric selector apparatus 260 described in U.S. Pat. No. 9,670,083.

In at least one embodiment, the physical selector 208 can include a size-based or compressibility-based selector apparatus that can separate recyclables based on their size or compressibility, such that recyclables that are larger than predetermined size or less compressible then a predetermined compressibility are retained. In an embodiment, the physical selector 208 can include the membrane apparatus 10 described in U.S. Pat. No. 9,670,083.

In various embodiments, the RAS fermenter 207 can be included between the physical selector 108 and RAS conduit 107 or between the conduit 1021 and RAS conduit 107. The RAS fermenter 207 can be further configured to output the fermented RAS to the fermented RAS conduit 1071, including fermented biomass recyclables.

In an embodiment, the RAS fermenter 207 can be configured to receive the collected recyclables from the physical selector 208 and process the recyclables as discussed above, with respect to FIG. 11. In the embodiment, the collected recyclables can comprise any combination of the densified biomass recyclables, or the collected recyclables have a size greater than the predetermined size, or the collected recyclables having a compressibility less than the predetermined compressibility.

In an embodiment, the RAS fermenter 207 can be configured to receive the RAS from the conduit 1021 and process the recyclables as discussed above, with respect to FIG. 11.

In various embodiments, the physical selector 208 can be configured to sort and retain recyclables that can possess enhanced storage characteristics. The storage organisms may require longer overall solids residence times (SRT) and the physical selector 208 can be configured to, not only provide SRT uncoupling thus affording this time, but also supply the recyclables that can be separated (for example, in the underflow or retained fractions of the physical selector 208) and then specifically redirected to a fermentate or influent wastewater for 'luxury storage'. The recyclables filled with stored material can then be directed directly (or indirectly) to the location for desired denitratation, thus more efficiently using such storage products and organisms. The various embodiments provide an approach that includes the selection and growth of storage organisms, which are heavier or denser than other organisms in the process/system. In the embodiments, the storage organisms can self-select, and this self-selection allows for a targeted redirection in a virtuous cycle.

In at least one embodiment, the treatment process and treatment system 1100 can include the two regions 303, 304 for biofilms for localized reactions in high and low F/M regions, respectively. For instance, the processor 101 can include the biofilm 203 in region 303, in which the biofilm 203 can comprise, for example, a membrane aerated biofilm reactor (MABR), a membrane biofilm reactor (MBR), or another form of reactive biofilm that can be localized in a high F/M region. The second biofilm 204 can be localized in the low F/M region 304.

As seen in the embodiments depicted in FIG. 12, groups of recyclables can travel between the high and low F/M regions 303, 304 comprising the biofilms 203, 204. The recyclables can include storage organisms that facilitate localized reactions in the high and low F/M regions. Each set of the biofilms 203, 204 can grow niche specialist organisms to provide enhanced functionality within their more local or less local 'spheres of influence'.

In various embodiments, the physical selector 208 can be used independent of the local/non-local reaction approach comprising the biofilms 203, 204 in the processor 101, and vice versa. The two separate apparatus features of the physical selector 208 and biofilms 203/204 can be combined as needed.

In various embodiments, the third separate apparatus feature—the fermenter 207, which can include a RAS fermenter or any other fermenter—can be included and applied by itself or in addition to either or both the physical selector 208 and biofilms 203/204. The fermenter 207 can be applied at any location (including in the influent stream) of the treatment system 1100. As noted, the fermenter 207 can, in various embodiments, be combined or kept separate from the physical selector 208 and the local/non-local biofilms 203, 204.

In the case of primary or activated adsorption sludge fermentation, the fermentate (such as, for example, from an A-stage or AAA process) can be applied in a manner to create a high F/M for the luxury storage, which can include, for example, holding the fermentation in a short hydraulic retention time tank of less than 15 min. Other retention times are also possible and would depend on maximizing the storage within selected organisms, and the optimized use of the compounds intended to convert to storage, and the redox conditions (aerobic, anoxic or anaerobic) within the selector.

Figure 13:
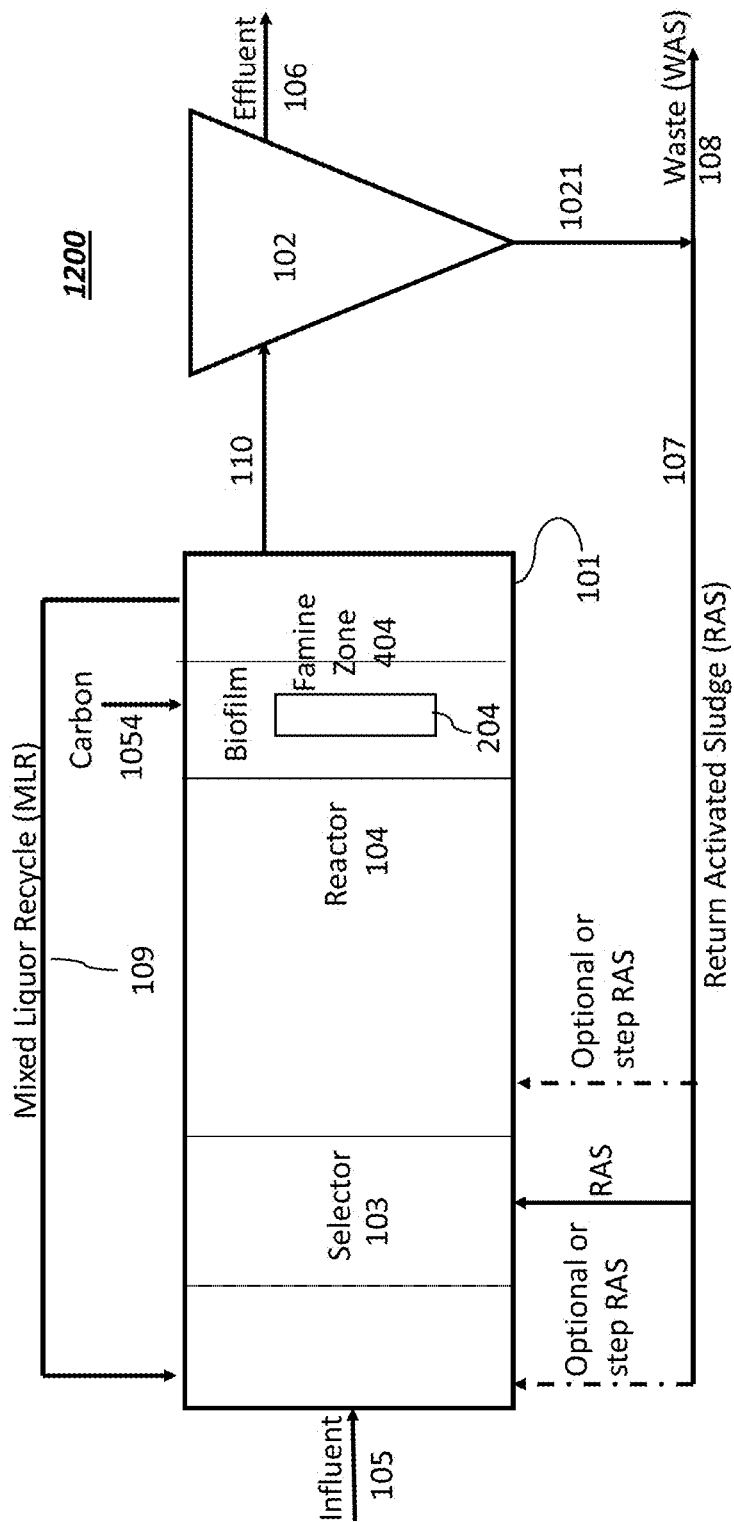
FIG. 13 depicts a pre-anoxic process with a zone for biofilm in a low F/M region.

FIG. 13 shows embodiments of a treatment process and treatment system 1200, constructed according to the principles of the disclosure. The treatment process and treatment system 1200 can include various embodiments comprising an inlet for a carbon source, a conduit 1054, the biofilm 204, and a famine zone 404, in which the biofilm 204 can be located. The famine zone 404 includes a low F/M region that can comprise the biofilm 204. The famine zone 404 can be included in the region 304 (shown in FIG. 12).

In various embodiments, the biofilm 204 can be configured to contain anammox organisms or organisms partly or fully grown using external carbon, fermentate or bypassed influent. The suspended phase in the reactor 104 can contain organisms that have stored material that can be made available for use in this downstream zone in the processor 101 for denitratation from nitrate to nitrite. The use of stored material in downstream zones in the processor 101 can be modulated using step feeding in upstream zones, such as, for example, the various RAS inlets to the processor 101, which include the solid line and two broken lines depicted in FIG. 13. In at least one embodiment, as long as a source of external carbon is available (for example, via conduit 1054), the bacteria can reserve the stored carbon for use in the famine zone. Additionally minimizing aeration cycles, and/or maximizing denitrifying conditions can make more of the storage compounds available for the denitratation reaction and also increase the proportionate SRT for such reactions, thus increasing the active fraction of such organisms within the overall biomass.

In at least one embodiment, the treatment process and treatment system can include the physical selector 208 (shown in FIG. 12), which can be configured to direct the storage organisms grown to the biofilm zone 304, in which the biofilm 204 is located. In various embodiments, the recyclables sorted and retained by the physical selector 208 can be supplied and directed upstream of, for example, an influent flow splitter box (not shown), which can be included in, or connected to, the influent conduit 105. The recyclables that are collected by, and supplied from, the physical selector 208 can include storage organisms. Part of the contents of the influent flow splitter box (not shown), which contains the recyclables comprising the storage organisms, can be directed (for example, split) directly to the downstream biofilm region 404 for denitratation. Such an approach can be accomplished, for example, by including a splitter (not shown) configured for dual-mode operation, including a 'wet weather mode' in addition to PdNA. This approach of using flow splits containing influent along with selected/retained biomass could be used in any process configuration including but not limited to plug flow, oxidation ditch (for example, shown in FIG. 15) or modified sequencing batch reactors (for example, shown in FIG. 14). In the case of the latter, the influent can be directed directly to the alternating clarifiers containing the biofilm(s).

In an embodiment, the treatment process and treatment system 1200 comprises a effervescence diffuser 1503, an effervescent generator 1504 and a gas supply 1510, discussed below with reference to FIG. 18A. The biofilm 204 can be located atop of or proximately near to the effervescence diffuser 1503, as disused below, with reference to the biofilm 203 in FIG. 18A. In various embodiments, the biofilm 204 can be configured as a moving biofilm media or a fixed biofilm media.

Figure 14:
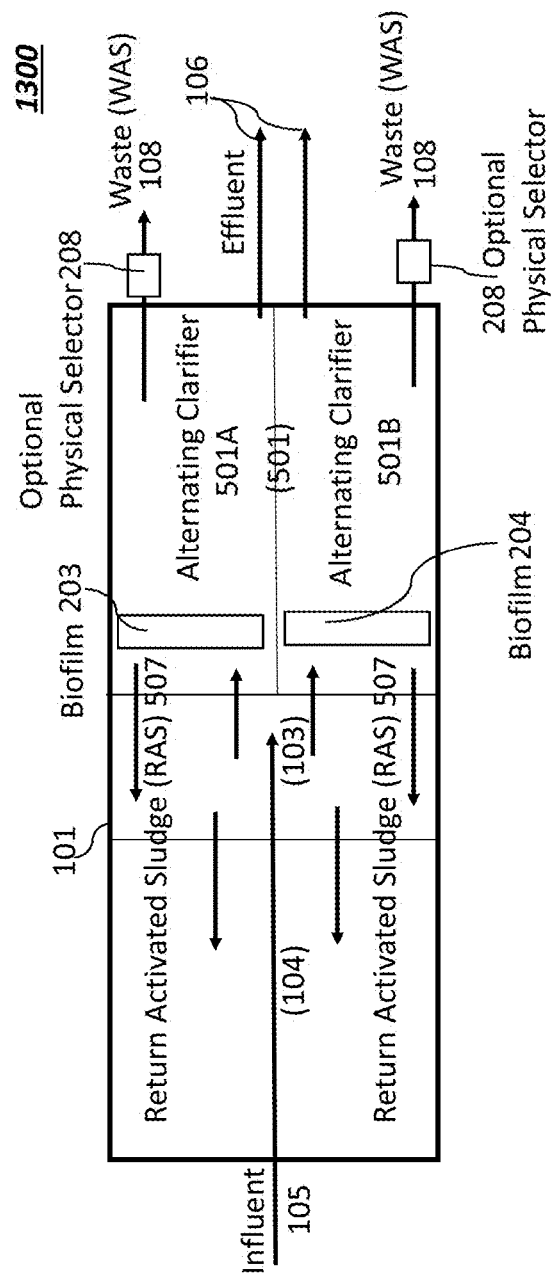
FIG. 14 depicts a pre-anoxic process with a modified sequencing batch reactor.

FIG. 14 shows an embodiment of a treatment process and treatment system 1300, constructed according to the principles of the disclosure. The processor 101 can include a modified sequencing batch reactor 104, the biofilms 203, 204, and an alternating clarifier 501, which can comprise a pair of alternating clarifier regions 501A, 501B. In various embodiments, the treatment process and treatment system 1300 can include one or more physical selector 208.

In various embodiments, the treatment process and treatment system 1300 can include, for example, a BIOCOS® process, a mSBR (or a modified sequencing batch reactor) process, or a LUCAS® process.

The treatment process and treatment system 1300 can include a biofilm process comprising the biofilms 203, 204 in the alternating clarifier 501, thereby providing an opportunity to use the compact biofilm process footprint as a low F/M process for additional reactivity with storage carbon and PdNA. Influent only if needed (associated with relative performance using storage carbon), can be directed to the alternating clarifier 501, for example, as needed, as depicted in the figure. The treated RAS 507 can be separately (or jointly) directed, along with the influent, to the alternating clarifier 501, including clarifier regions 501A, 501B. This way the treatment process and treatment system can manage wet weather treatment with PdNA being conducted within the space of the clarifier 501.

In an embodiment, the treatment system 1300 can include a hydraulic cascade approach, which can be configured to receive a flow splitter influent containing recyclables from one or more physical selectors 208. The flow splitter influent can be received from the influent flow splitter box (not shown), which can be included in, or connected to, the influent conduit 105. In an embodiment, the flow splitter influent can be directed toward and sent to the selector 103, or directly to the alternating clarifier 501. The amount of influent received by the clarifier regions 501A, 501B can be calibrated to maximize PdNA activity. At the same time, storage is encouraged in the selector 103 by the influent (for example, received from the splitter) and RAS 507 (returned from the clarifier 51). This stored material is also available for denitrification through PdNA and/or mainstream deammonification.

In at least one embodiment, an MABR or membrane biofilm can be included for nitrification or methane oxidation reactions within an upstream zone (not shown) in the processor 101, or optionally upstream of the influent flow splitter box (not shown), which can be configured to receive the recyclables from the one or more physical selectors 208.

In various embodiments of the treatment processes and treatment systems disclosed herein, the influent flow splitter box (not shown) can in be included upstream of the processor 101, for example, in (or connected to) the influent conduit 105. The influent flow splitter box (not shown) can include a biofilm (not shown), such as, for example, the biofilm 203 or 204. The influent flow splitter box can be configured to receive recyclables from one more selectors physical selectors 208 and apply the biofilm to the recyclables, relying on strong diffusion gradients for substrates such as ammonia or methane or other electron donors (including, for example, photo, thermal or other radiation, or electricity source) for growing any type of storage organisms (for example, green, purple, etc.), including any specific wavelength or range of photo wavelengths that can be provided by an illumination source such as, for example, a light source.

Figure 15:
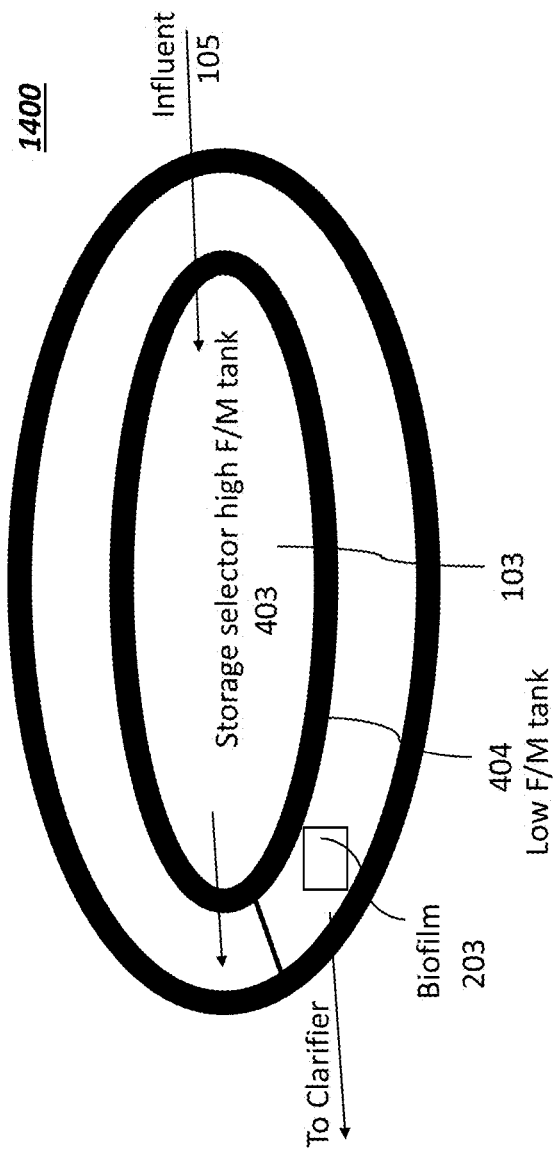
FIG. 15 depicts an approximate redarning of an oxidation ditch.

FIG. 15 shows an embodiment of a treatment process and treatment system 1400 comprising an oxidation ditch, constructed according to the principles of the disclosure. The treatment system 1400 can include a modified activated sludge biological treatment process that can apply long SRTs to the mixed liquor. The treatment system 1400 can include a clarifier (not shown), a storage selector tank 403 having a high F/M ration and a tank 404 having a low F/M ratio. The treatment process can be configured in an oval or oblong configuration where mixed liquor moves in a circular approach (shaded region). The biofilm 203 can be included and placed at the end of the ditch for the PdNA reaction.

In an embodiment, an additional, optional, biofilm (not shown) can be included and placed at the beginning of the ditch, or in the selector 103 for an MABR or membrane biofilm reaction needing substrate gradient or electron donor. The selector 103 can include a selector zone separate from the ditch, or as a part of the ditch system itself.

Figure 16:
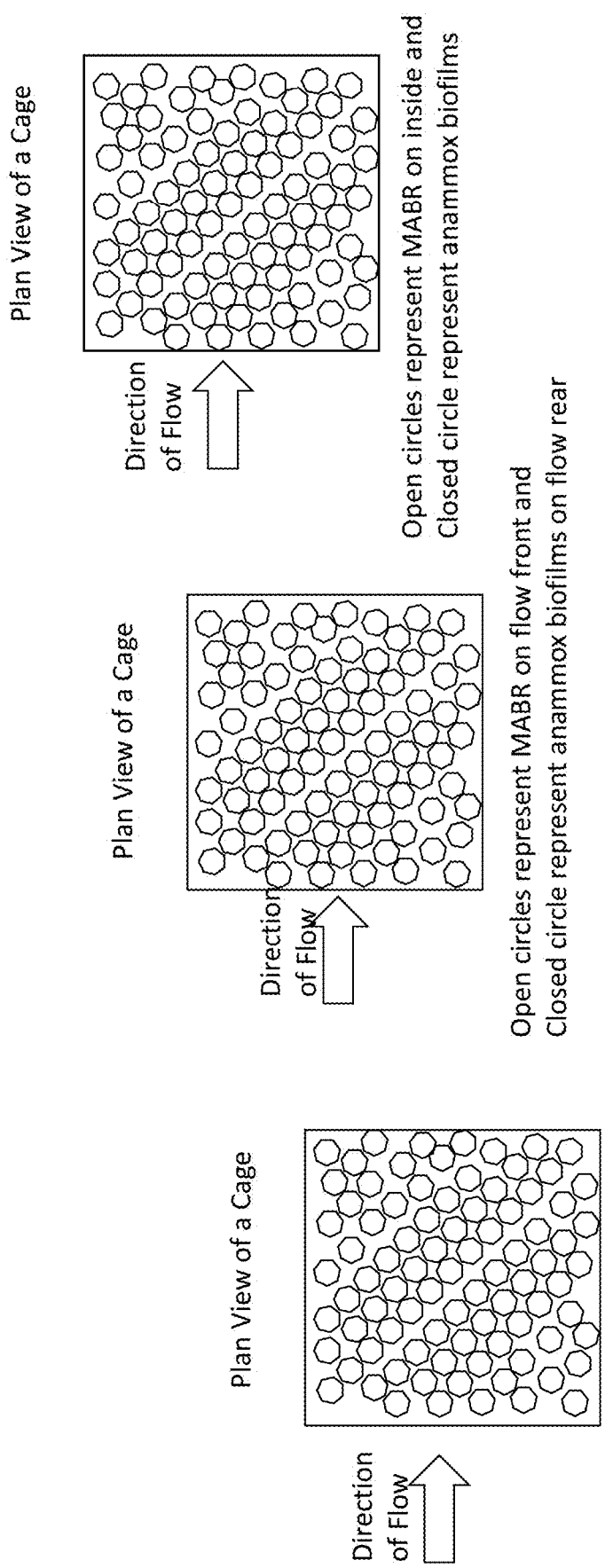
FIG. 16 depicts a few cage, cassette or filter options where the anoxic and MABR biofilms are intermixed or interspersed.

FIG. 16 shows plan views of three nonlimiting embodiments of a cage comprising the biofilm 203 (or 204), constructed according to the principles of the disclosure. The cage comprising the biofilm 203 (or 204) can include a mixture of MABR/membrane biofilm reactors and anammox biofilms on a fixed media. In the plan views, open (or non-shaded) circles represent MABR/membrane biofilm reactors and the closed (or shaded) circles represent anammox biofilms.

In an embodiment of the biofilm 203 (or 204), the MABR biofilm producing nitrite or nitrate can be provided on the outside of the cage, and the anammox biofilm consuming ammonia and nitrite can be provided inside the cage. The left-most plan view in FIG. 16 depicts an example of this embodiment.

In an embodiment, the nitrate producing MABR can be provided in the front (or upstream) portion of the cage and the anammox biofilm can be provided on the rear (or downstream) portion of the cage. The plan view in the middle of FIG. 16 depicts an example of this embodiment.

In an embodiment, the MABR biofilm can be provided inside the cage (for example, in a central area) to produce nitrite or nitrate inside the case, and the anammox biofilm can be provided to surround the MABR biofilm. The carbon contained in the influent flow denitrates the produced nitrate in the MABR biofilm. The plan view in the right-most portion of FIG. 16 depicts an example of this embodiment.

In an embodiment, the anammox biofilm can be provided on the flow front of the cage, the MABR biofilm provided downstream in the middle of the cage, and the anammox biofilm provided downstream of the MABR biofilm, on the flow rear of the cage. Here, the carbon can be anoxically consumed by the time the ammonia is oxidized by the MABR downstream, with additional anammox biofilm again making the rear. Other approaches are also possible.

In an embodiment, a trickling filter approach is provided that combines structural media containing both ceramic (for example, with air supplied in the plenum growing nitrifiers) and non-ceramic media (for anammox) in the same structural media form.

The mix and match of biofilms in the various embodiments of the biofilm media (for example, biofilm 203) can be developed and determined using, for example, computational fluid dynamics or biomimicry approaches, which can be used to develop the mix and match of such biofilms within a cage or a structural downflow trickling filter media form containing ceramic MABR and non-ceramic media forms.

Figure 17:
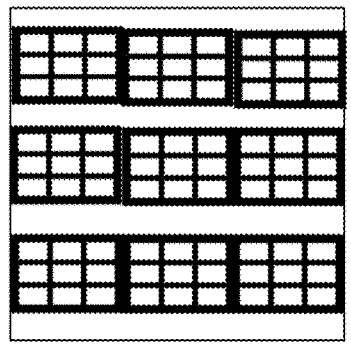
FIG. 17 depicts cages for anoxic biofilms, where any cage can be an anoxic or MABR biofilm to provide sufficient substrates for each of those cages.
Figure 17:
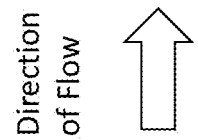

FIG. 17 shows a plurality of cages that can be included, for example, as the biofilm 203 or 204 in the selector 103 (as discussed above). Each cage or cassette can include either or both the MABR biofilm and the anoxic biofilm. In various embodiments, cassettes or filters can be used in place of, or in addition to the cages, with each cassette or filter containing either or both the MABR biofilm and the anoxic biofilm.

In various embodiments, the biofilm cages, cassettes or filters apparatuses can be arranged in a manner that the apparatuses are either fully MABR or fully anoxic biofilm or a combination of the MABR and anoxic biofilm. The media in the apparatuses can be of any shape or form, including fixed, flapping or moving. In an embodiment, the flow to the apparatuses can be in series and applied in such a manner to approximate a plug flow. This series approach can be conducted in any direction in a 3-dimensional space, along a horizontal or multiple horizontals of the apparatuses, along a vertical or multiple verticals of the apparatuses. An advantage of this approach of maximizing plug-flow is that it improves the use of storage material and, thus, improves PdNA efficiency.

The volumetric rates and specific surface areas for anammox activity in the anoxic biofilm process can be in the range of about 0.2 g to 6 g TIN removal/$m^2$/day or about 0.02 kg to 1.5 kg TIN removal/$m^3$/day, where m represents the unit meter. In an embodiment, the rate can be in the range of about 0.5 g to 2.5 g TIN removal/$m^2$/day.

Figure 18A:
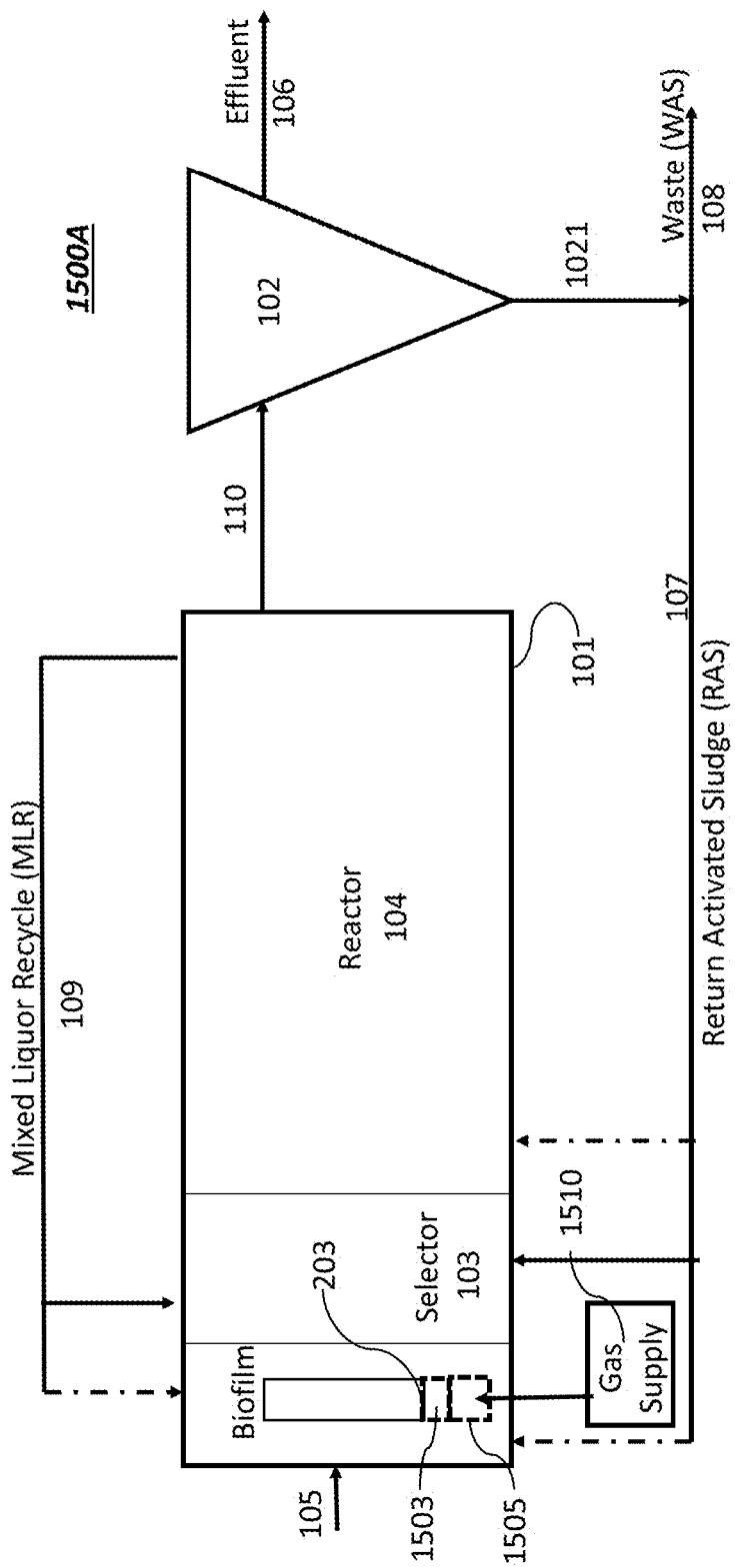
FIG. 18A depicts an embodiment of a wastewater treatment apparatus equipped with an effervescent generator.

FIG. 18A shows an embodiment of a wastewater treatment apparatus 1500A equipped with an effervescent generator 1505. The wastewater treatment apparatus 1500A can include an embodiment of a treatment process or treatment system disclosed herein, including, for example, any of the embodiments depicted in FIGS. 2-14.

Figure 20:
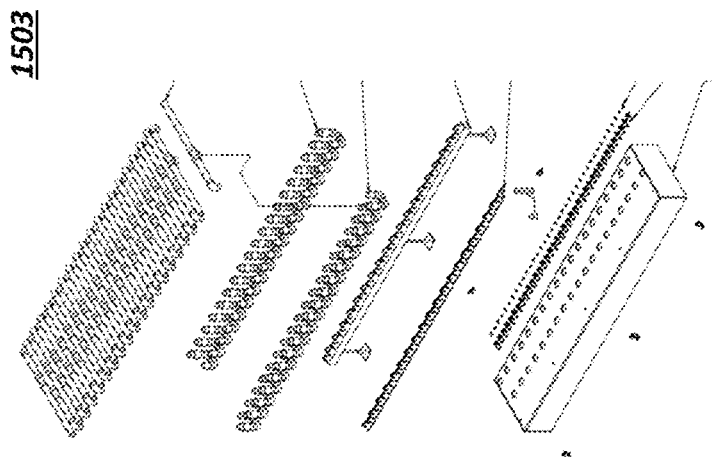
FIG. 20 shows the different parts of the air header system that contains a reservoir at the bottom and the inverted siphon parts and valves associated with the overall air transfer system.

In an embodiment, the wastewater treatment apparatus 1500A includes the inlet 105 that receives the influent containing contaminated water that is supplied to the reactor 101, which can include the selector 103 and the biological nitrogen removal reactor 104. The reactor 101 can include a volume or a series of volumes, including the selector 103. The reactor 101 can include an effervescence diffuser 1503 and the effervescent generator 1505. The effervescence diffuser 1503 can include a gas manifold (for example, as shown in FIG. 20). The effervescent generator 1505 can include a gas chamber and/or an inverted siphon system (ISS). The gas can include, for example, air, oxygen, carbon-dioxide, or nitrogen. The reactor 101 can include a gas supply 1510, or the gas supply 1510 can be located external to the reactor 101, as seen in the embodiment depicted in FIG. 18A.

The volume or series of volumes in the reactor 101 can be configured to contain and treat one or more reactions, including one or more reactions by microorganisms. The reaction can include a reaction that converts, by anammox organisms, ammonia and nitrite to nitrogen gas, in the contaminated water or substrate. The biofilm 203 can include a biofilm media containing at least one of an aerobic biofilm and an anoxic biofilm placed in bulk anoxic condition in the selector 103.

As discussed above, the reactor 101 can include at least one additional inlet configured to receive a nitrate supply from ammonia oxidation, an internal mixed liquor recycle, or a membrane aerated biofilm (for example, as depicted by the return lines in FIG. 18A) and provide the nitrate supply to the biofilm 103 in the selector 203. The reactor 101 can include at least one additional inlet configured to receive a supply of ammonia (for example, as depicted by the return lines in FIG. 18A) for a second reaction that is performed primarily in the biofilm 203 to convert ammonia to nitrogen gas using available nitrite generated from the first reaction. The locations of each additional inlet that receives nitrate supply and/or supply of ammonia can be configured to manage recycles, bypasses, sidestream liquors, influent carbon or wastewater (for example, as discussed above) to produce an influent COD/N ratio for the biofilm media to be less than 6, and preferably less than 4.

The biofilm 203 can include a biofilm or biofilms grown on media that is placed in a media cassette. The biofilm 203 can include a single media cassette or a series of such media cassettes placed in the selector 103. In an embodiment, the biofilm 203 can include the series of media cassettes depicted in FIG. 18C. The selector 103 can include, for example, an anaerobic zone or anoxic zone, which can be included in a volume or series of volumes in the reactor 101.

In an embodiment, the biofilm media cassette 203 is placed in the selector 103 above the effervescence diffuser 1503 and the effervescent generator 1505, which can be supplied with a gas from the gas supply 1510. The effervescence diffuser 1503 and/or the effervescent generator 1505 can be configured to create and emit an intermittent gas discharge.

In various embodiments, the biofilm 203 and/or the biofilm 204 can include a media cage or media cassette, or a series of media cages or media cassettes, each provided with an effervescence diffuser 1503 and/or effervescent generator 1505. In an embodiment, the biofilm media cage or biofilm media cassette can be integrated with the effervescence diffuser 1503 and/or effervescent generator 1505 as a single device or structure.

In an embodiment, the biofilm media cage or biofilm media cassette 203/204 and the effervescence diffuser 1503 and/or effervescent generator 1505 can be fixed in the reactor 101.

In an embodiment, the biofilm media cage or biofilm media cassette 203/204 can be configured to move within the reactor 101, with or without and the effervescence diffuser 1503 and/or effervescent generator 1505. The biofilm media cage or biofilm media cassette 203/204 can be configured to freely move within a volume or series of volumes in the reactor 101.

In various embodiments, the effervescence diffuser 1503 and/or effervescent generator 1505 can be located anywhere in the reactor 101, including, for example, in a bottom portion of the reactor 101. The effervescence diffuser 1503 and/or the effervescent generator 1505 can be built into, or integrated with the reactor 101.

The gas supply 1510 can include, for example, an air blower, an air compressor, or any source of pressurized gas that can supply the gas to the effervescence diffuser 1503 and/or effervescent generator 1505 to facilitate creation of an intermittent gas discharge. The effervescence diffuser 1503 and/or effervescent generator 1505 can be configured to manage mass transfer of substrate to the biofilm 203 and to manage biofilm sloughing to improve the rates and extent of reactions in the reactor 101. The effervescence diffuser 1503 and/or effervescent generator 1505 can include the embodiments of the structures depicted in FIG. 18B and FIG. 20.

Figure 18B:
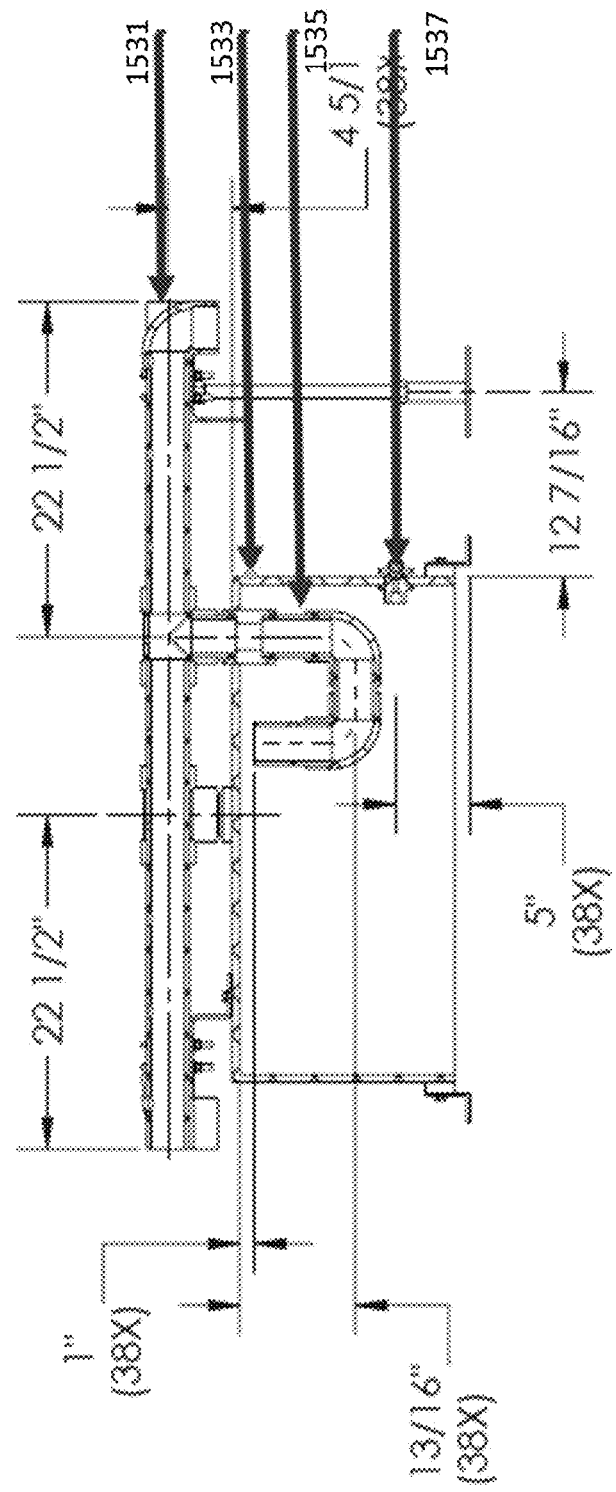
FIG. 18B depicts a partial cross-section view of an embodiment of an effervescence diffuser and effervescent generator.
Figure 18C:
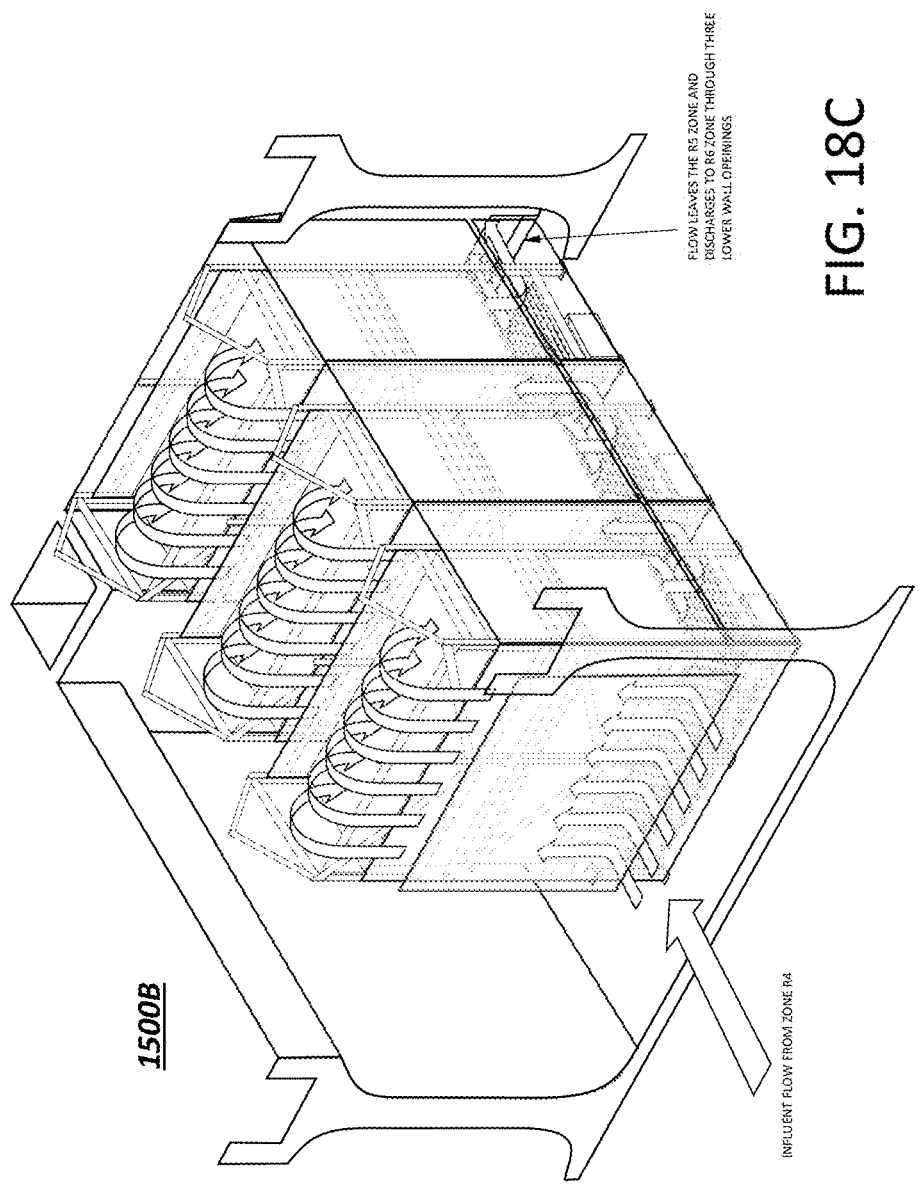
FIG. 18C depicts a design approach for an implementation of cages/cassettes in series in a plug flow approach where the flow moves up vertically and then down the biofilm in a sequential manner thus maximizing the plug-flow movement within series biofilms.

In an embodiment, the biofilm 203 is positioned in the selector 103 in a manner to promote plug flow conditions either within the single media cassette or between a series of media cassettes (for example, as shown in FIG. 18C) to promote the efficient use of supplied substrate and to improve treatment efficiency.

In various embodiments, the wastewater treatment apparatus 1500A brings together any one of flow diagrams of a biological reactor with a fixed biofilm cassette as located in any figure or the permutation or combinations of any of the figures provided herein, and with any biofilm cassette management approach from FIG. 16 to FIG. 20 to develop an overall, system, apparatus and method. Here, the biofilm can be located in a second anoxic zone (as only an example embodiment). The biofilm sloughing and mass transfer (including and not limited to liquid-liquid mass transfer and liquid-solid mass transfer) can be managed using a gas supply such as an air compressor or blower feeding that is operated with a valve that is either manual or automated. The air flow rate can be adjusted as needed. The gas supply line can be converted to an inverted syphon in an air chamber. The syphon releases a gas volume into a diffuser manifold, the frequency of this release being adjusted by the air flow or timer associated with the compressor or blower. The volume of the air chamber determines the magnitude of air release and the air flow or timer determines the frequency of air release. A sensor can be placed within the cassette, or within the biofilm media, or external to the cassette, to monitor and provide automated control of the sloughing and mass transfer based on a physical (such as but not limited to acoustics or vibration), or chemical (such as ammonia or any oxidized nitrogen concentration) value or signature.

FIG. 18B shows a partial cross-section view of an embodiment of the effervescence diffuser 1503 and effervescent generator 1504. In an embodiment, the effervescence diffuser 1503 can include a gas manifold 1531, which can be attached to an inverted siphon 1535. The effervescent generator 1504 can include a gas chamber 1533, which can include, for example, a closed top and open bottom configured to accumulate the gas, such as, for example, air. The effervescent generator 1504 can include the inverted siphon 1535 and a gas supply line 1537. The gas supply line 1537 can be configured to attach, directly or indirectly, to the gas supply 1510 (shown in FIG. 18A). The inverted siphon 1535 can be configured such that, when the gas chamber 1533 fills up to a predetermined low point, it triggers the siphon which then dumps the entire volume of gas chamber 1533 a short period of time (for example, 1 to 2 seconds). The gas dump is stopped basically when it runs out of gas and process liquid is sucked in through the bottom of the gas chamber 1533 (bottom is open to the process) and then it begins its cycle all over again as the gas fills back up.

FIG. 18C shows an embodiment of a design approach 1500B for an implementation of media cassettes (or media cages) in series in a plug flow approach where the flow moves up vertically and then down the biofilm in a sequential manner, thus maximizing the plug-flow movement within series biofilms. In an embodiment, the design approach 1500B can be included in the wastewater treatment apparatus (for example, 1500A shown in FIG. 18A).

The apparatus can include an air manifold located at the bottom to manage and minimize mass transfer resistance within the liquid phase, between the bulk liquid and the biofilm, as well as the thickness of the biofilm (for example, using shear). The counterflow approach for implementation depicted in this figure can include any of the embodiments discussed above, including the embodiments discussed with respect to FIG. 17. The plug-flow characteristics can be developed in any form of series approach with flow moving through any direction including and not limited to vertical, horizontal, inclined, circular or serpentine directions. The plug-flow also can occur within a single cassette if desired as flow proceeds through a cassette. For example, a particular advantage of a plug-flow counterflow approach (within a cassette) is to support the thinnest biofilm (with least mass transfer resistance) near the bottom (closest to the scour location), thus providing most effective treatment, to thereby achieve the lowest concentration for effluent discharge. Another approach is to manage the scour along the cassette length or width by changing the size of bubble openings or even air chamber to provide greater mass transfer where needed as flow moves through a cassette or cassettes.

Figure 19:
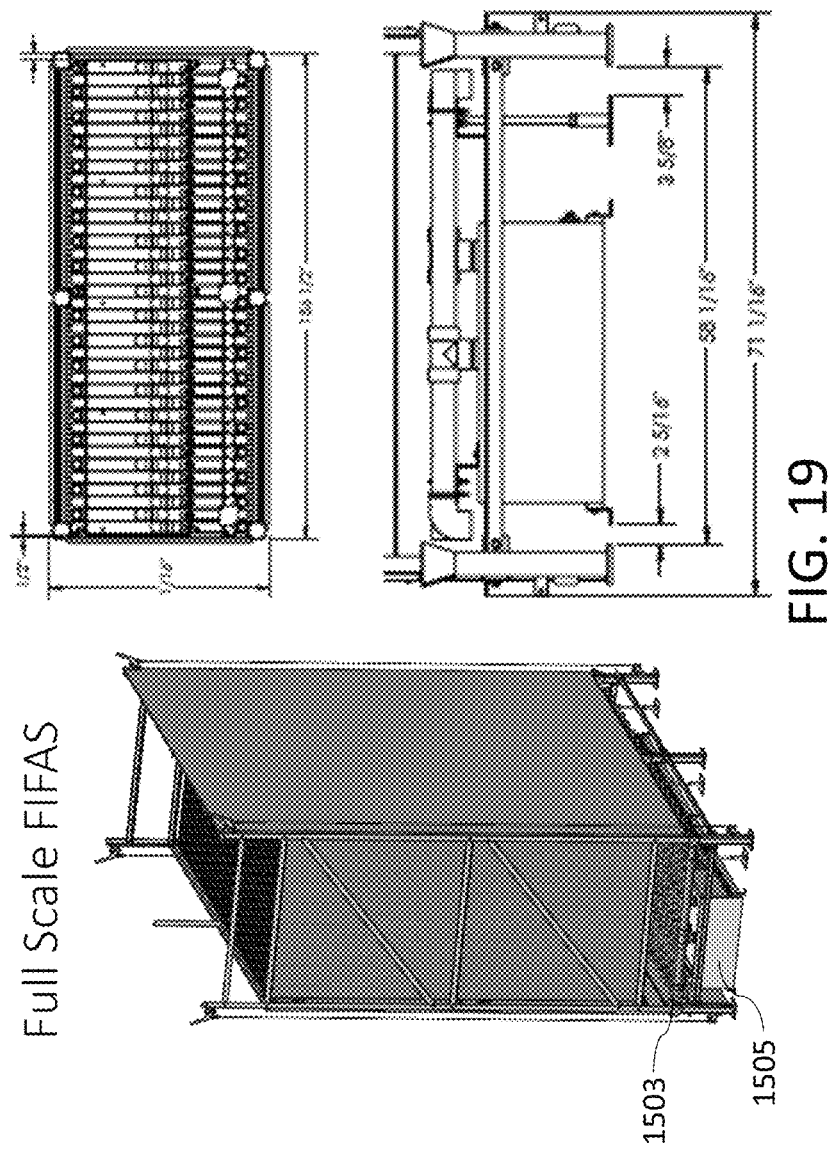
FIG. 19 depicts a single fixed media PdNA frame that includes an effervescent generator located under the fabric sheets to provide both shear for biofilm thickness control and mixing for mass transfer enhancement.

FIG. 19 shows three separate views of an embodiment of a single fixed media PdNA frame, including a perspective side view, a side-cross-section view, and a top (or bottom) cross section view. In the embodiment depicted in the three views, the single fixed media PdNA frame includes the effervescence diffuser 1503 and the effervescent generator 1505, such as, for example, located under fabric sheets, to provide both shear for biofilm thickness control and mixing for mass transfer enhancement. As seen in the top-cross-section view, the effervescent generator 1505 can include the gas diffuser 1531, the gas chamber 1533, the inverted siphon 1535, and the gas supply line 1537 (shown in FIG. 18B).

In an embodiment, effervescence is generated as bubbles that are generated periodically using an inverted siphon system (ISS) in the effervescent generator 1505 (shown in FIG. 18B) that contains the air chamber (or gas chamber) 1533 with compressed air added from the main plant low pressure aeration system via the gas supply line 1537 (shown in FIG. 18B). The words air or gas can be used interchangeably and the supply can include any gas including exhausts from machines or other processes, including for example, oxygen, nitrogen, or carbon dioxide. The pressure is set by the depth of submergence of the ISS plus minor headloss through the air piping. Effervescence can be fired across the length of the sheet using a header system that releases large bubbles periodically even though the air flow into the ISS air chamber can be continuous. The deployment of large bubbles with a fast release minimizes oxygen transfer (and to maintain bulk anoxia) while maximizing turbulence. Effervescence generating headers can be located between each fabric sheet such that mixing and shear are provided over the whole fixed media frame. Bubble firing rate can be controlled by individual air flow control valves directed to each inverted siphon and header. These firing rates can be automated, synchronized or allowed to be random. They can also be controlled based on an online ammonia or nitrate concentration observed in a reactor, or based on a measure of turbulence or mass transfer measured directly or indirectly using shear, acoustics, optics or any other approach. The volume of air chamber is 0.4 cubic feet (cf) with a range of 0.20 to 1 cubic feet for the operating volume of the air chamber.

In an embodiment, the inverted siphon system (ISS) can be fitted within or under the biofilm cassette or cage to assist in managing mass transfer under anoxic or anaerobic bulk conditions. The intent is to use air to manage mass transfer and not to aerate and supply dissolved oxygen. The ISS can include a continuous air supply of air that feeds into an air chamber. The chamber can be configured to slowly fill over a period of time, which sets the firing rate. The firing rate can be adjusted, for example, by increasing or decreasing the air flow into the air chamber with the air supply valves located outside of the reactor. This firing rate can be used to fine tune the mixing and air scouring required in the biofilm media cassette or cage and can be as frequent as every 10-15 seconds or only once per day depending on the application (such as managing liquid mass transfer vs managing biofilm scouring).

As air fills inside the air chamber in the ISS, it will eventually reach a low point in the U-shaped tubing that discharges outside of the air chamber, which is what starts the siphon, such as, for example, an auto priming air siphon. The ISS then dumps the entire volume of the air chamber within a short time period (approximately 1 to 2 seconds) to create a large bubble that rises as effervescence in the liquid in the reactor.

The ISS can include an air diffuser on the discharge of the air chamber. This diffuser can be connected to the discharge of the siphon that exits the air chamber, and evenly distributes the air flow underneath the bottom of the biofilm media. The biofilm media can include any type of media including, fabrics, textiles, ropes or membranes. The diffuser typically will have different size openings across the top to balance the air flow evenly. The openings in this diffuser range from 0.5" to 1.0" but could vary according to application in a much broader range. The length of this air diffuser will roughly match the length of the media sheets (typically 2 ft to 10 ft).

FIG. 20 shows various parts of an embodiment of the effervescence diffuser 1503 and a reservoir portion of the effervescent generator 1505, depicted as a rectangular structure in the drawing. The effervescence diffuser 1503 can include a header system that comprises: a plurality of pipes, each provided with a plurality of bubble opening; a plurality of gas nozzles; a gas manifold; and/or one or more valves associated with the overall gas transfer system. The reservoir can include the inverted siphon system's parts and valves associated with the overall air transfer system.

Figure 21:
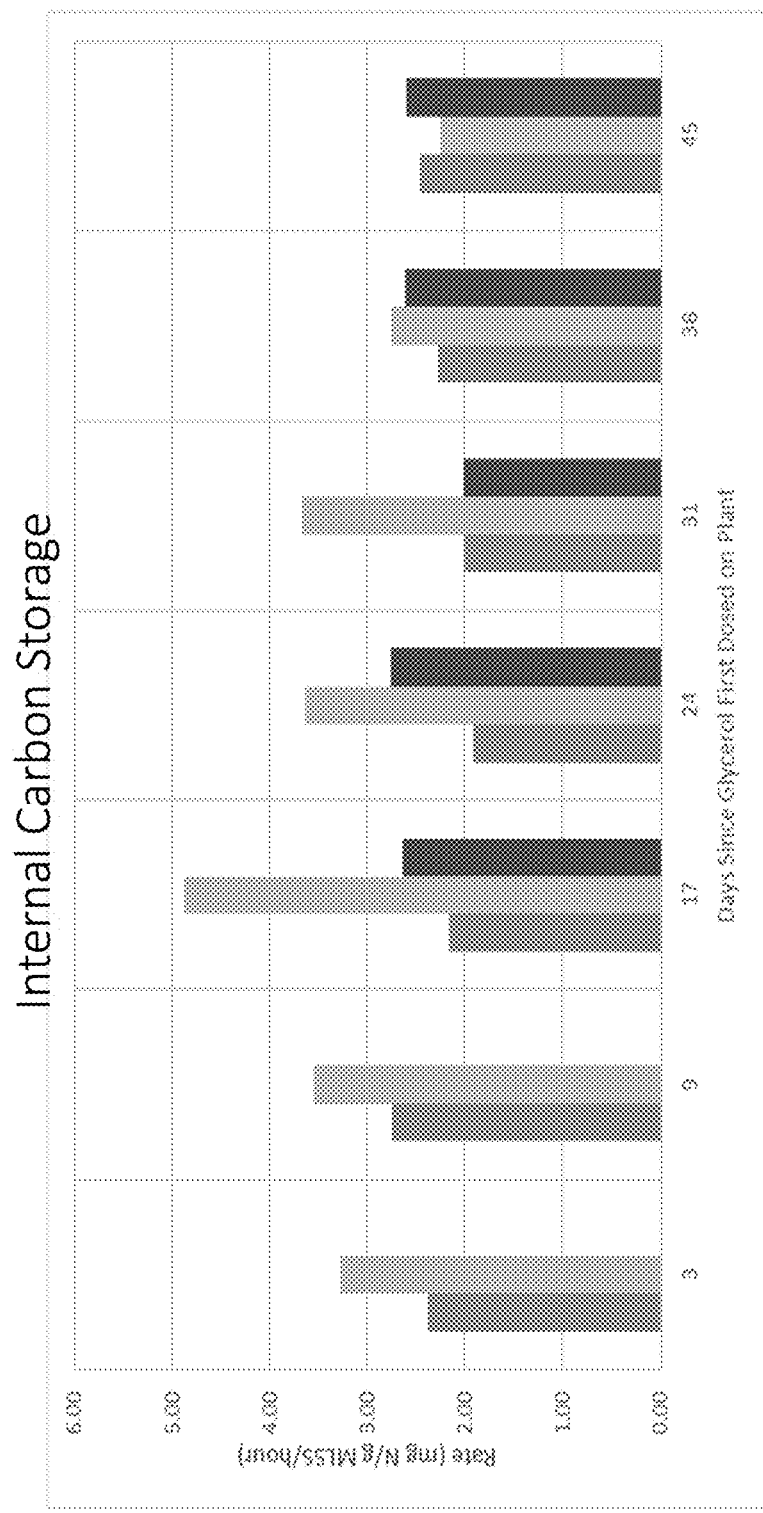
FIG. 21 shows a graph depicting an example of nitrate removal rates from endogenous (grey), glycerol (light grey), and methanol (dark gray) specific denitrification rate (SDNR) batch tests.

FIG. 21 shows a graph depicting an example of nitrate removal rates from endogenous (grey), glycerol (light grey), and methanol (dark gray) specific denitrification rate (SDNR) batch tests. The graph illustrates the rates for a partial denitrification (PdN) reaction that were achieved with storage. Glycerol was dosed to the full-scale IFAS tanks for 27 days. The nitrate removal rates from these tests are displayed in FIG. 21. After glycerol was dosed to the main plant, the glycerol removal rate slowly increased and stabilized to 3.7 mg N/g MLSS/hour. The glycerol feed to the plant was stopped on day 27, at which point the removal rate decreased in the following two tests.

Figure 22:
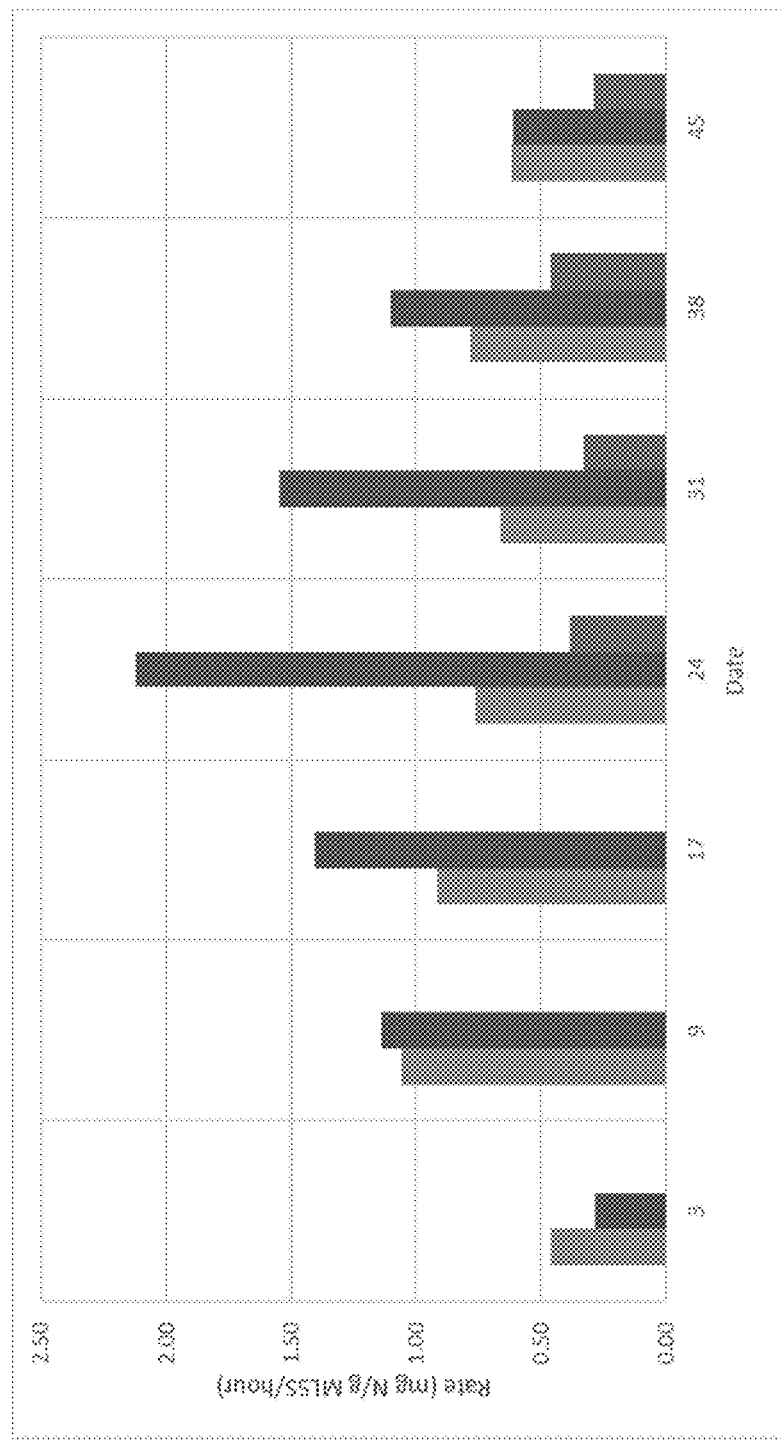
FIG. 22 shows a graph depicting an example of nitrite accumulation rates from endogenous (light grey), glycerol (dark grey), and methanol (grey) SDNR batch tests.

Overall, the storage, which can be estimated in a batch or full-scale after the external carbon is used up or in the absence of external carbon, and methanol removal rates appeared to remain relatively consistent throughout this time, with the average storage nitrate removal rate being 2.28±0.28 mg N/g MLSS/hour and the average methanol removal rate being 2.53±0.29 mg N/g MLSS/hour. The average glycerol removal rate was 3.43±0.83 mg N/g MLSS/hour. This comprises the first reaction. The corresponding nitrite accumulation rates (for example, for use by anammox in a second reaction within biofilms) from the same specific denitrification rate (SDNR) tests are displayed in FIG. 22. Here "storage" means the carbon supplied by microbes without external carbon added, and so includes internally/externally stored and decay products. A broad range of rates are contemplated using storage carbon in the first reaction (from 0.5 to 4.0 mg N/g MLSS/hour). The extent of nitrate removal in the first reaction can vary between 1 mg/L to 10 mg/L or more and the TIN removal achieved in the entire reaction could approach as high 20 mg/L or more based on design approaches. The residual total inorganic nitrogen remaining after the PdNA reaction could be less than 1 mg/L.

The storage SDNR tests display high rates of denitrification and makes the average storage nitrate removal rate from these tests over double that which is typically seen. This has major implications for a PdNA IFAS reactor since the presence of the activated sludge (suspended growth) in an IFAS reactor allows for this storage denitrification to be taken advantage of to lower the process' or apparatus' carbon demand even more (10% to 100%).

The glycerol nitrite accumulation rate also increased while glycerol was dosed. This increase in nitrite accumulation leads to an increase in PdN efficiency in the glycerol tests as well. Once glycerol is no longer dosed to the main plant on day 27, the nitrite accumulation rate begins to drop. The average glycerol $NO_2$ accumulation rate was 1.19±0.58 mg N/g MLSS/hour. Again, the storage and methanol rates stayed relatively consistent, with an average storage $NO_2$ accumulation rate of 0.72±0.25 mg N/g MLSS/hour and an average methanol $NO_2$ accumulation rate of 0.33±0.10 mg N/g MLSS/hour for use by anammox in the second reaction. Since the average methanol accumulation rate is lower compared to the storage rate, the addition of methanol significantly decreased the PdN efficiency of the activated sludge when compared to the rates achieved from storage carbon. These nitrite accumulation rates also make use of storage denitrification in a PdNA IFAS reactor promising, since a large amount of PdN and nitrite accumulation is occurring without the use of external organic carbon sources (up to 44%).

TABLE

| Day | Storage PdN % |
|-----|---------------|
| 3   | 44.3%         |
| 9   | 33.3%         |
| 17  | 35.2%         |
| 24  | 34.6%         |
| 31  | 39.1%         |
| 38  | 27.0%         |
| 45  | 11.5%         |

The table above provides the percent PdN that occurs from storage. The amount of nitrate removal from storage can extend from as low as 1 mg/L to as high as 10 mg/L or more. Many plants cannot bring nitrate down below 10 mg/L and so storage-based PdN along with anammox becomes hugely important for plant intensification, carbon efficiency, and to achieve low total inorganic nitrogen residuals of as low as 1 mg/L. This efficiency can be increased further, as needed, using the selection processes discussed above, each of which can enhance storage, such as within a sidestream fermenting reactor, a separate fermenter, a photoreactor, a physical selector, or a bypass splitter.

In various embodiments, the PdNA efficiency using storage can be between about 10% and about 100%, where efficiency can be defined by the use of carbon for the nitrate to nitrite reaction, relative to the nitrite to nitrogen gas reaction, and computed as the percent carbon used in the first step as compared to the overall combination of steps. The storage compound can include any microbially produced compounds, and can be used concomitant to any externally added substrate, electron donor or energy source. The storage contribution to PdNA can extend between 10%-100% of the process, where the storage contribution is calculated as percent of denitratation from microbially generated carbon to denitratation from a combination of microbially generated carbon and added carbon (the added carbon could include wastewater or fermentate, methanol, glycerol, acetic acid, sugars, etc.).

In various embodiments, a wastewater treatment apparatus comprises a biological nitrogen removal reactor and clarifier having a volume or a series of volumes, including: (a) a first anoxic or anaerobic selector zone or zones, or stage or stages, of hydraulic retention time of between ten min and two hours; (b) a second anoxic zone or zones or stage or stages, equipped with biofilm or biofilms; (c) having a supply of a microbially stored substrate that is generated within the selector of said range of hydraulic retention time, supplying between 10 and 100% of the carbon needed for a first reaction in the zone(s) or stage(s) to convert nitrate to nitrite using the microbially stored substrate for a first reaction that is carried out mostly by suspended bacteria; (d) and a supply of ammonia for a second reaction that is performed primarily in a biofilm, thereby converting the ammonia to nitrogen gas using the available nitrite generated from the first reaction with anammox organisms.

In various embodiments, the wastewater treatment apparatus comprises biological nitrogen removal reactor and a clarifier, having a volume or a series of volumes, with a zone or stage: (i) equipped with biofilm or biofilms grown on media that is placed in a cassette or cassettes placed in an anaerobic or anoxic zone; (ii) the media cassette being placed above effervescence diffusers equipped with an air supply from a blower, compressor, or effervescent generator comprising an inverted siphon to create an intermittent gas discharge, to manage mass transfer of substrate to the biofilm and to manage biofilm sloughing, to improve the rates and extent of reaction; and (iii) the cassettes are positioned in a manner to promote plug flow conditions either within a single cassette or between a series of cassettes to promote the efficient use of supplied substrate and to improve treatment efficiency.

In various embodiments, the wastewater treatment apparatus comprises a biological nitrogen removal reactor, having a volume or a series of volumes, with a pre-anoxic zone or stage: (i) equipped with an aerobic and/or anoxic biofilm placed in bulk anoxic condition in this pre-anoxic zone in or near the front of the reactor; (ii) having a nitrate supply, from ammonia oxidation, internal mixed liquor recycle or membrane aerated biofilm, to the anoxic biofilm in the anoxic zone; (iii) having a supply of influent wastewater or substrate to convert nitrate to nitrite for a first reaction that is carried out preferably by suspended bacteria; (iv) a supply of ammonia for a second reaction that is performed primarily in a biofilm, thereby converting the ammonia to nitrogen gas using the available nitrite generated from the first reaction with anammox organisms; and (v) wherein by the management of recycles, bypasses, sidestream liquors, or influent carbon or wastewater, produces an influent COD/N ratio for the pre-anoxic biofilm to be less than 6 and preferably less than 4.

In an embodiment of the apparatus, the biofilm is grown on fixed media, moving media, mobile media. a membrane aerated biofilm reactor (MABR) or membrane biofilm reactor, trickling filter or any media structure to support such biofilm.

In an embodiment, the apparatus has a supply of substrate to convert nitrate to nitrite for a first reaction that is carried out preferably by suspended bacteria and a supply of ammonia for a second reaction that is performed primarily in a biofilm, thereby converting the ammonia to nitrogen gas using the available nitrite generated from the first reaction with anammox organisms.

In an embodiment, the apparatus the reduction of nitrate to nitrite has an electron donor and the electron donor is influent wastewater, fermentate, hydrolysate, digester gas, digestate liquor, leachate, condensate, or an external carbon source, or the donor is produced from a photo source, radiation or electricity source.

In an embodiment, the influent wastewater is directed to the biofilm zone and contains nitrified or partially nitrified digestate liquor, such as that originating from a sidestream aeration zone with return activated sludge.

In an embodiment, the influent wastewater contains methane produced from an upstream anaerobic reactor or a separate anaerobic digester that is used to grow denitrifying methane oxidation organisms on the aerobic or anoxic biofilm.

In an embodiment, the apparatus comprises a physical selector, including a size or compression-based separation device, including screen, filter or a density separation device including a hydrocyclone is used to separate dense or larger particles with longer solids retention time to encourage the growth of slow growing denitrifying storage organisms.

In an embodiment, the plug flow conditions are promoted by using a stretched tank geometry of a length-width-ratio of larger than 3, preferably larger than 5, or, a total recycle rate of less than 100%, or, by diverting the internal mixed liquor recycle introduction location downstream of return activated sludge introduction location.

In an embodiment, a wastewater treatment apparatus comprises a biological nitrogen removal reactor and a clarifier, having a volume or a series of volumes, with a zone or stage: equipped with biofilm or biofilms; equipped with a selector or selectors and having a supply of a microbially stored substrate that is generated within or by using a selector; and ammonia, maximizing the reduction of nitrate to nitrite using the microbially stored substrate for a first reaction that is mostly carried out by suspended bacteria. The biofilm can be configured to convert the nitrite and supplied ammonia to nitrogen gas in a second reaction.

In an embodiment, an apparatus for treatment of nitrogen in wastewater comprises heterotrophic denitrification in suspended phase and anammox reactions in fixed or mobile biofilms within a plug flow or compartmentalized reactor, wherein storage and use of stored products that is produced from an external electron donor drives the reactions associated with the denitrification reaction in the suspended phase preferably from nitrate to nitrite in a first reaction, and the use of ammonia and nitrite drives the second reaction in the fixed biofilm.

In an embodiment, the aerobic biofilm is a membrane aerated biofilm reactor (MABR) or membrane biofilm reactor. The membrane aerated biofilm reactor (MABR) can be either polymeric or ceramic or made with inorganic material.

In an embodiment, the aerobic and anoxic biofilms are either separated in different zones or integrated in the same zone with different membrane aerated biofilm reactor (MABR) cage or media cassette or filter structure. An anoxic media cage or cassette or filter structure can be included and arranged in the same zone, placed either one on top of each other, or next to each other, or in any way meant to encourage the use and transfer of substrates in the reactor and between the biofilms, or integrated on the same biofilm, or, intertwined or interspersed on separate biofilms within a single biofilm cage, or filter structure or otherwise arranged within a cage or cassette or filter structure to optimize biofilm surface area and location.

In an embodiment, a wastewater treatment method comprises a biological nitrogen removal process, having a volume or a series of volumes, with a preanoxic zone or stage and a clarifier, the method comprising: equipping a reactor with an aerobic and/or anoxic biofilm or biofilms placed in bulk anoxic condition; having an internal mixed liquor recycle supplying nitrate to biofilm in the anoxic zone; and having a supply of an organic substrate and ammonia maximizing the reduction of nitrate to nitrite using the organic substrate for a first reaction that is mostly carried out by suspended bacteria, wherein the biofilm converts the nitrite and supplied ammonia to nitrogen gas, and wherein the clarifier supplies most or all of return activated sludge downstream of the biofilm contained in the anoxic zone thus assuring the high concentration gradient of ammonia and nitrite substrates overcoming biofilm mass transfer resistance. The clarification process can be arranged to supply most or all of return activated sludge to a location downstream of the biofilm contained in the preanoxic zone, thus assuring the high concentration gradient of ammonia and nitrite substrates, and overcoming biofilm mass transfer resistance.

In an embodiment, a deadband nitrate concentration is used to manage the partial denitrification and anammox reaction, where the lower deadband is maintained between 0.5-1.5 mg/L and the upper deadband is maintained between 1.5-5.0 mg/L by either managing carbon dosing, recycles, or biofilm mass transfer, or sloughings in suspension.

In an embodiment, a wastewater treatment apparatus comprises a biological nitrogen removal reactor having one or more clarifiers, having a volume or a series of volumes, with a preanoxic zone or stage that is upstream of an aerobic or reaeration zone or stage but also downstream of an aerobic zone or stage. The apparatus can be configured with an aerobic and/or anoxic biofilm or biofilms placed in bulk anoxic condition and arranged to receive receiving nitrate from the upstream aerobic zone, with a supply of an organic substrate or using internally stored substrate, and ammonia, thereby maximizing the reduction of nitrate to nitrite using the organic substrate or internally stored substrate for a first reaction that is mostly carried out by suspended bacteria. The biofilm can be configured to convert the nitrite and supplied ammonia to nitrogen gas.

In an embodiment, a wastewater treatment method comprises a biological nitrogen removal process, having a volume or a series of volumes, with a preanoxic zone or stage that is upstream of an aerobic or reaeration zone or stage but also downstream of an aerobic zone or stage. The method comprises equipping the reactor with an aerobic and/or anoxic biofilm or biofilms placed in bulk anoxic condition, and receiving nitrate from the upstream aerobic zone with a supply of an organic substrate or using internally stored substrate, and ammonia, thereby maximizing the reduction of nitrate to nitrite using the organic substrate or internally stored substrate for a first reaction that is mostly carried out by suspended bacteria, wherein the biofilm converts the nitrite and supplied ammonia to nitrogen gas.

In an embodiment, a wastewater treatment method comprises: supplying an organic substrate and ammonia to a biological nitrogen removal process, thereby maximizing the reduction of nitrate to nitrite using the organic substrate for a first reaction that is mostly carried out by suspended bacteria, wherein the biological nitrogen removal process has a volume or a series of volumes, is equipped with a preanoxic zone or stage and a clarifier, and is equipped with an aerobic and/or anoxic biofilm or biofilms placed in bulk anoxic condition; and supplying the nitrate to the biofilm in the anoxic zone by an internal mixed liquor recycle, wherein the biofilm converts the nitrite and supplied ammonia to nitrogen gas; and wherein the clarifier supplies most or all of return activated sludge downstream of the biofilm contained in the anoxic zone thus assuring the high concentration gradient of ammonia and nitrite substrates overcoming biofilm mass transfer resistance. The method can include a clarification process that supplies most or all of return activated sludge to a location downstream of the biofilm contained in the preanoxic zone, thus assuring the high concentration gradient of ammonia and nitrite substrates, and overcoming biofilm mass transfer resistance. The anoxic biofilm can be fixed or moving. The anoxic biofilm can be made of synthetic or plastic carriers, cellulosic or organic material, sand, anthracite, wood chips, stones, membrane or ceramic biofilms or encapsulated in pure or mixed cultures or any other suitable media. The aerobic and anoxic biofilms can be separated in different zones or Integrated in the same zone with different MABR cage or cassette or filter structure and anoxic cage or cassette or filter structure arranged in the same zone, placed either one on top of each other, or next to each other, or in any way meant to encourage the use and transfer of substrates in the reactor and between the biofilms, or integrated on the same biofilm, or, intertwined or interspersed on separate biofilms within a single biofilm cage, or filter structure or otherwise arranged within a cage or cassette or filter structure to optimize biofilm surface area and location. The electron donor can be the influent wastewater, fermentate, digestate liquor, leachate, or an external carbon source. The influent wastewater can be bypassed downstream of biofilm and the high concentration fermentate, digestate liquor, leachate, condensate or external carbon is fed to the biofilm to maintain high electron donor concentration gradient. The return activated sludge bypass of the aerobic or anoxic biofilm can be between 50-100%. The influent wastewater can have a low carbon to nitrogen ratio typical of an A-stage process, a contact stabilization process, and/or an influent wastewater with high soluble chemical oxygen demand, such as from a chemically enhanced primary clarifier, primary screen or primary filter. The influent wastewater can be directed to the biofilm zone contains nitrified or partially nitrified digestate liquor, such as that originating from a separate sidestream aeration zone with a portion of RAS and the digestate liquor, nitrifying the ammonia to a combination of nitrate and nitrite. The influent wastewater can contain methane produced from an upstream anaerobic reactor that is used to grow denitrifying methane oxidation organisms on the aerobic or anoxic biofilm. A screen or filter or a density separation device can be used to select and retain heavier biofilm sloughings or suspended particles. A deadband nitrate concentration can be used to manage the partial denitrification and anammox reaction, where the lower deadband is maintained between 0.5-1.5 mg/L and the upper deadband is maintained between 1.5-5.0 mg/L by either managing carbon dosing, recycles, or biofilm mass transfer, or sloughings in suspension. The carbon can be from influent wastewater or processed from influent wastewater as a fermentate or stored carbon, or added as an external carbon source.

In an embodiment, a wastewater treatment method comprises: supplying an organic substrate or using internally stored substrate, and ammonia to a biological nitrogen removal process, thereby maximizing the reduction of nitrate to nitrite using the organic substrate or internally stored substrate for a first reaction that is mostly carried out by suspended bacteria, wherein the biological nitrogen removal process has a volume or a series of volumes, is equipped with a preanoxic zone or stage that is upstream of an aerobic or reaeration zone or stage but also downstream of an aerobic zone or stage, and is equipped with an aerobic and/or anoxic biofilm or biofilms placed in bulk anoxic condition; and supplying the nitrate from the upstream aerobic zone to the biofilm, wherein the biofilm converts the nitrite and supplied ammonia to nitrogen gas.

In an embodiment, the anoxic biofilm is made of synthetic or plastic carriers, cellulosic or organic material, sand, anthracite, wood chips, membrane or ceramic biofilms or encapsulated in pure or mixed cultures or any other suitable media.

In an embodiment, the influent wastewater has a low carbon to nitrogen ratio typical of an A-stage process, a contact stabilization process, UASB, anaerobic membrane bioreactor, and/or an influent wastewater with high soluble chemical oxygen demand, such as from a chemically enhanced primary clarifier, primary screen or primary filter.

In an embodiment, an ammonia or nitrate probe is inserted either attached to or downstream of a cassette or cassettes, and a PID or dead band controller is used to manage the partial denitrification and anammox reaction, using an ammonia or nitrate measurement signal.

In an embodiment, the multiple biofilms are: separated in different zones; moving between zones; a combination of moving, mobile or fixed; integrated in the same zone, including different membrane aerated biofilm reactor (MABR) or membrane biofilm reactor (MBfR) cassette or filter structure arranged in the same zone, placed either one on top of each other, or next to each other, or in any way meant to encourage the use and transfer of substrates in the reactor and between the biofilms; integrated on the same biofilm; or intertwined or interspersed on separate biofilms within a single biofilm cassette, or filter structure or otherwise arranged within a cassette or filter structure to optimize biofilm surface area and location.

It is understood that the various disclosed embodiments are shown and described above to illustrate different possible features of the disclosure and the varying ways in which these features can be combined. Apart from combining the features of the above embodiments in varying ways, other modifications are also considered to be within the scope of the disclosure. The disclosure is not intended to be limited to the preferred embodiments described above. The disclosure encompasses all alternate embodiments that fall literally or equivalently within the scope of these claims.

It is understood that the various disclosed embodiments are shown and described above to illustrate different possible features of the disclosure and the varying ways in which these features can be combined. Apart from combining the features of the above embodiments in varying ways, other modifications are also considered to be within the scope of the disclosure. The disclosure is not intended to be limited to the preferred embodiments described above. The disclosure encompasses all alternate embodiments that fall literally or equivalently within the scope of these claims.

The various embodiments discussed above can be mixed and matched as needed. For instance, aerobic, anoxic or anaerobic zones can be added or interchanged as needed. The reactions as proposed can occur in series or parallel or even interchanged in order.

The terms "a," "an," and "the," as used in this disclosure, means "one or more," unless expressly specified otherwise.

The term "approach," as used in this disclosure, means "a method or a process," unless expressly specified otherwise.

The terms "including," "comprising," "having" and their variations, as used in this disclosure, mean "including, but not limited to," unless expressly specified otherwise.

References in the specification to "one embodiment," "an embodiment," "an example embodiment," etc., indicate that the embodiment described can include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Values expressed in a range format can be interpreted in a flexible manner to include not only the numerical values explicitly recited as the limits of the range, but also to include all the individual numerical values or sub-ranges encompassed within that range as if each numerical value and sub-range is explicitly recited. For example, a concentration range of "about 0.1% to about 5%" can be interpreted to include not only the explicitly recited concentration of about 0.1 wt. % to about 5 wt. %, but also the individual concentrations (for example, 1%, 2%, 3%, and 4%) and the sub-ranges (for example, 0.1% to 0.5%, 1.1% to 2.2%, and 3.3% to 4.4%) within the indicated range. The statement "about X to Y" has the same meaning as "about X to about Y,"" unless indicated otherwise. Likewise, the statement "about X, Y, or about Z" has the same meaning as "about X, about Y, or about Z," unless indicated otherwise.

The term "or" is used to refer to a nonexclusive "or" unless otherwise indicated. Unless indicated otherwise, the statement "at least one of" when referring to a listed group is used to mean one or any combination of two or more of the members of the group. For example, the statement "at least one of A, B, and C" can have the same meaning as "A; B; C; A and B; A and C; B and C; or A, B, and C," or the statement "at least one of D, E, F, and G" can have the same meaning as "D; E; F; G; D and E; D and F; D and G; E and F; E and G: F and G; D, E, and F; D, E, and G; D, F, and G; E, F, and G; or D, E, F, and G." A comma can be used as a delimiter or digit group separator to the left or right of a decimal mark; for example, "0.000,1"" is equivalent to "0.0001."

The term "wastewater," as used in this disclosure, means "water or wastewater," unless expressly specified otherwise.

In the methods described herein, the steps can be carried out in any order without departing from the principles of the invention, except when a temporal or operational sequence is explicitly recited. Furthermore, specified steps can be carried out concurrently unless explicit language recites that they be carried out separately. For example, a recited act of doing X and a recited act of doing Y can be conducted simultaneously within a single operation, and the resulting process will fall within the literal scope of the process. Recitation in a claim to the effect that first a step is performed, and then several other steps are subsequently performed, shall be taken to mean that the first step is performed before any of the other steps, but the other steps can be performed in any suitable sequence, unless a sequence is further recited within the other steps. For example, claim elements that recite "Step A, Step B, Step C, Step D, and Step E" can be construed to mean step A is carried out first, step E is carried out last, and steps B, C, and D can be carried out in any sequence between steps A and E (including with one or more steps being performed concurrent with step A or Step E), and that the sequence still falls within the literal scope of the claimed process. A given step or sub-set of steps can also be repeated.

Furthermore, specified steps can be carried out concurrently unless explicit claim language recites that they be carried out separately. For example, a claimed step of doing X and a claimed step of doing Y can be conducted simultaneously within a single operation, and the resulting process will fall within the literal scope of the claimed process.

Devices that are in communication with each other need not be in continuous communication with each other unless expressly specified otherwise. In addition, devices that are in communication with each other may communicate directly or indirectly through one or more intermediaries.

Although process steps, method steps, or algorithms may be described in a sequential or a parallel order, such processes, methods and algorithms may be configured to work in alternate orders. In other words, any sequence or order of steps that may be described in a sequential order does not necessarily indicate a requirement that the steps be performed in that order; some steps may be performed simultaneously. Similarly, if a sequence or order of steps is described in a parallel (or simultaneous) order, such steps can be performed in a sequential order. The steps of the processes, methods or algorithms described in this specification may be performed in any order practical.

When a single device or article is described, it will be readily apparent that more than one device or article may be used in place of a single device or article. Similarly, where more than one device or article is described, it will be readily apparent that a single device or article may be used in place of the more than one device or article. The functionality or the features of a device may be alternatively embodied by one or more other devices which are not explicitly described as having such functionality or features.

The subject matter described above is provided by way of illustration only and should not be construed as limiting. Various modifications and changes can be made to the subject matter described herein without following the example embodiments and applications illustrated and described, and without departing from the true spirit and scope of the invention encompassed by the present disclosure, which is defined by the set of recitations in the following claims and by structures and functions or steps which are equivalent to these recitations.

The invention claimed is:

1. A wastewater treatment apparatus, comprising: an influent containing contaminated water; a biological nitrogen removal reactor having an inlet configured to receive the influent and a volume, or a series of volumes, configured to contain and treat the contaminated water in one or more reactions, including (1) pre-anoxic selector zone located in an upstream portion of the biological nitrogen removal reactor configured to select organism for a reduction of nitrate or nitrite, having a biofilm media comprising an anammox biofilm or (2) a famine zone located in a downstream portion of biological nitrogen removal reactor configured to select organism for a reduction of nitrate or nitrite, having a biofilm media comprising an anammox biofilm; an effervescence diffuser located below or proximate to the biofilm media in the biological nitrogen removal reactor and configured to emit an intermittent gas bubble discharge, the effervescence diffuser being further configured for turbulence, to manage biofilm sloughing on the biofilm media, to manage mass transfer of substrate to the biofilm media, or to promote floatation or immersion, and a clarifier located downstream of the biological nitrogen removal reactor and configured to receive a solid-liquid mixture from the biological nitrogen removal reactor; wherein: the biofilm media is either moving, mobile, positioned or fixed in the anoxic selector zone to promote either complete mixed or plug flow conditions for the biofilm media; the biofilm media comprises a single media cassette, or a series of media cassettes, or moving or mobile having the anammox biofilm grown on a media; and the effervescence diffuser includes a gas supply coupled, directly or indirectly, to an air blower, an air compressor, or an inverted siphon.

2. The wastewater treatment apparatus in claim 1, further comprising an outlet, wherein the clarifier is located between the biological nitrogen removal reactor and the outlet.

3. The wastewater treatment apparatus in claim 1, wherein the reduction of nitrate or nitrite is performed in the anoxic selector zone and has an electron donor provided by the influent containing contaminated water, a fermentate, a hydrolysate, a digester gas, a digestate liquor, a leachate, a condensate, or an external carbon source, or the electron donor results from exposure to an electromagnetic energy source.

4. The wastewater treatment apparatus in claim 1, wherein the bubble firing rate is controlled based on air flow control valves, or automated based or online ammonia or nitrate concentration observed in the reactor, or based on a measure of turbulence or mass transfer measured directly or indirectly using shear, acoustics or optics.

5. The wastewater treatment apparatus in claim 1, wherein the biofilm media comprises:

a biofilm grown on a media that is placed in the media cassette;
a biofilm grown on a fixed media;
a biofilm grown on a moving media;
a biofilm grown on a mobile media;
a membrane aerated biofilm reactor (MABR);
a membrane biofilm reactor;
a trickling filter;
a synthetic carrier;
a plastic carrier;
a cellulosic material;
an organic material;
sand;
anthracite;
wood chips;
a ceramic biofilm;
a pure organism culture; or
mixed organism cultures.

6. The wastewater treatment apparatus in claim 1, wherein the biological nitrogen removal reactor is configured to direct the influent to a biofilm zone that contains nitrified or partially nitrified digestate liquor.

7. The wastewater treatment apparatus in claim 1, the apparatus further comprising:

an ammonia sensor or an oxidized nitrogen sensor; or
a controller configured to manage partial denitrification and an anammox reaction based on an ammonia or nitrate measurement signal received from said ammonia sensor or said oxidized nitrogen sensor, respectively.

8. A wastewater treatment apparatus, comprising: an influent containing contaminated water; a biological nitrogen removal reactor having an inlet configured to receive the influent and a volume, or a series of volumes, configured to contain and treat the contaminated water in a plurality of reactions, including-a first selector zone or stage comprising a microbially stored substrate having a hydraulic retention time of between about ten minutes and about one-hundred-twenty minutes, and—a second selector zone or stage configured to contain a biofilm media; and an outlet configured to output an effluent, wherein said biological nitrogen removal reactor is further configured to:—use the microbially stored substrate within the second selector zone or stage to supply between about 10% and about 100% of carbon, wherein the microbially stored substrate comprises carbon without external carbon added, and is used by a first reaction to reduce, by suspended bacteria, nitrate to nitrite; and—supply ammonia for a second reaction, performed primarily by anammox organisms in the biofilm media, to convert the ammonia to nitrogen gas using available nitrite generated from the first reaction.

9. The wastewater treatment apparatus in claim 8, wherein the biofilm media comprises:

a biofilm grown on a media that is placed in a media cassette;
a biofilm grown on a fixed media;
a biofilm grown on a moving media;
a biofilm grown on a mobile media;
a membrane aerated biofilm reactor (MABR);
a membrane biofilm reactor;
a trickling filter;
a synthetic carrier;
a plastic carrier;
a cellulosic material;
an organic material;
sand;

anthracite;
wood chips;
a ceramic biofilm;
a pure organism culture; or
mixed organism cultures.

10. The wastewater treatment apparatus in claim 8, the apparatus further comprising:
an air supply line;
an effervescence diffuser coupled, directly or indirectly, to the air supply line, the effervescence diffuser being configured to emit an intermittent air discharge to an anammox biofilm located above and proximate to the effervescence diffuser to:
manage or control mass transfer of substrate to the anammox biofilm; or
manage or control sloughing on the anammox biofilm; or
promote, or increase a reaction rate in, at least one of said plurality of reactions; or
promote mixing, floatation, or immersion.

11. The wastewater treatment apparatus in claim 8, wherein the biological nitrogen removal reactor comprises:
an anoxic selector zone or stage; and
a nitrate feed provided to an anoxic biofilm in the anoxic selector zone or stage from (i) ammonia oxidation, (ii) an internal mixed liquor recycle stream, or (iii) a membrane aerated biofilm.

12. The wastewater treatment apparatus in claim 8, wherein the biological nitrogen removal reactor is configured to manage or control one or more of a recycle stream, a bypass, a sidestream liquor, an influent carbon, or the influent.

13. The wastewater treatment apparatus in claim 1, wherein the influent contains methane produced that is used to grow denitrifying methane oxidation organisms on an aerobic or anoxic biofilm.

14. The wastewater treatment apparatus in claim 8, the apparatus further comprising:
a particle selector configured to separate particles based on particle size, particle compressibility, or particle density, and to select particles having longer solid retention time to encourage the growth of slow growing denitrifying storage organisms,
wherein the particle selector comprises an outlet configured to supply a recycle stream to the biological nitrogen removal reactor.

15. The wastewater treatment apparatus in claim 8, the apparatus comprising a stretched tank to promote plug flow conditions, wherein the stretched tank is constructed to:
have a length-to-width ratio greater than 3; or
a total recycle rate of less than 100%; or
divert an internal mixed liquor recycle stream introduction to a location downstream of a return activated sludge introduction location in the biological nitrogen removal reactor.

16. The wastewater treatment apparatus in claim 8, the apparatus comprising one or more additional biofilm media, wherein the biological nitrogen removal reactor is configured such that said biofilm media and said one or more additional biofilm media:
are separated in different selector zones; or
move between different selector zones; or
are fixed in different selector zones; or
are integrated in the same selector zone.

17. A wastewater treatment apparatus, comprising:
an influent containing contaminated water;
a biological nitrogen removal reactor having an inlet configured to receive the influent and a volume, or a series of volumes, configured to contain and treat the contaminated water in one or more reactions, including a selector zone having a biofilm media comprising an anammox biofilm, wherein the selector zone is configured to select organism for a reduction of nitrate or nitrite;
an effervescence diffuser located below or proximate to the biofilm media in the biological nitrogen removal reactor and configured to emit an intermittent gas discharge to manage mass transfer of substrate to the biofilm media, the effervescence diffuser being further configured to manage biofilm sloughing on the biofilm media to improve at least one of a rate of reaction or an extent of a reaction; or to promote mixing, floatation or immersion, and
a clarifier located downstream of the biological nitrogen removal reactor and configured to receive a solid-liquid mixture from the biological nitrogen removal reactor, wherein:
the biofilm media is either moving, mobile, positioned or fixed in the selector zone to promote either complete mixed or plug flow conditions for the biofilm media;
the biofilm media comprises a single media cassette, or a series of media cassettes, or moving or mobile having the anammox biofilm grown on a media;
the effervescence diffuser includes a gas supply coupled, directly or indirectly, to an air blower, an air compressor, or an inverted siphon;
wherein the biological nitrogen removal reactor is configured to direct the influent to a biofilm zone that contains nitrified or partially nitrified digestate liquor.

* * * * *